(12) United States Patent
Majima

(10) Patent No.: US 7,603,848 B2
(45) Date of Patent: Oct. 20, 2009

(54) CONTROL APPARATUS OF INTERNAL COMBUSTION ENGINE

(75) Inventor: Yoshihiro Majima, Inuyama (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/802,471

(22) Filed: May 23, 2007

(65) Prior Publication Data

US 2007/0251217 A1 Nov. 1, 2007

Related U.S. Application Data

(62) Division of application No. 10/814,261, filed on Apr. 1, 2004, now Pat. No. 7,284,367, which is a division of application No. 10/152,995, filed on May 23, 2002, now Pat. No. 6,732,504.

(30) Foreign Application Priority Data

May 23, 2001 (JP) ............................ 2001-153412
Jul. 24, 2001 (JP) ............................ 2001-223436

(51) Int. Cl.
  *F01N 3/00* (2006.01)
(52) U.S. Cl. ............................ 60/285; 60/277; 60/284; 123/339.1; 123/339.11; 123/339.12
(58) Field of Classification Search ............... 60/274, 60/277, 284, 300, 285; 123/90.11–90.15, 123/339.1, 339.11, 339.22, 339.24, 339.12
  See application file for complete search history.

(56) References Cited

U.S. PATENT DOCUMENTS

| | | |
|---|---|---|
| 5,390,491 A | 2/1995 | Suzumura et al. |
| 5,497,745 A | 3/1996 | Cullen et al. |
| 5,537,976 A * | 7/1996 | Hu .............................. 123/322 |
| 5,682,317 A | 10/1997 | Keeler et al. ................. 701/101 |
| 5,950,419 A | 9/1999 | Nishimura et al. ............ 60/274 |
| 5,950,594 A | 9/1999 | Mizuno |

(Continued)

FOREIGN PATENT DOCUMENTS

JP 59-119007 A 7/1984

(Continued)

OTHER PUBLICATIONS

Communication dated May 29, 2006 in JP Appln. No. 2001-153412 and English translation.

(Continued)

*Primary Examiner*—Tu M Nguyen
(74) *Attorney, Agent, or Firm*—Nixon & Vanderhye P.C.

(57) ABSTRACT

The ignition timing is sustained at an initial value during a predetermined time beginning at a start of an engine, and is retarded after the predetermined time is elapsed to heat a catalyst at an early time. The predetermined time ends when the negative pressure of an intake pipe or the negative pressure of a brake booster reaches to a predetermined value. That is, the predetermined time is a period, which begins at a start of the engine and ends when a proper negative pressure can be sustained in the brake booster. As a result, it is possible to assure a negative pressure in the brake booster at an early time and to reduce exhaust emission at a start of the engine simultaneously.

11 Claims, 30 Drawing Sheets

U.S. PATENT DOCUMENTS

| | | | |
|---|---|---|---|
| 5,950,595 A | 9/1999 | Yoshioka et al. | |
| 6,116,213 A | 9/2000 | Yasui et al. | 123/339.11 |
| 6,125,828 A * | 10/2000 | Hu | 123/568.14 |
| 6,155,217 A * | 12/2000 | Shiraishi et al. | 123/90.15 |
| 6,189,317 B1 | 2/2001 | Yasui et al. | 60/284 |
| 6,237,551 B1 * | 5/2001 | Macor et al. | 123/90.15 |
| 6,371,065 B1 * | 4/2002 | Shiraishi et al. | 123/90.15 |
| 6,412,455 B1 * | 7/2002 | Ogiso et al. | 123/90.11 |
| 6,557,524 B2 | 5/2003 | Tsunooka | 123/339.11 |
| 6,568,175 B2 | 5/2003 | Izumiura et al. | 60/284 |
| 6,691,675 B2 | 2/2004 | Kidokoro et al. | 123/329 |
| 6,732,504 B2 | 5/2004 | Majima et al. | |
| 6,868,667 B2 | 3/2005 | Surnilla | |
| 6,901,908 B2 | 6/2005 | Miyamoto et al. | |
| 2002/0066436 A1 | 6/2002 | Majima et al. | |
| 2004/0159095 A1 | 8/2004 | Grieser et al. | |
| 2004/0182072 A1 | 9/2004 | Majima et al. | |

FOREIGN PATENT DOCUMENTS

| | | |
|---|---|---|
| JP | 62-103464 | 5/1987 |
| JP | 06-026432 | 2/1994 |
| JP | 06-185350 | 7/1994 |
| JP | A-10-148150 | 6/1998 |
| JP | 11-141446 | 5/1999 |
| JP | 11-280533 | 10/1999 |
| JP | 11-315741 | 11/1999 |
| JP | 2000-257474 A | 9/2000 |
| JP | 2000-282919 | 10/2000 |
| JP | 3129802 B2 | 11/2000 |
| JP | 2001-355494 | 12/2001 |

OTHER PUBLICATIONS

Office Action issued Feb. 23, 2009 in corresponding German Application No. 102 22 703.9-26 and an at least partial English language translation thereof.

Examination Reports issued Oct. 7, 2008 and Mar. 10, 2009 in corresponding Japanese Application No. 2006-180254 and at least partial translations thereof.

* cited by examiner

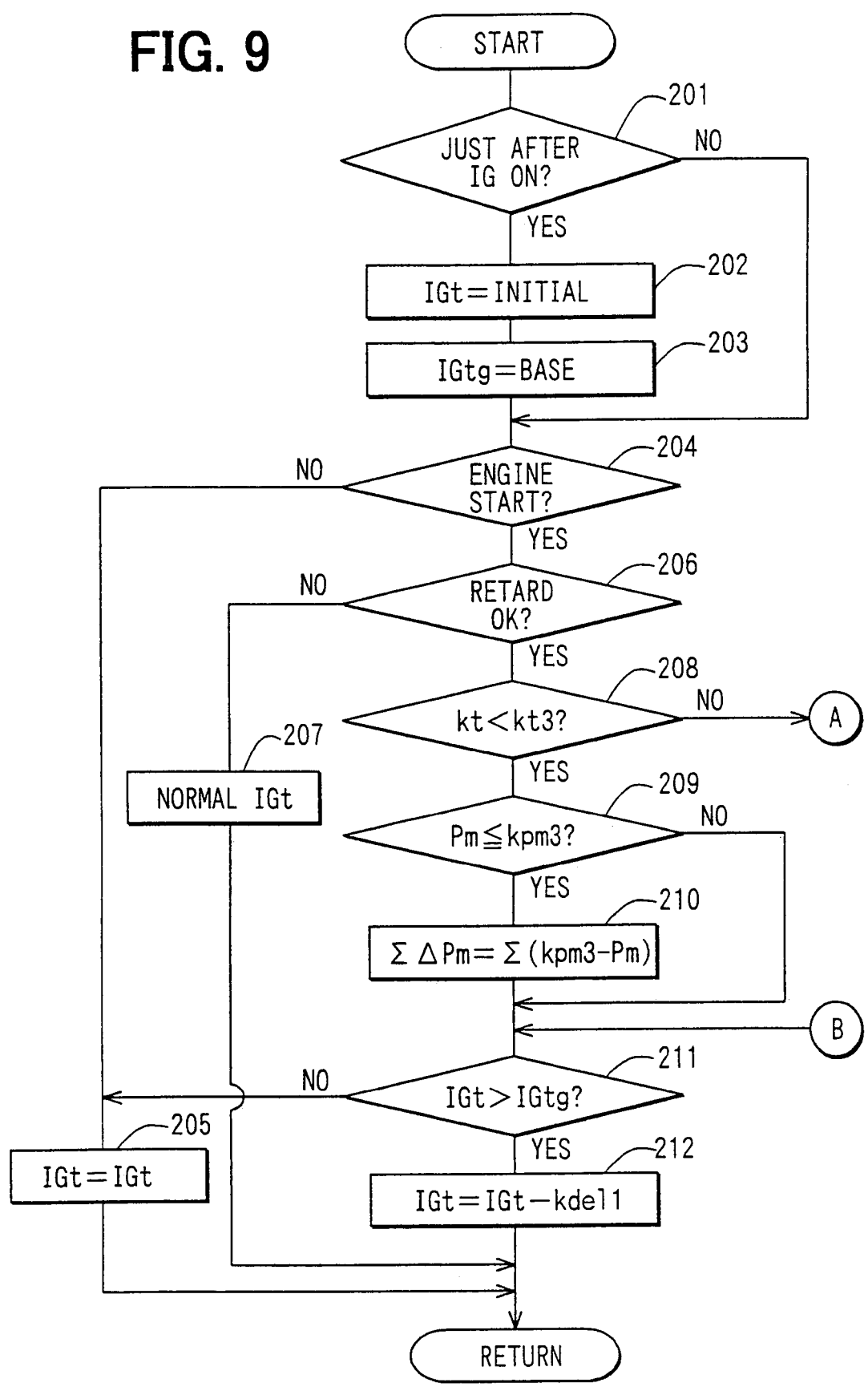

FIG. 31
| Pm \ Ne | 0 | 400 | 800 | ······ |
|---|---|---|---|---|
| 100 | VTop* | | | |
| 80 | | ⋱ | | |
| 60 | | | | |
| ⋮ | | | | |
FIG. 32A
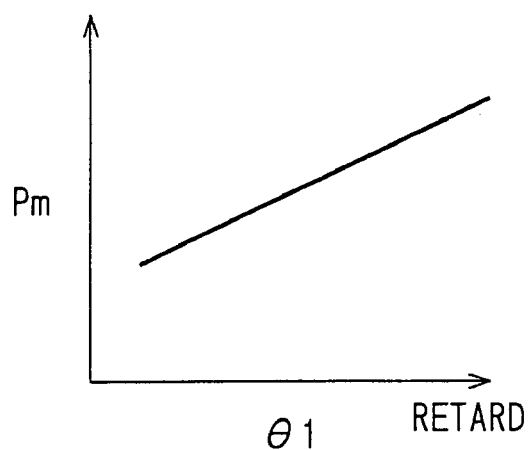
FIG. 32B
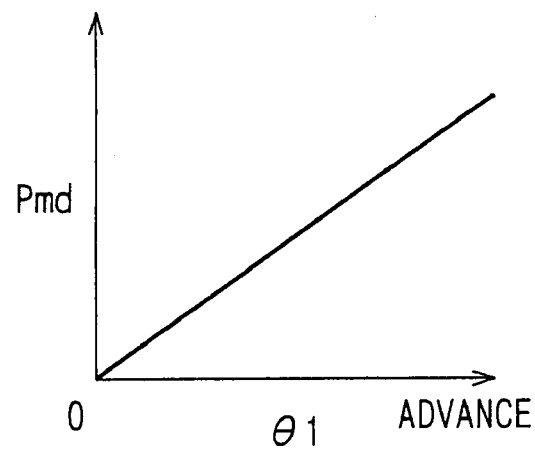

FIG. 36A
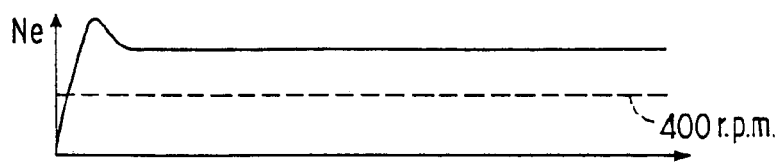
FIG. 36B
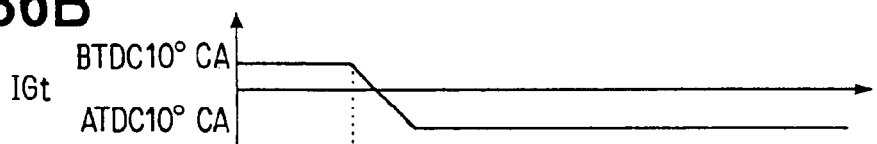
FIG. 36C
FIG. 36D
FIG. 36E
FIG. 36F
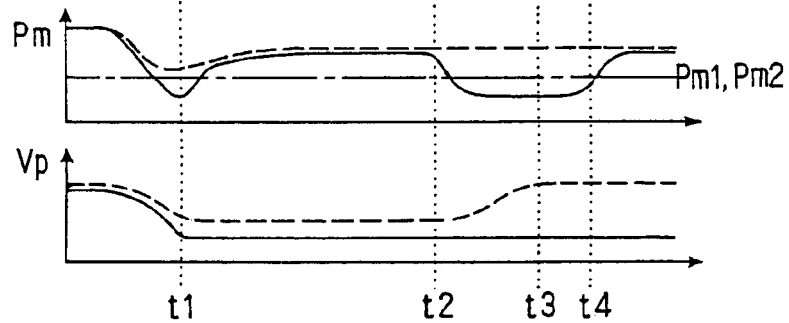
FIG. 38
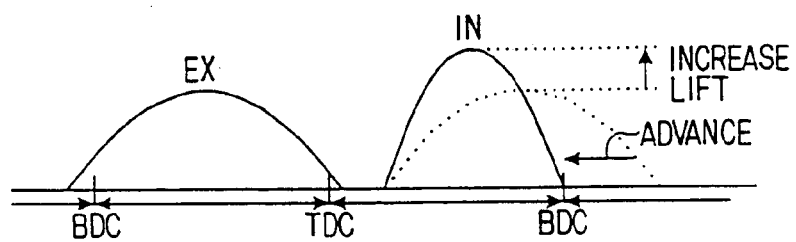

CONTROL APPARATUS OF INTERNAL COMBUSTION ENGINE

CROSS REFERENCE TO RELATED APPLICATION

This application is a division of U.S. application Ser. No. 10/814,261 filed Apr. 1, 2004 (now U.S. Pat. No. 7,284,367), which is a division of U.S. application Ser. No. 10/152,995, filed May 23, 2002 (now U.S. Pat. No. 6,732,504), and is based on Japanese Patent Applications No. 2001-153412 filed on May 23, 2001, and No. 2001-223436 filed on Jul. 24, 2001 the contents of each of which are incorporated herein by reference.

BACKGROUND OF THE INVENTION

1. Field of the Invention

The present invention relates to a control apparatus of an internal combustion engine.

2. Related Art

A car manufactured in recent years is provided with a catalyst such as a three-way catalyst, which is used for purifying exhausted gas, on the exhaust pipe of the car. At a cold start in which the engine is started at a low temperature of the engine and the catalyst, the ignition timing is retarded to increase the temperature of the exhausted gas. The increased temperature of the exhausted gas in turn promotes the heating of the catalyst so that the temperature of the catalyst is increased to a value in an active temperature range at an early time.

If the ignition timing is retarded in order to heat the catalyst at an early time, however, the engine torque decreases. In order to prevent the engine torque (or the engine speed) from decreasing, an idle speed control system (ISC) is used to increase the opening of an ISC valve (or a throttle valve) in order to raise an intake air quantity. As a result, the negative pressure of the intake air increases, reducing a difference between the negative pressure of the intake air and the atmospheric pressure. Accordingly, a braking force amplification effect of a brake booster inevitably becomes smaller.

In order to solve the above problems, as is disclosed in U.S. Pat. No. 5,497,745, with the initial value of the ignition timing at a cold start set at a target retard angle, ignition retarding control (or catalyst-early-heating control) is started and an intake manifold negative pressure is compared with a threshold value at predetermined control intervals. The threshold value is an intake manifold negative pressure required for assuring a proper negative pressure in a brake booster. If the intake manifold negative pressure is smaller than the threshold value, the ignition timing is retarded. If the intake manifold negative pressure is greater than the threshold value, on the other hand, the ignition timing is advanced.

As described above, with the technology disclosed in the USP, the initial value of the ignition timing at a cold start is set at a target retard angle and then the ignition timing is retarded or advanced in dependence on the intake manifold negative pressure. At a cold start, however, the fuel stability of the engine is poor so that, if the ignition timing is much retarded from the cold start as is the case with the disclosed technology, the fuel condition becomes unstable, unavoidably increasing the quantity of an exhausted unburned gas component such as HC or CO. In addition, if the ignition timing is much retarded from the cold start, the retard angle for the ignition timing causes a delay of the decreasing of the intake manifold negative pressure. Thus, it inevitably takes a longer time for the intake manifold negative pressure to decrease from a pre-start pressure (that is, the atmospheric pressure) to the threshold value, which is an intake manifold negative pressure required for assuring a proper brake booster negative pressure as described above. In the mean time, the negative pressure of the brake booster cannot be assured at a sufficient value so that the performance of the brake booster cannot be fully displayed. In short, with the disclosed technology, it is difficult to assure a sufficient negative pressure of the brake booster while reducing the exhaust emission at a start of the engine at the same time.

On the other hand, U.S. Pat. No. 3,129,802 discloses a technology whereby the closing timing of an intake valve is retarded when the pressure in a negative pressure tank for a brake booster is determined to be on the positive pressure side relative to a predetermined pressure. There is already known an apparatus (VVT) for adjusting a valve timing as is disclosed in JP-A No. S59-119007. The VVT is controlled to realize a valve timing proper for the operating state of the engine. The VVT is provided for achieving one of important objectives to improve the state of combustion. By execution of advancing control on the VVT in accordance with reduction of the negative pressure, however, the state of combustion cannot be improved sufficiently.

In addition, if the ignition timing is retarded in order to heat the catalyst at an early time, the resulting negative pressure is not sufficient as described above. Thus, with the technology disclosed in U.S. Pat. No. 3,129,802, advancing control is executed on the VVT in accordance with a negative pressure signal, resulting in an unimproved state of combustion.

SUMMARY OF THE INVENTION

It is thus an object of the present invention addressing the problems to provide an internal combustion engine with a control apparatus capable of assuring a required negative pressure at a start time of the engine and at a time immediately following the start time.

It is another object of the present invention to provide an internal combustion engine with a control apparatus capable of assuring a negative pressure required by a brake unit during a period in which early heating control of a catalyst is executed.

It is a further object of the present invention to provide an internal combustion engine with a control apparatus capable of assuring a negative pressure required by a brake unit at a start time of the engine and at a time immediately following the start time.

It is a still further object of the present invention to provide an internal combustion engine with a control apparatus capable of realizing early heating control of a catalyst and assuring a negative pressure required by a brake unit.

It is a still further object of the present invention to provide an internal combustion engine with a control apparatus capable of reducing the amount of obstruction resulting from control to assure a negative pressure required by a brake unit to control to heat a catalyst at an early time and control of a valve timing to improve combustion.

In order to achieve the objects described above, in accordance with an aspect of the present invention, an internal combustion engine is provided with a control apparatus, wherein a negative pressure recognizing means recognizes a negative pressure of an intake pipe or a negative pressure of a brake booster, and an ignition retarding control means starts ignition retarding control after the negative pressure reaches a level equal to or lower than a predetermined value. When fuel stability is poor at a cold start, instead of retarding an ignition timing, the ignition timing is set at a timing that improves the state of combustion so that it is possible to lower a pressure in an intake pipe at an early time while suppressing generation of unburned gas components such as HC and CO. Thus, at a point of time a negative pressure in the intake pipe (or a negative pressure of a brake booster) becomes equal to or lower than a predetermined value allowing a proper negative pressure of the brake booster to be assured, the ignition retarding control is started to retard an ignition timing and, hence, increase the temperature of exhausted gas so that the catalyst can be heated at an early time.

In this configuration, the time between the start of the engine and the completion of the catalyst heating may become slightly longer. By delaying the start timing of the ignition retarding control, however, it is possible to suppress generation of unburned gas components such as HC and CO. Caused by deterioration of a combustion state at a start of the engine, the generation of unburned gas components is the main cause of deterioration of emission at the start of the engine. Thus, it is possible to reduce the total emission quantity during the time between the start of the engine and the completion of the catalyst heating. As a result, it is possible to assure a negative pressure of the brake booster at an early time while reducing the exhaust emission at the start of the engine at the same time.

In accordance with another aspect of the present invention, the ignition retarding control can also be started after a predetermined time has lapsed since a start of the engine. In this case, a time it takes for the negative pressure in the intake pipe (or the negative pressure of the brake booster) to decrease to a level equal to or lower than a predetermined value is measured in advance by simulation, an experiment or the like with the start of the engine used as a reference point. The measured time is used as the predetermined time. Thus, by commencing the ignition retarding control after the predetermined time has lapsed since a start of the engine, the objective can be achieved in a simple configuration not employing a negative pressure recognizing means.

In accordance with a further aspect of the present invention, a retardation speed of the ignition timing is reduced till the negative pressure recognized by a negative pressure recognizing means decreases to a level equal to or lower than a predetermined value and, after the negative pressure has decreased to a level equal to or lower than the predetermined value, the retardation speed of the ignition timing is raised. In this case, during a period of time beginning from a start of the engine, the retardation speed of the ignition time is low, resulting in a small retardation quantity. Thus, the retardation of the ignition timing has only a small effect on the negative pressure in the intake pipe and, in addition, the state of combustion does not deteriorate so that it is possible to lower the negative pressure in the intake pipe in a short period of time while reducing the quantity of a generated unburned gas component. Then, after the negative pressure in the intake pipe (or the negative pressure of the brake booster) has decreased to a level equal to or lower than the predetermined value, the retardation speed of the ignition timing is raised so that it is possible to increase the catalyst heating effect provided by the retardation of the ignition timing. It is thus possible to assure a negative pressure of the brake booster at an early time while reducing the exhaust emission at a start of the engine at the same time. In addition, since the ignition retarding control is commenced from a start of the engine, a period of time from the start of the engine to completion of catalyst heating can be shortened.

In accordance with a still further aspect of the present invention, a retardation speed of the ignition timing is reduced till a predetermined time lapses since a start of the engine and, after the predetermined time has lapsed, the retardation speed of the ignition timing is raised.

In accordance with a still further aspect of the present invention, the ignition timing's retardation quantity and/or retardation speed are set on the basis of a negative pressure recognized by the negative pressure recognizing means in the course of the ignition retarding control. In this way, it is possible to increase the temperature of exhausted gas by retarding the ignition timing as much as possible in a range allowing a proper value of the negative pressure of the brake booster to be assured and, hence, shorten the time to heat the catalyst while assuring the negative pressure of the brake booster at an early time and preventing the state of combustion from worsening.

In accordance with a still further aspect of the present invention, the ignition timing's retardation quantity and/or retardation speed are set on the basis of a sum of differences between negative pressures recognized by the negative pressure recognizing means and a predetermined value or a maximum value of the differences. With the ignition timing's retardation quantity and/or retardation speed set in this way, the negative pressure of the brake booster can be lowered to a proper negative pressure level in a short period of time by reducing the retardation quantity of the ignition timing and/or lowering the retardation speed of the ignition timing when the actual negative pressure of the brake booster is determined to be insufficient as indicated by a small sum of differences between negative pressures recognized by the negative pressure recognizing means and the predetermined value or a small maximum value of the differences. On the other hand, a large sum of differences between negative pressures recognized by the negative pressure recognizing means and the predetermined value or a large maximum value of the differences indicates that the negative pressure in the intake pipe (or the negative pressure of the brake booster) is sufficiently low, leading to a determination that a proper negative pressure of the brake booster can still be assured even if the negative pressure in the intake pipe slightly rises so that the catalyst heating effect based on retardation of the ignition timing can be enhanced by increasing the retardation quantity of the ignition timing and/or raising the retardation speed of the ignition timing in a range that does not deteriorate the combustibility.

In accordance with a still further aspect of the present invention, the ignition timing's retardation quantity and/or retardation speed are set on the basis of a time lapsing since a start of the engine in the course of ignition retarding control. In detail, operations desirable for an ignition timing between a start of the engine and a heated state of the catalyst, that is, the negative pressure in the intake pipe (or the negative pressure of the brake booster), the temperature of the catalyst and the like can be estimated in advance by simulation, by conducting an experiment or by other means. Thus, from results of the estimation, it is possible to create table data, a formula or the like to represent a relation between a time lapsing since a start of the engine and a retardation quantity and/or a retardation speed, which are desirable for the ignition timing, in advance. The table data is stored in a memory. Then, by setting the ignition timing's retardation quantity and/or retardation speed at values obtained from the stored table data or the formula in accordance with a time lapsing since an engine start at an actual start of the engine, desirable ignition retarding control can be executed. As a result, it is possible to assure a negative pressure of the brake booster at an early time while reducing the exhaust emission at a start of the engine at the same time.

In accordance with a still further aspect of the present invention, a control range (guard values) of the retardation quantity of the ignition timing are changed in accordance with a negative pressure recognized by the negative pressure recognizing means and/or a load borne by the internal combustion engine in the course of the ignition retarding control. An example of the load is a load to operate an auxiliary apparatus such as an air conditioner. In this way, the retardation quantity of the ignition timing can be controlled to a desirable value in accordance with the negative pressure in the intake pipe (or the negative pressure of the brake booster) and/or a load borne by the internal combustion engine. As a result, it is possible to assure a negative pressure of the brake booster at an early time while reducing the exhaust emission at a start of the engine at the same time.

In accordance with a still further aspect of the present invention, the ignition timing is further retarded when the engine is an idle operation state and a negative pressure recognized by the negative pressure recognizing means is lower than a predetermined value after a predetermined time has lapsed since a start of the engine. That is, in an idle operation state after a predetermined time has lapsed since a start of the engine, if the negative pressure in the intake pipe (or the negative pressure of the brake booster) is sufficiently low so that a proper negative pressure of the brake booster can be assured even if the negative pressure in the intake pipe slightly increases, the ignition timing is further retarded to further increase the temperature of exhausted gas. Thus, the time required for heating the catalyst can be shortened while a proper negative pressure of the brake booster is being assured.

In accordance with a still further aspect of the present invention, the negative pressure recognizing means is a pressure sensor for detecting a negative pressure of the brake booster or a means for estimating a negative pressure of the brake booster on the basis of the internal combustion engine's operating conditions such as the negative pressure in the intake pipe, the intake airflow, the engine speed, the gear position, status of a brake switch and a brake operation count. By directly detecting a negative pressure of the brake booster by means of a pressure sensor, the negative pressure of the brake booster can be determined with a high degree of accuracy so that the control precision can be improved. In addition, by estimating a negative pressure of the brake booster on the basis of the operating conditions of the internal combustion engine, a negative pressure of the brake booster can be estimated from outputs of sensors and switches, which are generally provided for engine control so that it is not necessary to provide a new pressure sensor. As a result, a demand for a reduced cost can be met.

In order to achieve the objects of the present invention, in accordance with a further aspect of the present invention, an internal combustion engine is provided with a control apparatus, which is provided with a variable intake valve timing mechanism for setting an intake valve's position relative to the crank shaft of the internal combustion engine at a variable value and used for controlling the closing position of the intake valve on the basis of a result of processing carried out on the closing position of the intake valve in accordance with an operating condition of the internal combustion engine. The control apparatus has a first advancing control means, which is used for advancing the closing position of the intake valve on the basis of the operating state of a brake when the closing position of the intake valve is retarded behind a control position of a bottom dead center.

Normally, a negative pressure is expended only when the brake is used. Thus, by advancing the closing position of the intake valve, a flow back to the intake pipe can be suppressed to maintain a negative pressure in the intake valve only when the negative pressure is expended. As a result, a negative pressure can be introduced into the intake pipe only when the negative pressure is necessary. Therefore, without providing a pressure sensor in a brake tank, a negative pressure in the intake pipe can be sustained at a negative level only when the negative pressure is needed in the intake pipe. It is thus possible to properly implement control for retarding the closing position of the intake valve typically in order to suppress a pumping loss or improve combustion.

Normally, when an ignition timing control means retards the ignition timing in order to heat the catalyst at an early time, the torque generated by combustion inevitably decreases. At that time, an intake airflow control means compensates the torque for its decrease by increasing the intake airflow in order to maintain a target revolution speed. With the intake airflow increased, the pressure in the intake pipe approaches the atmospheric pressure. Thus, with the ignition timing retarded, the brake is applied and the negative pressure is therefore expended. When the brake is applied next with the negative pressure expended, the driver needs to apply a large depressing force, which causes a feeling of incompatibility in the driver.

In accordance with a still further aspect of the present invention, an internal combustion engine is provided with a valve timing control apparatus, which is provided with a target revolution speed setting means for setting a target revolution speed of the internal combustion engine, an intake airflow control means for increasing an intake airflow by setting a throttle valve at a position on an opening side to control a revolution speed from a decreased value of the revolution speed to the target revolution speed, a catalyst converter provided on an exhaust pipe, an ignition timing control means for controlling an ignition timing in accordance with an operating condition of the internal combustion engine, and a variable intake valve timing mechanism for setting an intake valve's position relative to the crank shaft of the internal combustion engine at a variable value and used for controlling the closing position of the intake valve on the basis of a result of processing carried out on the closing position of the intake valve in accordance with an operating condition of the internal combustion engine. The ignition timing control means has a configuration including a means, which is used for retarding the ignition timing from an ignition timing set on the basis of a normal operating condition of the internal combustion engine so that the catalyst converter is heated at an early time in a cold start of the internal combustion engine; and a first advancing control means, which is used for advancing the closing position of the intake valve on the basis of the operating status of a brake when the closing position of the intake valve is retarded behind a control position of a bottom dead center.

Thus, when the control to retard an ignition timing is executed, the position of the intake valve is retarded on the basis of the operating status of the brake. As a result, a flow back to the intake valve can be suppressed. Therefore, the pressure of the intake pipe can be made a negative pressure when it is necessary to introduce a negative pressure into the brake tank so that the brake tank can be sustained at a proper negative pressure and it is also possible to properly implement control for retarding the closing position of the intake valve typically in order to suppress a pumping loss or improve combustion even if the catalyst is being heated at an early time.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 9 is a flowchart showing the flow of processing of an ignition timing control program of a fifth embodiment;

FIG. 31 is a diagram showing a map used for finding a closing position of an intake valve from a revolution speed and an intake pressure;

FIGS. 32A and 32B are diagrams each showing a map used for finding a closing position of an intake valve from a pressure in an intake pipe;

FIGS. 36A to 35F are time charts each used for explaining the eleventh embodiment;

FIG. 38 is a time chart of intake valve closing position control executed by another embodiment.

PREFERRED EMBODIMENTS OF THE INVENTION

First Embodiment

A first embodiment of the present invention applied to a direct injection engine is described by referring to FIGS. 1 to 3 as follows.

Figure 1:
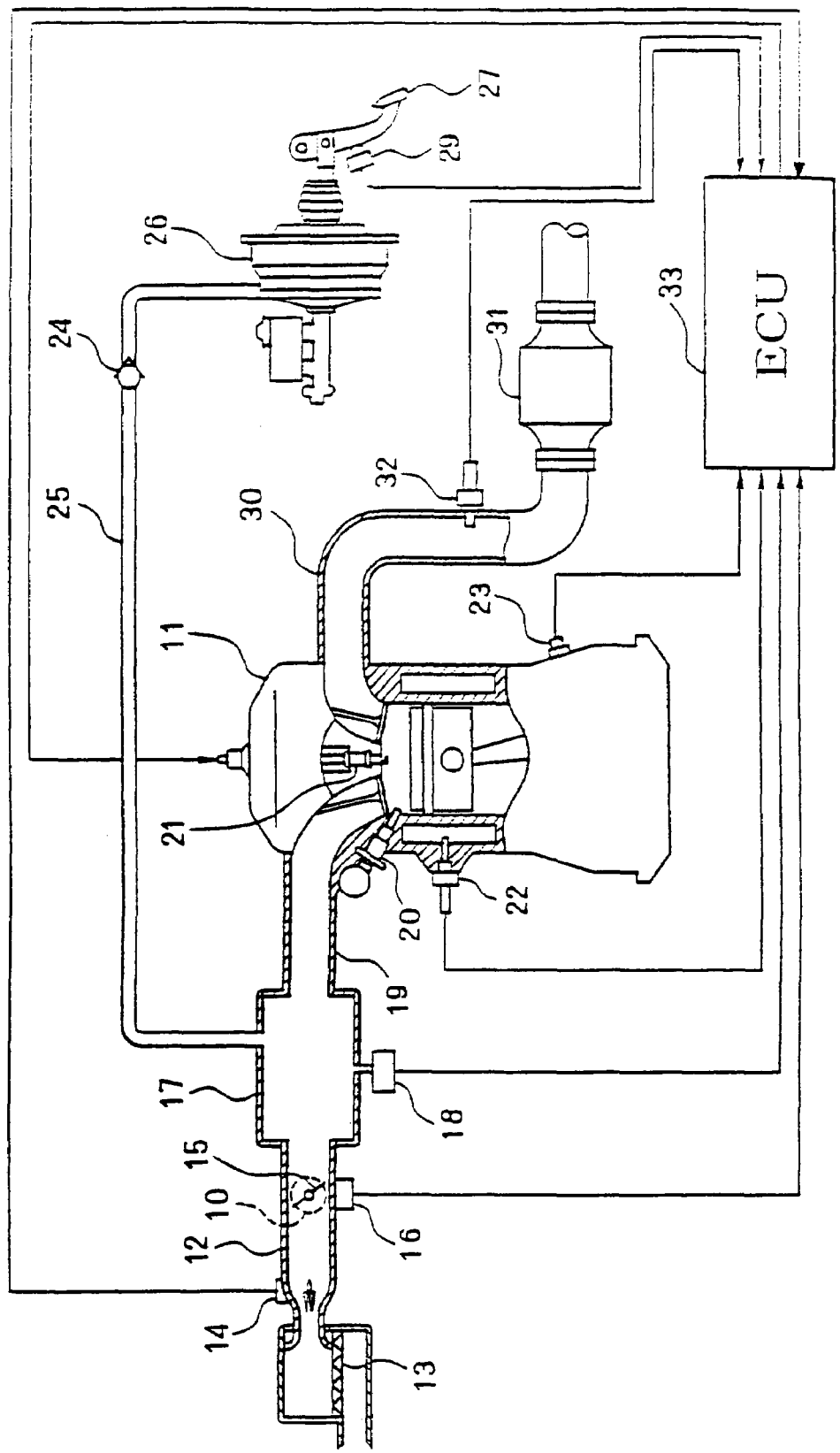
FIG. 1 is a diagram showing an entire engine control system of a first embodiment of the present invention.

The description begins with an explanation of the entire engine control system's configuration, which is shown in FIG. 1. At the upper end of the upstream side of an intake pipe 12 employed in an engine 11 working as an internal combustion engine, an air cleaner 13 is provided. On the downstream of this air cleaner 13, an airflow meter 14 for detecting an intake airflow volume is provided. On the downstream side of the airflow meter 14, there are provided a throttle valve 15 driven by an actuator such as a motor 10 and a throttle angle sensor 16 for detecting a throttle angle.

On the downstream side of the throttle valve 15, a surge tank 17 is provided. On the surge tank 17, there is provided an intake pressure sensor 18 (negative pressure recognizing means) for detecting a negative pressure of an intake pipe 12 (intake pressure). In addition, on the surge tank 17, an intake manifold 19 for introducing intake air into each cylinder of the engine 11 is provided. On the top of each cylinder, a fuel injection valve 20 for injecting fuel directly into the cylinder is provided. On the cylinder heads of the engine 11, an ignition plug 21 is provided for each cylinder. Ignition discharge of an ignition plug 21 ignites mixed gases in the cylinder associated with the ignition plug 21. On a cylinder block of the engine 11, a cooling water temperature sensor 22 for detecting a temperature of cooling water and a crank angle sensor 23 for detecting an engine speed are provided.

The surge tank 17 is connected to a brake booster 26 through a negative pressure introduction pipe 25, which has a check valve 24, so that a negative pressure in the intake pipe 12 is introduced into the brake booster 26 by way of the negative pressure introduction pipe 25. With a brake pedal 27 not depressed, the negative pressure of the intake pipe 12 is introduced into pressure chambers on both sides of a diaphragm in the brake booster 26. In this state, the brake booster 26 does not work. When the brake pedal 27 is depressed, on the other hand, external air is introduced into the pressure chamber on the atmosphere side of the diaphragm so that a difference between the pressure inside the intake pipe and the atmospheric pressure is developed between both the sides of the diaphragm. The difference in pressure amplifies the force depressing the brake pedal 27. On the brake pedal 27, there is provided a brake switch 29 for detecting existence/nonexistence of depression of the brake pedal 27, that is, a braking operation carried out on the brake pedal 27.

On an exhaust pipe 30 of the engine 11, on the other hand, there is provided a catalyst 31 such as a three-way catalyst for cleaning exhausted gas. On the upstream side of the catalyst 31, an air-fuel ratio sensor 32 (or an oxygen sensor) for detecting an air-fuel ratio (or a rich/lean state) of the exhausted gas is provided.

Signals output by the sensors and the switches are supplied to an engine control circuit (abbreviated hereafter to ECU) 33. This ECU 33 is based on a microcomputer for controlling an ignition timing by execution of an ignition timing control program, which is shown in FIG. 2 and stored in advance in a recording medium such as a ROM. In addition, the ECU 33 also controls a fuel injection quantity, a throttle angle (or an intake airflow volume), an idle state revolution speed (or an idle state intake airflow volume) and other quantities by execution of a fuel injection control program, a throttle control program, an idle state revolution control program and other programs respectively. The fuel injection control program, the throttle control program, the idle state revolution control program and the other programs are shown in none of the figures.

Figure 2:
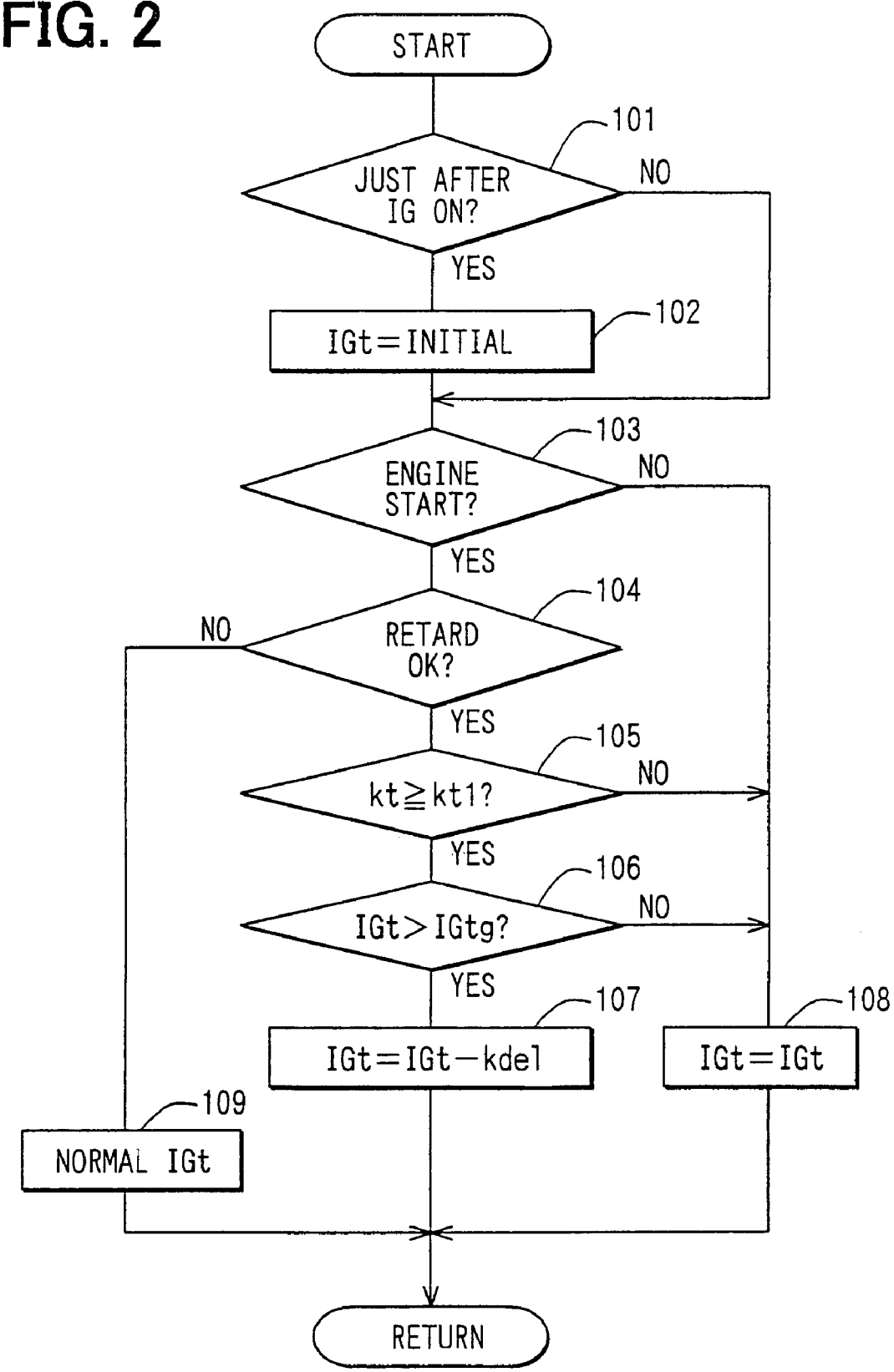
FIG. 2 is a flowchart showing the flow of processing of an ignition timing control program of the first embodiment.
Figure 3:
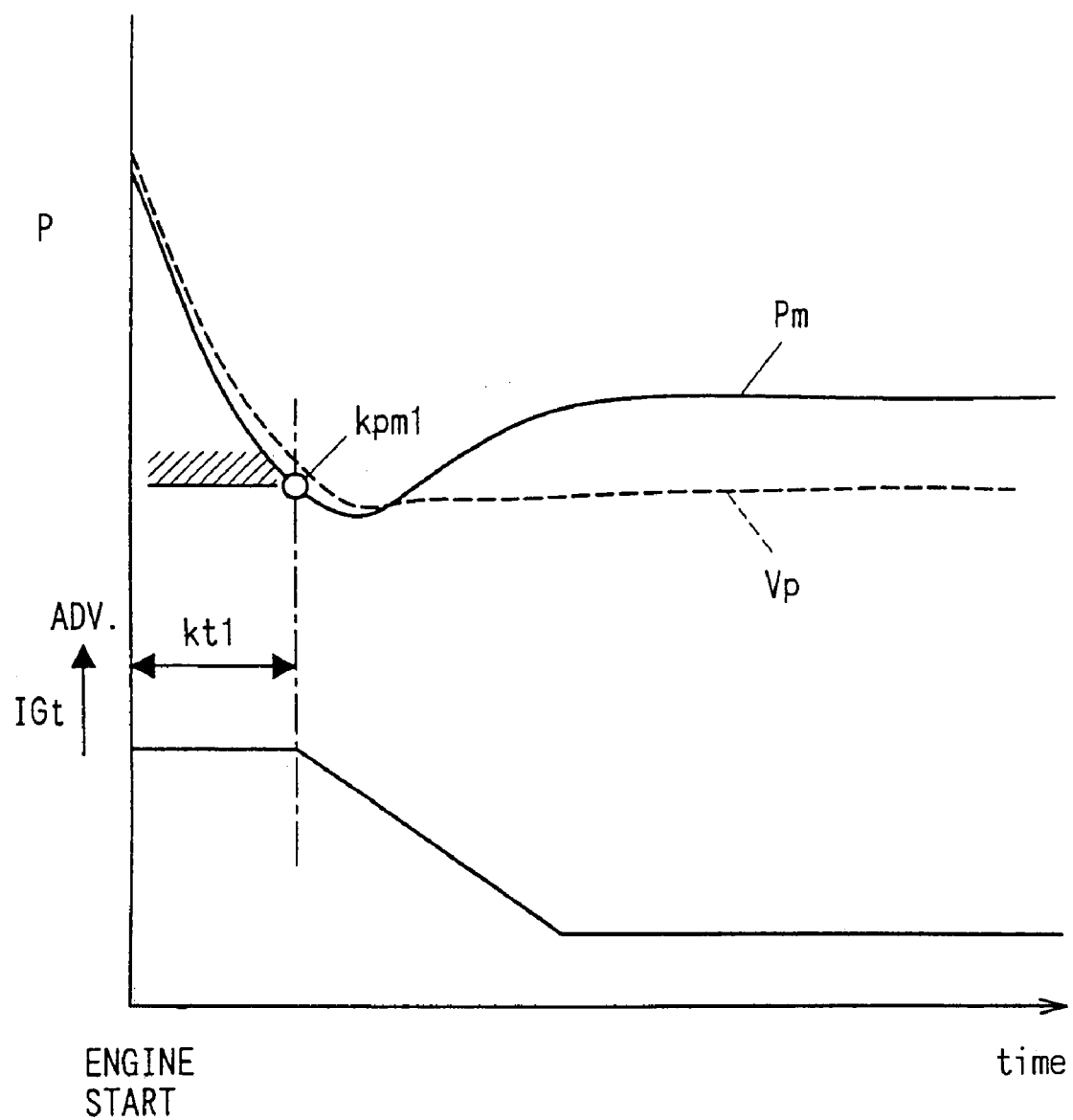
FIG. 3 is a time chart of typical ignition retarding control of the first embodiment.

The ignition timing control program shown in FIG. 2 is characterized in that, in control to retard ignition in order to heat the catalyst at an early time, as shown in FIG. 3, during a predetermined period kt1 beginning at a start of the engine, the ignition timing is sustained at an initial value instead of being retarded and, after the predetermined period kt1 beginning at a start of the engine, control to retard ignition is commenced. The predetermined period kt1 is a period, which begins at a start of the engine and ends when the intake pipe negative pressure Pm (or the negative pressure of the brake booster) decreases to a predetermined value kpm1. That is, the predetermined period kt1 begins at a start of the engine and ends when a state, in which a proper negative pressure of the brake booster can be assured, is attained. The predetermined period kt1 is found by simulation, by conducting an experiment or by other means and stored in the ROM employed in the ECU 30 in advance.

The ignition timing control program shown in FIG. 2 is executed repeatedly at predetermined time intervals or predetermined crank angles to perform the role as an ignition retarding control means described in a claim. The execution of this program begins with a first step 101 to determine whether an ignition switch IG has just been turned on. If the ignition switch IG has just been turned on, the flow of the routine goes on to a step 102 at which the ignition timing IGt is set at an initial value.

Then, at the next step 103, the engine speed is examined to determine whether the speed has exceeded a complete explosion value in order to determine whether the start of the engine has been completed. If the start of the engine has not been completed, the flow of the routine goes on to a step 108 at which the ignition timing is sustained at an immediately preceding ignition timing, which is the initial value in this case.

If the start of the engine has just been completed, on the other hand, the flow of the routine goes on from the step 103 to a step 104 to determine whether conditions for execution of the ignition retarding control to heat the catalyst 31 at an early time are satisfied. Examples of the execution conditions are:

(1) The catalyst 31 has not been activated.

(2) The speed of the car does not exceed a predetermined value (or the engine is in an idle operation state).

(3) The shift position of an automatic transmission is a neutral or parking position.

If these conditions are all satisfied, the conditions for execution of the ignition retarding control are determined to be satisfied. If even one of these conditions is not satisfied, on the other hand, the conditions for execution of the ignition retarding control are determined to be not satisfied. It should be noted that either of conditions (2) and (3) can be eliminated from the conditions for execution of the ignition retarding control. On the other hand, another condition can of course be added. Determination as to whether the catalyst 31 has been activated is based on information having correlation with the temperature of the catalyst 31 to a certain degree. Examples of such information are a lapsing time since a start of the engine, an increase in cooling water temperature after a start of the engine, a computed value of the fuel injection quantity after a start of the engine and the temperature of exhausted gas. Of course, the temperature of the catalyst 31 can also be detected directly by means of a temperature sensor.

If a determination result obtained at the step 104 indicates that the conditions for execution of the ignition retarding control are not satisfied, the flow of the routine goes on to a step 109 at which the ignition retarding control is executed. If a determination result obtained at the step 104 indicates that the conditions for execution of the ignition retarding control are satisfied, on the other hand, the flow of the routine goes on to a step 105 to determine whether a post start lapsing time kt has reached a predetermined time kt1. If the post start lapsing time kt has not reached the predetermined time kt1, the flow of the routine goes on to a step 108 at which the ignition timing is sustained at an immediately preceding ignition timing, which is the initial value in this case. Thus, the ignition timing is sustained at an immediately preceding ignition timing instead of being retarded till the post start lapsing time kt reaches the predetermined time kt1.

If the post start lapsing time kt has reached the predetermined time kt1, on the other hand, the flow of the routine goes on to a step 106 to determine whether the present ignition timing IGt is advanced ahead of a target ignition timing IGtg. If the present ignition timing IGt is advanced ahead of the target ignition timing IGtg, the flow of the routine goes on to a step 107 at which the present ignition timing IGt is retarded by a predetermined quantity kdel. Thus, after the control to retard ignition is started, the present ignition timing IGt is retarded by the predetermined quantity kdel at intervals equal to the execution period of this program till the present ignition timing IGt attains the target ignition timing IGtg.

Then, after the present ignition timing IGt attains the target ignition timing IGtg, the determination result obtained at the step 106 is No. In this case, the flow of the routine goes on to the step 108 at which the ignition timing is sustained at an immediately preceding ignition timing, which is the initial value in this case.

Thereafter, when the temperature of the catalyst 31 increases, entering an active temperature range, that is, when any one of the conditions for execution of the ignition retarding control is no longer satisfied, the conditions for execution of the ignition retarding control are determined to be unsatisfied at the step S104. In this case, the flow of the routine goes on to a step 109 at which the control to retard ignition is finished and a transition to normal ignition control is made.

In general, a period of time beginning at a start of the engine and ending at a time the intake pipe negative pressure Pm or the negative pressure of the brake booster reaches a predetermined value kpm1 is all but fixed and hardly changes much.

Paying attention to this point, in the first embodiment, we decide to measure the period of time beginning at a start of the engine and ending at a time the intake pipe negative pressure Pm reaches a predetermined value kpm1 by simulation, by conducting an experiment or by other means. The measured period of time is then stored in advance in the ROM employed in the ECU 30 as a predetermined time kt1. Then, during the predetermined time kt1 beginning at a start of the engine, the ignition timing is sustained at an initial value instead of being retarded. As the predetermined time kt1 beginning at a start of the engine lapses, the control to retard ignition is commenced. When the combustion stability is poor at a start of the engine, the ignition timing is set at the initial value, which is an ignition timing for improving the state of combustion, instead of being retarded. Thus, it is possible to reduce the intake pipe negative pressure Pm within a short period of time while lessening generation of unburned gas components such as HC and CO. As a result, as the intake pipe negative pressure Pm decreases to a level equal to or lower than a predetermined value kpm1, the control to retard ignition is started. The predetermined value is a negative pressure at which a proper negative pressure of the brake booster can be assured. When the control to retard ignition is started, the ignition timing is retarded to increase the temperature of exhausted gas. As a result, the heating of the catalyst 31 is promoted to increase the temperature of the catalyst 31 at an early time to a value in the active temperature range. In this embodiment, it is possible to early obtain a negative voltage Vp supplied to the brake booster as shown in FIG. 3.

In this configuration, after a start of the engine, it is not until a state allowing a proper negative pressure of the brake booster to be assured that the control to retard ignition is commenced. Thus, in comparison with the conventional control system whereby the control to retard ignition is commenced at a start of the engine, the period of time between the start of the engine and the completion of heating of the catalyst 31 may become slightly longer but, by delaying the start timing of the control to retard ignition, it is possible to suppress generation of unburned gas components such as HC and CO, which are a main cause of deterioration of emission at the start of the engine, due to deterioration of a combustion state at the start of the engine. It is thus possible to reduce a total amount of emission generated between the start of the engine and the completion of heating of the catalyst 31. As a result, it is possible to assure a sufficient negative pressure of the brake booster at an early time while reducing the exhaust emission at a start of the engine at the same time.

Second Embodiment

Figure 4:
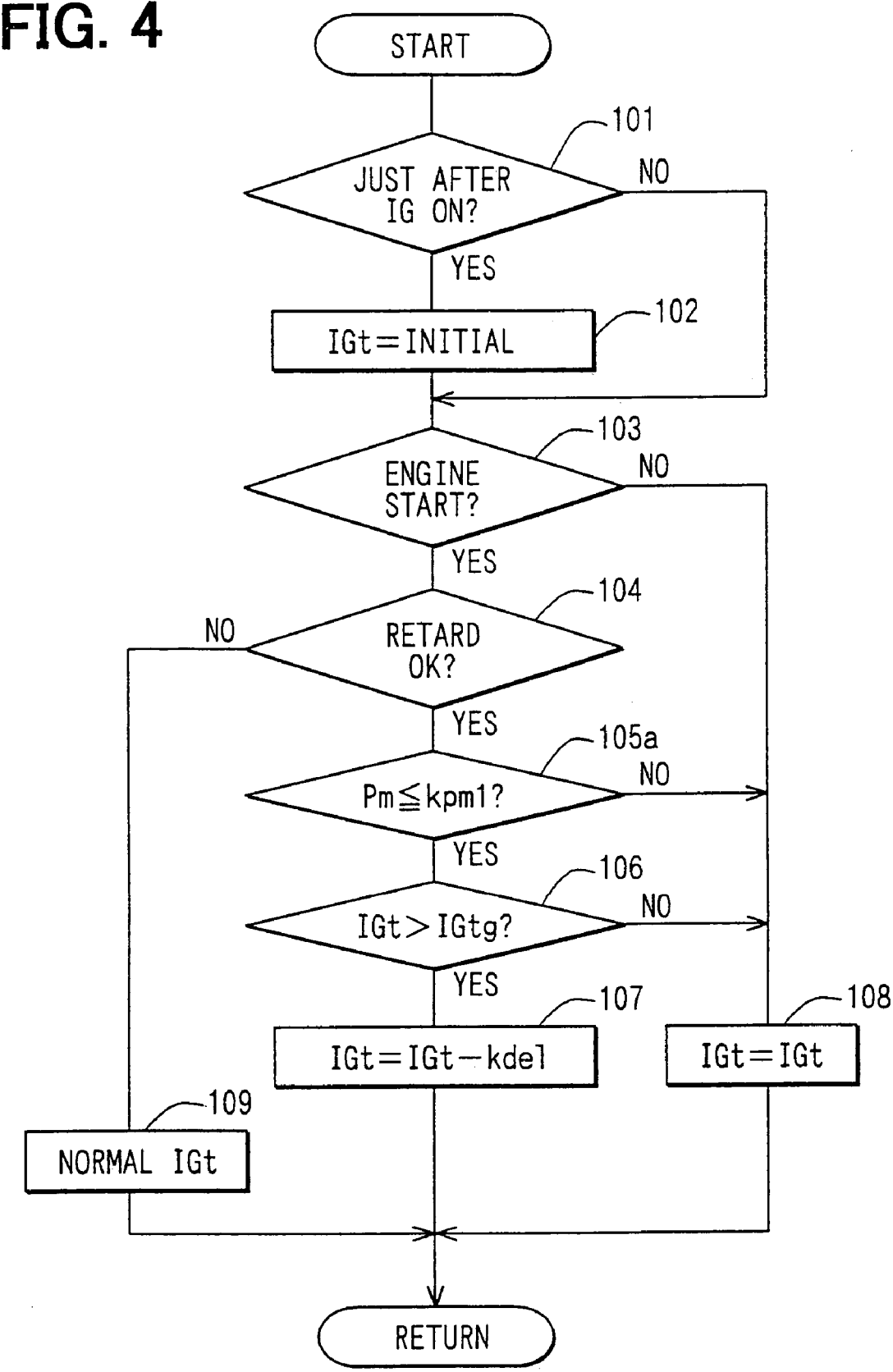
FIG. 4 is a flowchart showing the flow of processing of an ignition timing control program of a second embodiment.

In the case of the first embodiment, a timing of a state in which a proper negative pressure of the brake booster can be assured after a start of the engine is confirmed when a predetermined time lapses since the start of the engine. Such a timing is taken as a timing to start the control of retarding ignition. In the case of a second embodiment shown in FIG. 4, on the other hand, at a step 105*a*, an intake pipe negative pressure Pm detected by an intake pipe negative pressure sensor 18 is examined to determine whether the pressure Pm has decreased to a predetermined value kpm1 or a lower value. The predetermined value kpm1 is an intake pipe negative pressure at which a proper negative pressure of the brake booster can be assured. During a period between a start of the engine and a time the intake pipe negative pressure Pm decreases to the predetermined value kpm1 or a lower value, the ignition timing is sustained at an initial value instead of being retarded and, as the intake pipe negative pressure Pm decreases to the predetermined value kpm1 or a lower value, the control to retard ignition is started. The rest of the processing is the same as the first embodiment.

In the case of the second embodiment, the start timing of the control to retard ignition is determined by an intake pipe negative pressure Pm detected by the intake pipe negative pressure sensor 18. Thus, it is not until verification of the fact that the intake pipe negative pressure Pm has decreased to the predetermined value kpm1 or a smaller one that the control to retard ignition is started. As a result, the negative pressure of the brake booster can be assured at an early time with a higher degree of reliability.

It should be noted that, in a system provided with a pressure sensor for detecting a negative pressure of the brake booster 26, in place of the intake pipe negative pressure Pm, a brake booster negative pressure detected by a pressure sensor is examined to determine whether the pressure has decreased to the predetermined value kpm1 or a smaller one in order to determine whether to start the control to retard ignition.

In addition, also in a system provided with a pressure sensor for detecting a negative pressure of the brake booster 26, a negative pressure of the brake booster 26 is estimated from the engine's operating conditions such as the negative pressure in the intake pipe, the intake airflow volume, the engine speed, the gear position, status of the brake switch and the brake operation count. The estimated negative pressure of the brake booster 26 is examined to determine whether the pressure has decreased to the predetermined value kpm1 or a smaller one in order to determine whether to start the control to retard ignition.

Third Embodiment

In the first and second embodiments, during a period between a start of the engine and a state in which a proper negative pressure of the brake booster can be sustained, the ignition timing is sustained at an initial value instead of being retarded. In the case of a third embodiment shown in FIGS. 5 and 6, on the other hand, during a predetermined period kt2 beginning at a start of the engine, the retardation speed of the ignition timing is lowered and, after the period, the retardation speed is increased. The period is a time it takes to lower the intake pipe negative pressure Pm to a predetermined value kpm1.

Figure 5:
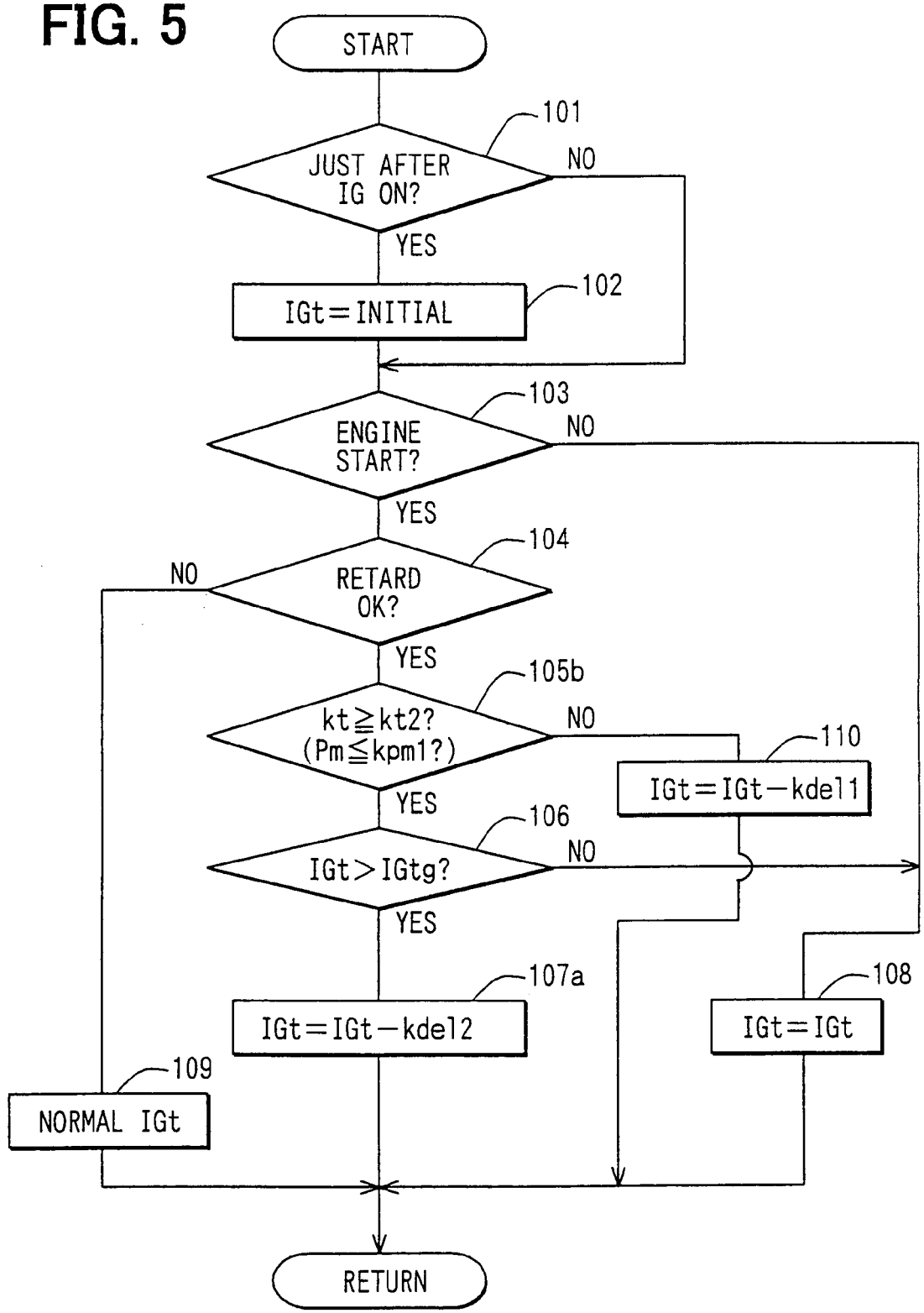
FIG. 5 is a flowchart showing the flow of processing of an ignition timing control program of a third embodiment.

In the actual processing, at a step 103 of a flowchart shown in FIG. 5, completion of an engine start is confirmed. If the completion is confirmed, the flow of the routine goes on to a step 104 to determine whether the conditions for execution of the ignition retarding control to heat the catalyst at an early time are satisfied. If the conditions are satisfied, the flow of the routine goes on to a step 105b to determine whether a predetermined time kt2 has lapsed since the start of the engine or whether the intake pipe negative pressure Pm has decreased to a level equal to or lower than a predetermined value kpm1. If the predetermined time kt2 has not lapsed since the start of the engine, that is, if the intake pipe negative pressure Pm has not decreased to a level equal to or lower than the predetermined value kpm1, the flow of the routine goes on to a step 110 at which the ignition timing is delayed by a first predetermined quantity kdel1. The first predetermined quantity kdel1 is set at a value smaller than a second predetermined quantity kdel2 to be described later. Thus, during the predetermined period kt2 beginning at a start of the engine or during the period kt2 beginning at a start of the engine and ending at a time the intake pipe negative pressure Pm decreases to a level equal to or lower than the predetermined value kpm1, the retardation speed of the ignition timing is reduced.

Thereafter, as the predetermined time kt2 lapses since the start of the engine or the intake pipe negative pressure Pm decreases to a level equal to or lower than the predetermined value kpm1, the flow of the routine goes on to a step 106 to determine whether the present ignition timing is advanced ahead of a target ignition timing (present ignition timing>target ignition timing). If the present ignition timing is advanced ahead of the target ignition timing, the flow of the routine goes on to a step 107a at which the ignition timing is delayed by a second predetermined quantity kdel2. The second predetermined quantity kdel2 is set at a value greater than the first predetermined quantity kdel1. Thus, during the predetermined period kt2 beginning at a start of the engine or during the period kt2 beginning at a start of the engine and ending at a time the intake pipe negative pressure Pm decreases to a level equal to or lower than the predetermined value kpm1, the retardation speed of the ignition timing is increased so that the ignition timing is retarded to the target ignition timing in a short period of time. The rest of the processing is the same as the first embodiment.

Figure 6:
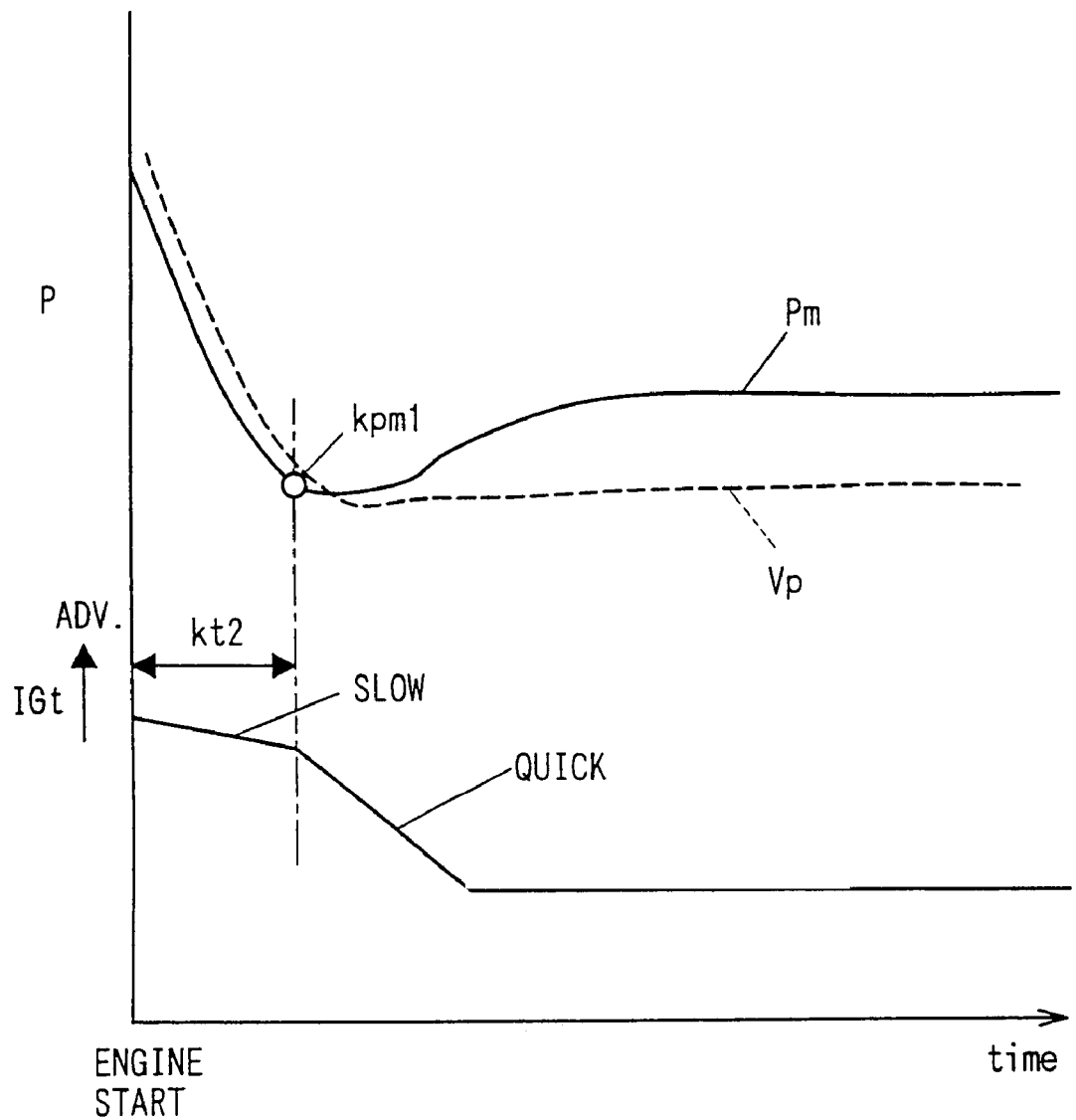
FIG. 6 is a time chart of typical ignition retarding control of the third embodiment.

In the case of the third embodiment described above, the control to retard ignition is commenced from a start of the engine. During the predetermined period kt2 beginning at a start of the engine or during the period kt2 beginning at a start of the engine and ending at a time the intake pipe negative pressure Pm decreases to a level equal to or lower than the predetermined value kpm1, however, the retardation speed of the ignition timing is low, resulting in a small retardation quantity. The retardation of the ignition timing has only a small effect on the intake pipe negative pressure Pm so that reduction of the intake pipe negative pressure Pm is not much delayed and, in addition, the state of combustion does not deteriorate. For this reason, during the predetermined period kt2 beginning at a start of the engine or during the period kt2 beginning at a start of the engine and ending at a time the intake pipe negative pressure Pm decreases to a level equal to or lower than the predetermined value kpm1, it is it is possible to lower the intake pressure Pm in a short period of time while lessening generation of unburned gas components. Then, after the predetermined period kt2 beginning at a start of the engine or after the period kt2 beginning at a start of the engine and ending at a time the intake pipe negative pressure Pm decreases to a level equal to or lower than the predetermined value kpm1, the retardation speed of the ignition timing increases so that the effect of the early catalyst heating by retardation of the ignition timing can be enhanced. Thus, the temperature of the catalyst 31 is increased to a value in an active temperature range at an early time so that it is possible to assure a sufficient negative pressure of the brake booster at an early time while reducing the exhaust emission at a start of the engine at the same time. In addition, in the case of the third embodiment, since the control to retard ignition is commenced at a start of the engine, there is offered a merit that a period of time between the start of the engine and completion of the heating of the catalyst 31 can be shortened in comparison with the first and second embodiments. FIG. 6 is a diagram showing typical control executed by the third embodiment.

It should be noted that, when the retardation speed of the ignition timing is changed over on the basis of a determination result indicating whether or not the intake pipe negative pressure Pm has decreased to a level equal to or lower than the predetermined value kpm1, a detected or estimated value of the brake booster's negative pressure can also be used as a substitute for the intake pipe negative pressure Pm.

Fourth Embodiment

Figure 7:
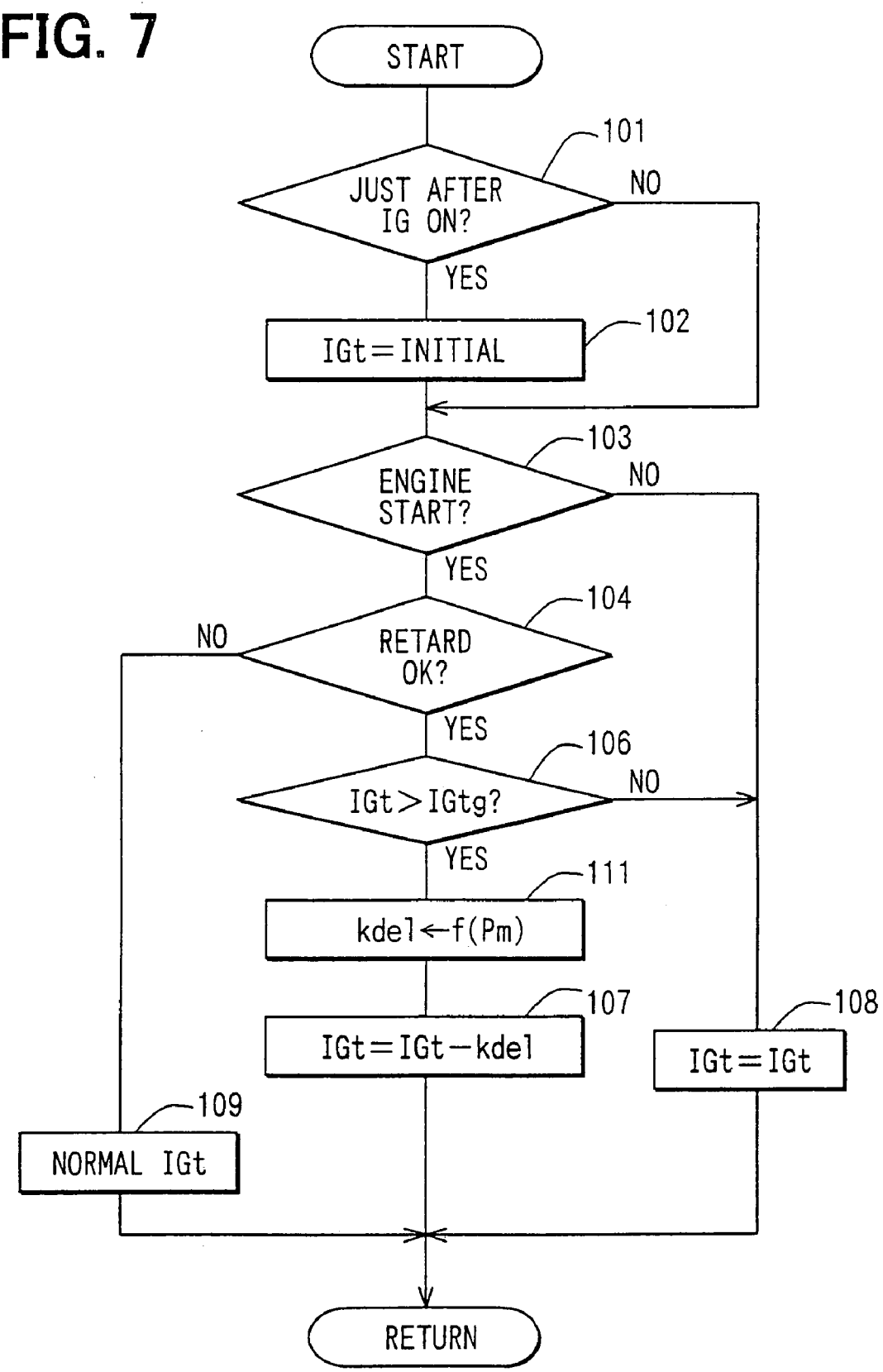
FIG. 7 is a flowchart showing the flow of processing of an ignition timing control program of a fourth embodiment.
Figure 8:
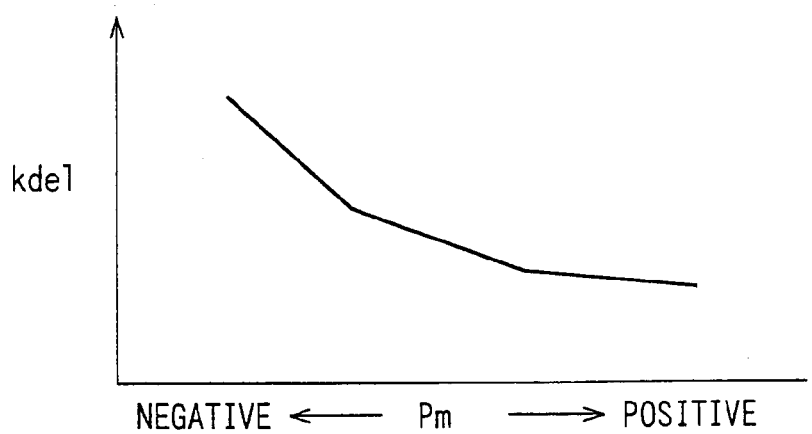
FIG. 8 is a diagram conceptually showing a typical map for finding a retarding speed of the ignition timing for an intake pipe negative pressure Pm in the fourth embodiment.

In the case of a fourth embodiment shown in FIGS. 7 and 8, in execution of the ignition retarding control to heat the catalyst at an early time, a retardation speed of the ignition timing is found for the intake pipe negative pressure Pm detected by the intake pipe negative pressure sensor 18. The retardation speed is found from a map shown in FIG. 8. A retardation speed is defined as a retardation quantity kdel per processing period. The map shown in FIG. 8 is characterized in that, the higher the intake pipe negative pressure Pm, that is, the closer the intake pipe negative pressure Pm to the atmospheric pressure, the lower the retardation speed of the ignition timing, that is, the smaller the retardation quantity kdel per processing period. Thus, for a high intake pipe negative pressure Pm at a start of the engine, the retardation speed of the ignition timing is reduced. Thereafter, when the intake pipe negative pressure Pm decreases, the retardation speed of the ignition timing is increased gradually.

The ignition retarding control of the fourth embodiment described above is implemented by execution of an ignition timing control program shown in FIG. 7. The program shown in FIG. 7 is obtained by eliminating the step 105 of the program shown in FIG. 2 and adding a step 111 between the steps 106 and 107. The processing of the remaining steps is the same as the program shown in FIG. 2.

In the program shown in FIG. 7, at a step 103, completion of an engine start is confirmed. If the completion is confirmed, the flow of the routine goes on to a step 104 to determine whether the conditions for execution of the ignition retarding control to heat the catalyst at an early time are satisfied. If the conditions are satisfied, the flow of the routine goes on to a step 106 to determine whether the present ignition timing is advanced ahead of a target ignition timing (present ignition timing>target ignition timing). If the present ignition timing is advanced ahead of the target ignition timing, the flow of the routine goes on to a step 111 at which a retardation speed for the intake pipe negative pressure Pm detected by the intake pipe negative pressure sensor 18 is found from the map shown in FIG. 8. As described above, the retardation speed is defined as a retardation quantity kdel per processing period. Then, at the next step 107, the ignition timing is delayed by the retardation quantity kdel found at the step 111.

In this way, during the control to retard ignition, the retardation speed of the ignition timing is set at a value according to the intake pipe negative pressure Pm and, after the ignition timing reaches a target ignition timing, a determination result of NO is obtained at the step 106, causing the flow of the routine to go on to a step 108 at which the ignition timing is sustained at an immediately preceding ignition timing, which is the initial value in this case. The processing carried out at the other steps is the same as the program shown in FIG. 2.

In the fourth embodiment described above, the control to retard ignition is commenced at a start of the engine as is the case with the third embodiment. Till the intake pipe negative pressure Pm decreases to a certain degree, however, the retardation speed of the ignition timing is low, resulting in a small retardation quantity. Thus, the reduction of the intake pipe negative pressure Pm is not much delayed and, in addition, the state of combustion does not deteriorate. As a result, till the intake pipe negative pressure Pm approaches a proper value, it is possible to reduce the intake pipe negative pressure Pm (or the negative pressure of the brake booster) in a short period of time while lessening generation of unburned gas components. Then, as the intake pipe negative pressure Pm decreases, the retardation speed of the ignition timing is set at a gradually decreasing value in accordance with the map shown in FIG. 8. Thus, at about a time the intake pipe negative pressure Pm (or the negative pressure of the brake booster) approaches the proper value, the retardation speed of the ignition timing has been raised considerably. Thereby, the effect of the catalyst heating by retardation of the ignition timing can be enhanced so that the temperature of the catalyst 31 is increased to a value in an active temperature range at an early time. As a result, it is possible to assure a negative pressure of the brake booster at an early time while reducing the exhaust emission at the start of the engine at the same time. In addition, in the case of the fourth embodiment, the control to retard ignition is commenced at a start of the engine so that a period of time from the start of the engine to completion of a process to heat catalyst 31 can be shortened in comparison with the first and second embodiments.

In the case of the fourth embodiment, during the control to retard ignition, the retardation speed of the ignition timing is set at a value according to the intake pipe negative pressure Pm. It should be noted, however, that the retardation speed of the ignition timing can also be set at a value according to a detected or estimated value of the negative pressure of the brake booster.

In addition, the retardation quantity of the ignition timing, that is, the target ignition timing, can also be set at a value according to the intake pipe negative pressure Pm (or the negative pressure of the brake booster) during the control to retard ignition. Of course, the ignition timing's both retardation speed and retardation quantity can also be set in accordance with the intake pipe negative pressure Pm (or the negative pressure of the brake booster).

As an alternative, the ignition timing's retardation speed and retardation quantity can also be set at values both based on a time lapsing since a start of the engine in the course of control to retard ignition. That is, operations desirable for an ignition timing between a start of the engine and a heated state of the catalyst 31, the negative pressure Pm in the intake pipe (or the negative pressure of the brake booster), the temperature of the catalyst and the like can be estimated in advance by simulation, by conducting an experiment or by other means. Thus, from results of the estimation, it is possible to create table data, a formula or the like to represent a relation between a time lapsing since a start of the engine and a retardation quantity and/or a retardation speed, which are desirable for the ignition timing, in advance. The table data is stored in the ROM employed in the ECU 33. Then, by setting the ignition timing's retardation quantity and/or retardation speed at values obtained from the stored table data or the formula in accordance with a time lapsing since an engine start at an actual start of the engine, desirable ignition retarding control can be executed. As a result, it is possible to assure a negative pressure of the brake booster at an early time while reducing the exhaust emission at a start of the engine at the same time.

Fifth Embodiment

Figure 10:
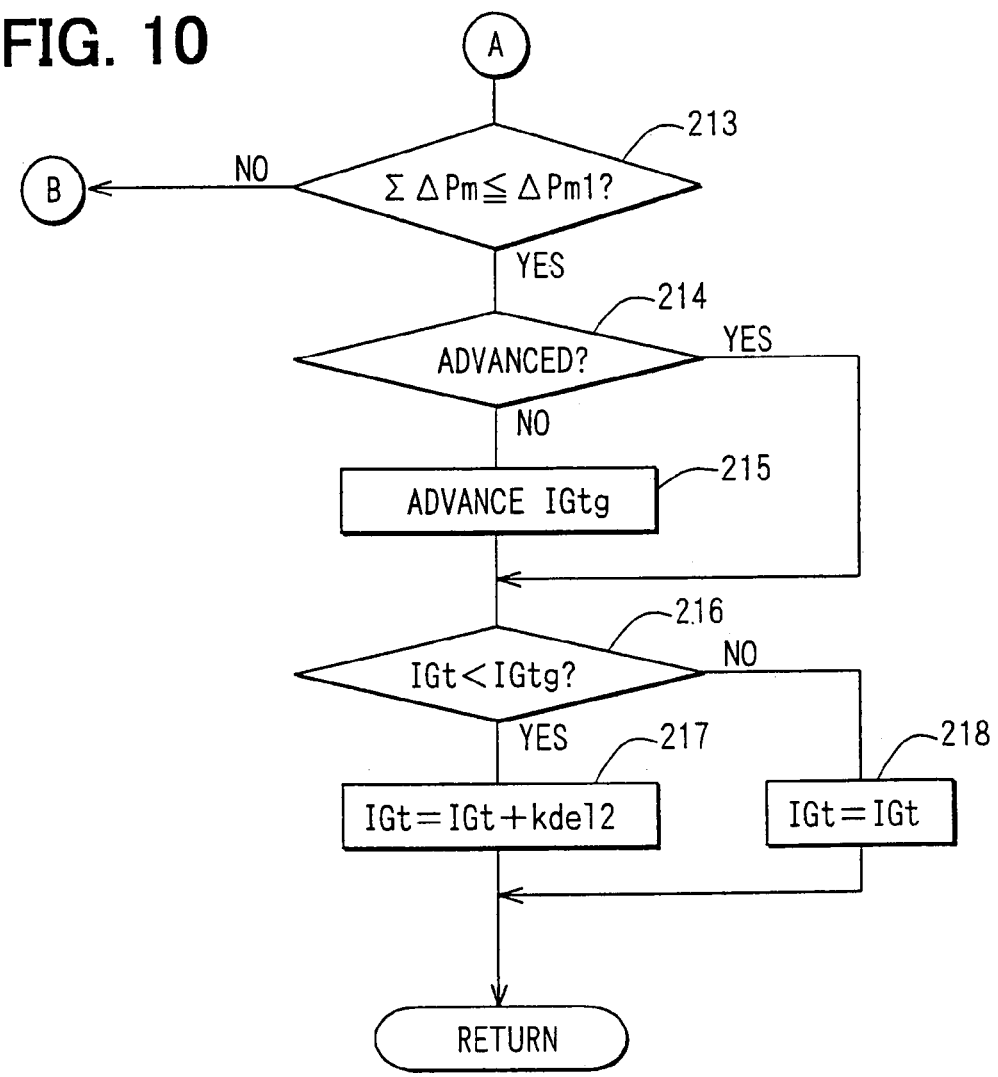
FIG. 10 is another flowchart showing the flow of processing of the ignition timing control program of the fifth embodiment.
Figure 11:
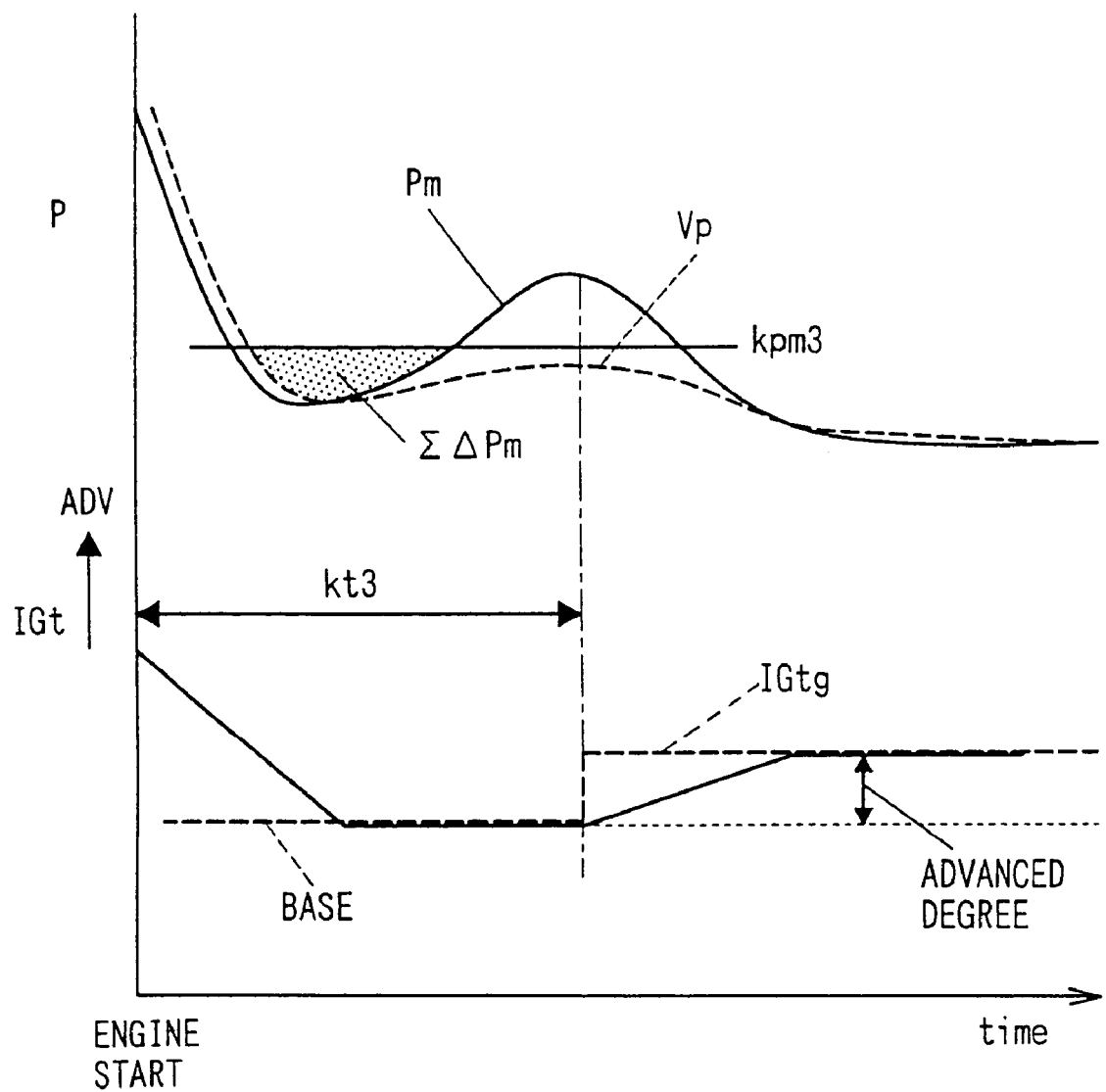
FIG. 11 is a time chart of typical ignition retarding control of the fifth embodiment.

In the case of a fifth embodiment shown in FIGS. 9 to 11, a retardation quantity of the ignition timing, that is, a target ignition timing, is set at a value based on a sum $\Sigma \Delta Pm$ of differences $\Delta Pm$ between intake pipe negative pressures Pm detected by the intake pipe negative pressure sensor 18 and a predetermined value kpm3. The predetermined value kpm3 is typically an intake pipe negative pressure Pm required for assuring a proper negative pressure of the brake booster or a value close to such an intake pipe negative pressure Pm.

In the case of the fifth embodiment, the control to retard ignition is commenced at a start of the engine with the target ignition timing IGtg set at a base value BASE and the ignition timing is retarded by a predetermined quantity kdel1 at a time at predetermined intervals so as to approach the target ignition timing (the base value) as shown in FIG. 11. Then, during a predetermined period kt3 beginning at the start of the engine, the differences $\Delta Pm$ between intake pipe negative pressures Pm and the predetermined value kpm3 are summed up at predetermined intervals. It should be noted that the sum is found only for Pm$\leq$kpm3.

Thereafter, at a point of time the predetermined period kt3 lapses since the start of the engine, the sum $\Sigma \Delta Pm$ of differences $\Delta Pm$ between intake pipe negative pressures Pm and the predetermined value kpm3 is examined to determine whether the sum does not exceed a predetermined value $\Delta Pm1$. If the sum does not exceed a predetermined value $\Delta Pm1$, a sufficient negative pressure of the brake booster is determined to have not been assured. In this case, the ignition timing is corrected by advancing the ignition timing by an advancing correction quantity (Target ignition timing=Base value+Advancing correction quantity). Thereafter, the ignition timing is advanced by a predetermined quantity kdel2 at a time at predetermined intervals so as to approach the target ignition timing obtained as a result of the advancing correction. Thus, by lowering the intake pipe negative pressure Pm, a proper negative pressure of the brake booster can be assured in a short period of time.

The ignition timing control executed by the fifth embodiment described above is implemented by execution of an ignition timing control program shown in FIGS. 9 and 10. The ignition timing control program is executed repeatedly at predetermined time intervals or predetermined crank angles. The program begins with a step 201 to determine whether an ignition switch shown in none of the figures has just been turned on. If the ignition switch has just been turned on, the flow of the routine goes on to a step 202 at which the ignition timing is set at an initial value. Then, at the next step 203, the target ignition timing is set at a base value.

Subsequently, the flow of the routine goes on to a step 204 to determine whether the start of the engine has been completed. If the start of the engine has not been completed, the flow of the routine goes on to a step 205 at which the ignition timing is set at an immediately preceding ignition timing, which is the initial value in this case.

Thereafter, at a point time the start of the engine is completed, the flow of the routine goes on from the step 204 to a step 206 to determine whether conditions for execution of the ignition retarding control to heat the catalyst 31 at an early time are satisfied by adopting the same technique as the step 104 of the flowchart shown in FIG. 2. If the conditions for execution of the ignition retarding control to heat the catalyst 31 at an early time are not satisfied, the flow of the routine goes on to a step 207 at which the normal ignition timing control is executed.

If a determination result produced at the step 206 indicates that the conditions for execution of the ignition retarding control to heat the catalyst 31 at an early time are satisfied, on the other hand, the flow of the routine goes on to a step 208 to determine whether a time lapsing since the start of the engine has not exceeded a predetermined time kt3. If the time lapsing since the start of the engine has not exceeded the predetermined time kt3, the flow of the routine goes on to a step 209 to determine whether an intake pipe negative pressure Pm detected by the intake pipe negative pressure sensor 18 is equal to or lower than a predetermined value kpm3, which allows a proper negative pressure of the brake booster to be assured. If a determination result produced at the step 209 indicates that the intake pipe negative pressure Pm detected by the intake pipe negative pressure sensor 18 is equal to or lower than the predetermined value kpm3, the flow of the routine goes on to a step 210 to compute a sum $\Sigma\Delta Pm$ of differences $\Delta Pm$ between the present intake pipe negative pressures Pm and the predetermined value kpm3 up to the immediately preceding difference $\Delta Pm$.

Thereafter, the flow of the routine goes on to a step 211 to determine whether the present ignition timing is advanced ahead of a target ignition timing, that is, a base value (ignition timing>target ignition timing). If the present ignition timing is advanced ahead of the target ignition timing, the flow of the routine goes on to a step 212 at which the ignition timing is retarded by a predetermined quantity kdel1. In this way, the ignition timing is retarded by a predetermined quantity kdel1 each time this program is executed till the ignition timing reaches the target ignition timing.

Then, after the ignition timing reaches the target ignition timing, the determination result produced at the step 211 is NO, causing the flow of the routine to go on to a step 205 at which the ignition timing is sustained at the immediately preceding ignition timing, which is the target ignition timing in this case.

Thereafter, at a point of time the time lapsing since the start of the engine reaches the predetermined time kt3, a determination result produced at the step 208 is NO, causing the flow of the routine to go on to a step 213 of the flowchart shown in FIG. 10 to determine whether the sum $\Sigma\Delta Pm$ of differences $\Delta Pm$ between intake pipe negative pressures Pm and the predetermined value kpm3 does not exceed a predetermined value $\Delta Pm1$. If a determination result produced at the step 213 indicates that the sum $\Sigma\Delta Pm$ does not exceed the predetermined value $\Delta Pm1$, the flow of the routine goes on to a step 214 to determine whether the target ignition timing has been corrected by being advanced. If the target ignition timing has been corrected by being advanced, the flow of the routine goes on to a step 215 at which the target ignition timing is corrected by being advanced by an advancing correction quantity (Target ignition timing=Base value+Advancing correction quantity). The advancing correction quantity can be set at a constant in order to make the processing simple or can be a variable found by using a map or a formula from the sum $\Sigma\Delta Pm$.

It should be noted that, if the target ignition timing was corrected by being advanced at the step 215 of an immediately preceding execution of this program, the determination result produced at the step 214 of the current execution of the program will be YES. In this case, the processing supposed to be carried out at the step 215 to correct the target ignition timing is skipped.

Thereafter, the flow of the routine goes on to a step 216 to determine whether the present ignition timing obtained as a result of the advancing correction is retarded behind the target ignition timing (Ignition timing<Target ignition timing). If the present ignition timing is retarded behind the target ignition timing, the flow of the routine goes on to a step 217 at which the ignition timing is advanced by a predetermined quantity kdel2. In this way, the ignition timing is advanced by a predetermined quantity kdel2 each time this program is executed till the ignition timing reaches the target ignition timing obtained as a result of the advancing correction.

Then, after the ignition timing reaches the target ignition timing obtained as a result of the advancing correction, the determination result produced at the step 216 is NO, causing the flow of the routine to go on to a step 218 at which the ignition timing is sustained at the immediately preceding ignition timing, which is the target ignition timing obtained as a result of the advancing correction.

It should be noted that, if the determination result produced at the step 213 indicates that the sum $\Sigma\Delta Pm$ of differences $\Delta Pm$ between intake pipe negative pressures Pm and the predetermined value kpm3 has exceeded the predetermined value $\Delta Pm1$, on the other hand, a proper negative pressure of the brake booster is determined to have been assured. In this case, the target ignition timing is not subjected to advancing correction. Instead, the processing of the step 211 and the subsequent steps is carried out to control the ignition timing to the target ignition timing (or the base value).

In the case of the fifth embodiment described above, for a small sum $\Sigma\Delta Pm$ of differences $\Delta Pm$ between intake pipe negative pressures Pm and the predetermined value kpm3, a proper negative pressure of the brake booster is determined to be not assured sufficiently. In this case, since the ignition timing is corrected by being advanced, the intake pipe negative pressure Pm is reduced in a short period of time so as to assure a proper negative pressure of the brake booster with a high degree of reliability.

It should be noted that, in the case of a large sum $\Sigma\Delta Pm$ of differences $\Delta Pm$ between intake pipe negative pressures Pm and the predetermined value kpm3, on the other hand, a proper negative pressure of the brake booster is determined to have been assured sufficiently. In this case, the ignition timing can be corrected by being retarded to a value in a range that does not deteriorate the state of combustion. Accordingly, the effect of the catalyst heating by retardation of the ignition timing can be enhanced and a time it takes to heat the catalyst can be shortened.

In addition, in place of the sum $\Sigma\Delta Pm$ of differences $\Delta Pm$ between intake pipe negative pressures Pm and the predetermined value kpm3, a maximum value of the differences $\Delta Pm$ between intake pipe negative pressures Pm and the predetermined value kpm3 is recognized instead and the retardation quantity of the ignition timing (that is, the target ignition timing) can then be set on the basis of the maximum value of the differences $\Delta Pm$.

Furthermore, in place of the sum $\Sigma\Delta Pm$ of differences $\Delta Pm$ between intake pipe negative pressures Pm and the predetermined value kpm3, a sum of differences between the negative pressures of the brake booster and a predetermined value can also be used. In this case, the negative pressure of the brake booster can be a detected or estimated value. Moreover, the retardation speed can also be changed in accordance with the sum.

Sixth Embodiment

Figure 12:
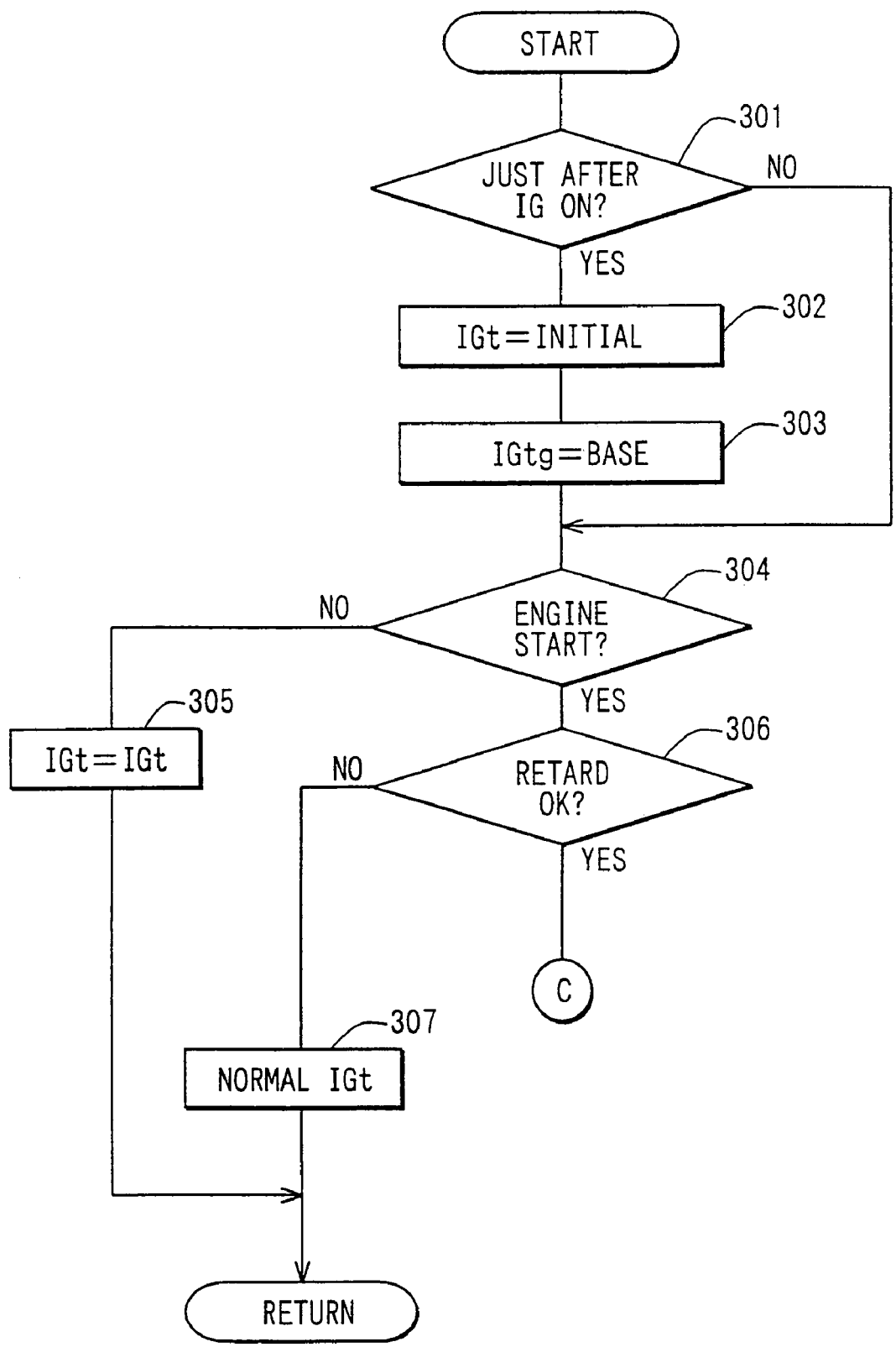
FIG. 12 is a flowchart showing the flow of processing of the ignition timing control program of a sixth embodiment.
Figure 13:
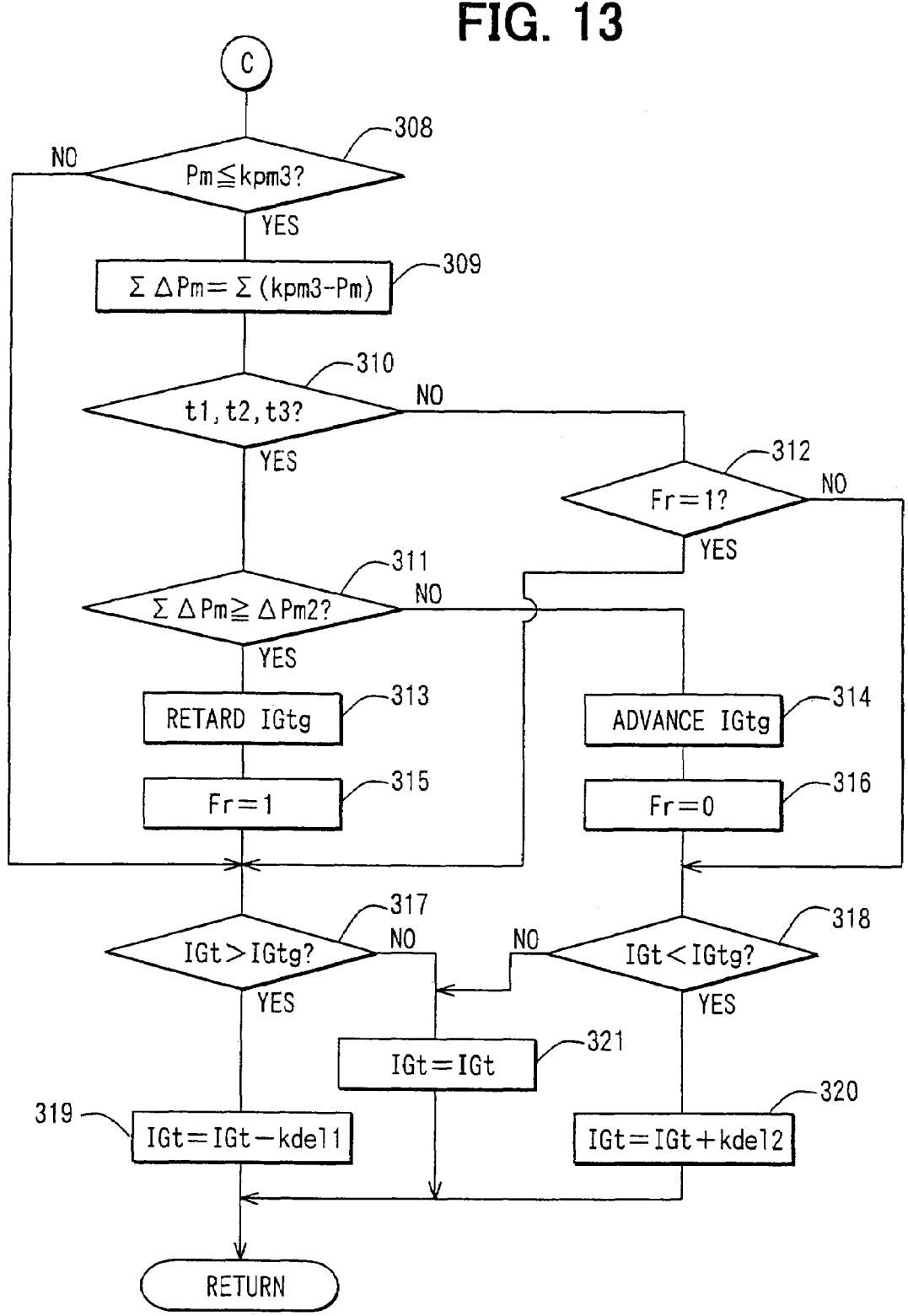
FIG. 13 is another flowchart showing the flow of processing of the ignition timing control program of the sixth embodiment.
Figure 14:
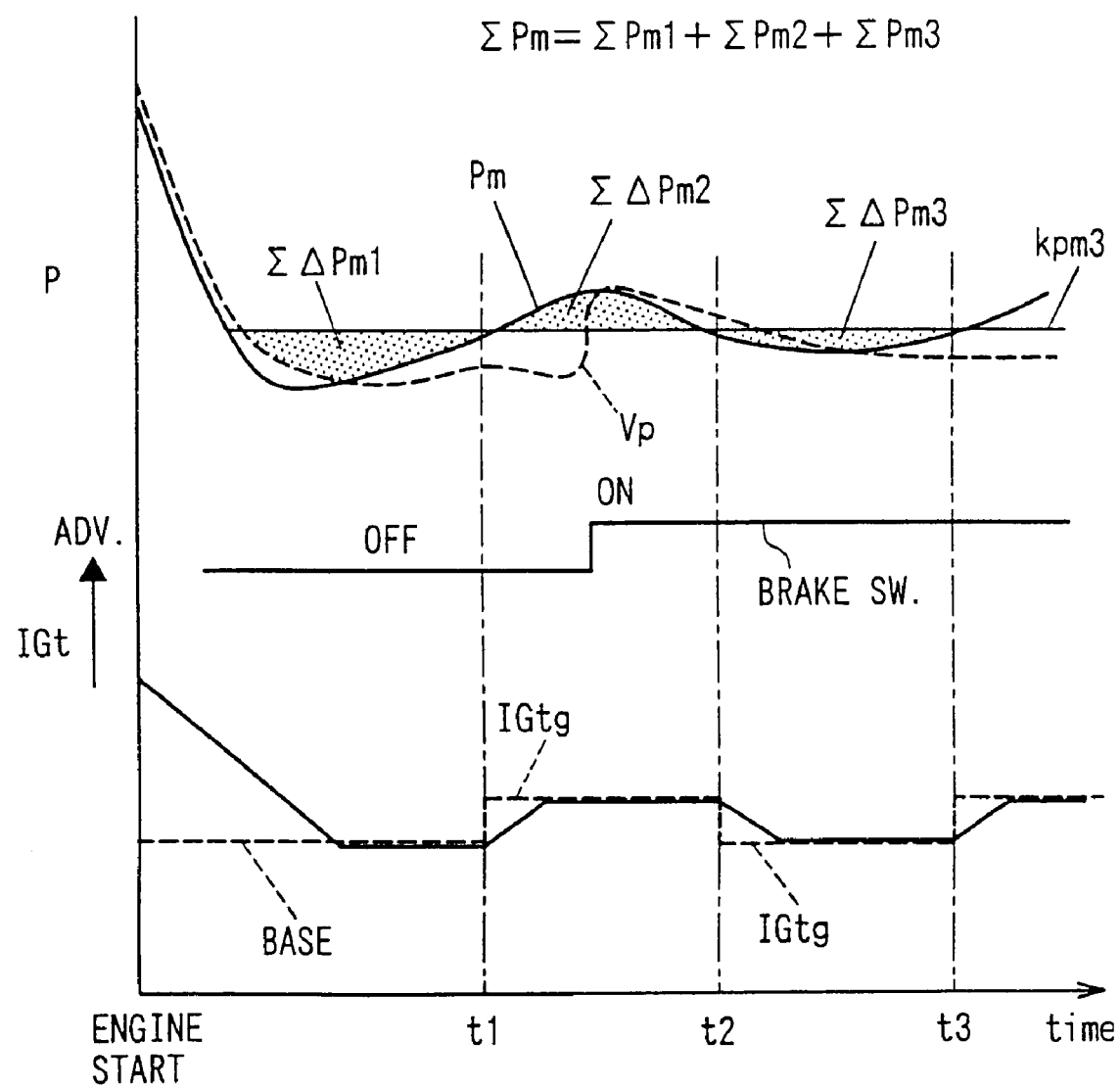
FIG. 14 is a time chart of typical ignition retarding control of the sixth embodiment.

In the case of a sixth embodiment of the present invention shown in FIGS. 12 to 14, a sum ΣΔPm of differences ΔPm between intake pipe negative pressures Pm detected by the intake pipe negative pressure sensor 18 and a predetermined value kpm3 is found and the sum ΣΔPm obtained so far is compared with a predetermined value ΔPm2 at predetermined determination timings t1, t2 and t3. If the sum ΣΔPm≧the predetermined value ΔPm2, a negative pressure Vp of the brake booster is determined to have been assured sufficiently. In this case, the ignition timing is corrected by being retarded. If the sum ΣΔPm<the predetermined value ΔPm2, on the other hand, a negative pressure Vp of the brake booster is determined to have not been assured sufficiently. In this case, the ignition timing is corrected by being advanced. The determination timings t1, t2 and t3 can each be a timing with which the intake pipe negative pressure Pm crosses the predetermined value kpm3 or can be timings taken at predetermined intervals.

In an example shown in FIG. 14, with the first determination timing t1, a sum ΣΔPm1 is compared with the predetermined value and, with the second determination timing t2, (ΣΔPm1+ΣΔPm2) is compared with the predetermined value. By the same token, with the third determination timing t3, (ΣΔPm1+ΣΔPm2+ΣΔPm3) is compared with the predetermined value. As a result, with the first determination timing t1, the target ignition timing is subjected to advancing correction but, with the second determination timing t2, the target ignition timing is subjected to retarding correction. With the third determination timing t3, the target ignition timing is again subjected to advancing correction.

The ignition timing control executed by the sixth embodiment described above is implemented by execution of an ignition timing control program shown in FIGS. 12 and 13. The ignition timing control program is executed repeatedly at predetermined time intervals or predetermined crank angles. The program begins with a step 301 to determine whether an ignition switch shown in none of the figures has just been turned on. If the ignition switch has just been turned on, the flow of the routine goes on to a step 302 at which the ignition timing is set at an initial value. Then, at the next step 303, the target ignition timing is set at a base value. Subsequently, the flow of the routine goes on to a step 304 to determine whether the start of the engine has been completed. If the start of the engine has not been completed, the flow of the routine goes on to a step 305 at which the ignition timing is set at an immediately preceding ignition timing, which is the initial value in this case.

Thereafter, at a point time the start of the engine is completed, the flow of the routine goes on from the step 304 to a step 306 to determine whether conditions for execution of the ignition retarding control to heat the catalyst 31 at an early time are satisfied by adopting the same technique as the step 104 of the flowchart shown in FIG. 2. If the conditions for execution of the ignition retarding control to heat the catalyst 31 at an early time are not satisfied, the flow of the routine goes on to a step 307 at which the normal ignition timing control is executed.

If a determination result produced at the step 306 indicates that the conditions for execution of the ignition retarding control to heat the catalyst 31 at an early time are satisfied, on the other hand, the flow of the routine goes on to a step 308 of a flowchart shown in FIG. 13 to determine whether an intake pipe negative pressure Pm has decreased to a level equal to or lower than a predetermined value kpm3 since the start of the engine. Then, until the intake pipe negative pressure Pm decreases to a level equal to or lower than a predetermined value kpm3 since the start of the engine, the ignition timing is retarded toward a target ignition timing (a base value) by carrying out pieces of processing of steps 317, 319 and 321.

As the intake pipe negative pressure Pm decreases to a level equal to or lower than a predetermined value kpm3 since the start of the engine, the flow of the routine goes on from the step 308 to a step 309 to compute a sum ΣΔPm of differences ΔPm between intake pipe negative pressures Pm and a predetermined value kpm3. Then, the flow of the routine goes on to a step 310 to determine whether the present time coincides with a determination timing. If the present time coincides with a determination timing, the flow of the routine goes on to a step 311 to determine whether the sum ΣΔPm of differences ΔPm between intake pipe negative pressures Pm and the predetermined value kpm3 is at least equal to a predetermined value ΔPm2. If the determination result indicates that the sum ΣΔPm is at least equal to a predetermined value ΔPm2, a negative pressure of the brake booster is determined to have been assured sufficiently. In this case, the flow of the routine goes on to a step 313 at which the target ignition timing is corrected by being retarded by a predetermined retarding correction quantity. The retarding correction quantity can be set at a constant in order to make the processing simple or can be a variable found by using a map or a formula from the sum ΣΔPm.

At the next step 315, a retardation flag Fr is set at 1 to indicate that the retarding correction of the target ignition timing has been completed. Then, the ignition timing is retarded by a predetermined quantity kdel1 by carrying out the pieces of processing of the steps 317 and 319.

After the retarding correction of the target ignition timing, the determination result produced at the step 310 is NO till the next determination timing. With a determination result of NO, the flow of the routine goes on to a step 312 to determine whether the retardation flag Fr is set at 1 to indicate that the retarding correction of the target ignition timing has been completed. If the retardation flag Fr is set at 1 to indicate that the retarding correction of the target ignition timing has been completed, the flow of the routine goes on to a step 317 to determine whether the present ignition timing is advanced ahead of a target ignition timing obtained as a result of the retarding correction (Ignition timing)>(Target ignition timing). If the present ignition timing is advanced ahead of a target ignition timing obtained as a result of the retarding correction, the flow of the routine goes on to a step 319 at which the ignition timing is advanced by a predetermined quantity kdel1. In this way, the ignition timing is retarded by the predetermined quantity kdel1 each time this program is executed till the ignition timing reaches the target ignition timing obtained as a result of the retarding correction.

Then, after the ignition timing reaches the target ignition timing, the determination result produced at the step 317 is NO, causing the flow of the routine to go on to a step 321 at which the ignition timing is sustained at the immediately preceding ignition timing, which is the target ignition timing obtained as a result of the retarding correction in this case.

If the determination result produced at the step 311 indicates that the sum ΣΔPm of differences ΔPm between intake pipe negative pressures Pm and the predetermined value kpm3 is smaller than the predetermined value ΔPm2, on the other hand, a negative pressure of the brake booster is determined to have not been assured sufficiently. In this case, the flow of the routine goes on to a step 314 at which the target ignition timing is corrected by being advanced by a predetermined advancing correction quantity. The advancing correction quantity can be set at a constant in order to make the processing simple or can be a variable found by using a map or a formula from the sum $\Sigma\Delta Pm$.

At the next step 316, the retardation flag Fr is reset to 0 to indicate that the advancing correction of the target ignition timing has been completed. Then, the ignition timing is advanced by a predetermined quantity kdel2 by carrying out pieces of processing of steps 318 and 320.

After the advancing correction of the target ignition timing, the determination results produced at the steps 310 and 312 are both NO till the next determination timing. With determination results of NO, the flow of the routine goes on to a step 318 to determine whether the present ignition timing is retarded behind a target ignition timing obtained as a result of the advancing correction (Ignition timing)<(Target ignition timing). If the present ignition timing is retarded behind the target ignition timing obtained as a result of the advancing correction, the flow of the routine goes on to a step 320 at which the ignition timing is advanced by a predetermined quantity kdel2. In this way, the ignition timing is advanced by the predetermined quantity kdel2 each time this program is executed till the ignition timing reaches the target ignition timing obtained as a result of the advancing correction.

Then, after the ignition timing reaches the target ignition timing, the determination result produced at the step 318 is NO, causing the flow of the routine to go on to the step 321 at which the ignition timing is sustained at the immediately preceding ignition timing, which is the target ignition timing obtained as a result of the advancing correction in this case.

In the case of the fifth embodiment described above, for a sum $\Sigma\Delta Pm$ of differences $\Delta Pm$ between intake pipe negative pressures Pm and the predetermined value kpm3 smaller than the predetermined value $\Delta Pm2$, a proper negative pressure of the brake booster is determined to be not assured sufficiently. In this case, the ignition timing is corrected by being advanced, and the intake pipe negative pressure Pm is reduced. For a sum $\Sigma\Delta Pm$ of differences $\Delta Pm$ between intake pipe negative pressures Pm and the predetermined value kpm3 greater than the predetermined value $\Delta Pm2$, on the other hand, a proper negative pressure of the brake booster is determined to be assured sufficiently. In this case, the ignition timing is corrected by being retarded so that the temperature of exhausted gas rises. As a result, it is possible to shorten the time it takes to heat the catalyst while assuring a negative pressure of the brake booster.

It should be noted that, in place of the sum $\Sigma\Delta Pm$ of differences $\Delta Pm$ between intake pipe negative pressures Pm and the predetermined value kpm3, a sum of differences between the negative pressures of the brake booster and a predetermined value can also be used. In this case, the negative pressure of the brake booster can be a detected or estimated value. Moreover, the retardation speed can also be changed in accordance with the sum.

Seventh Embodiment

Figure 15:
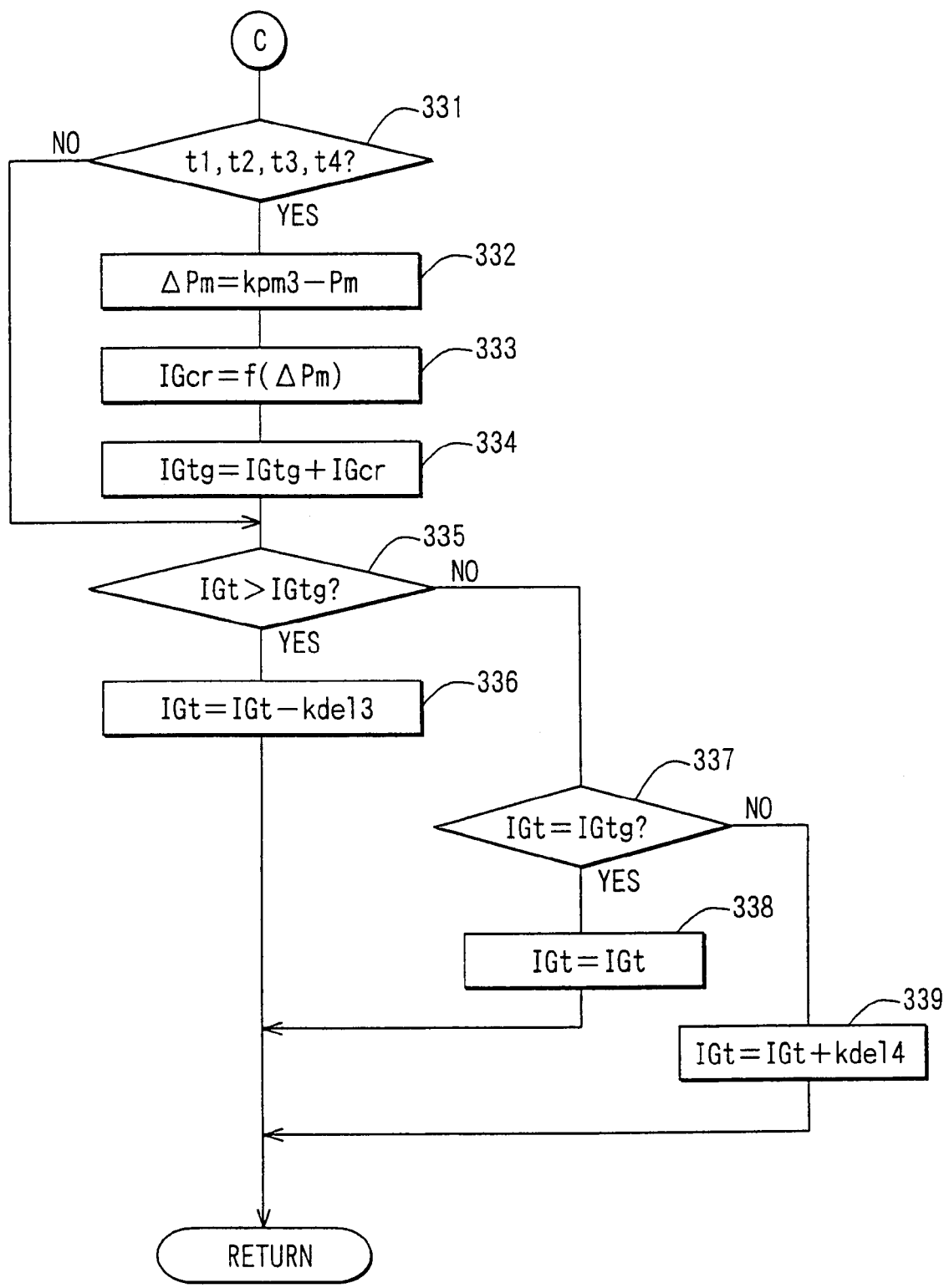
FIG. 15 is a flowchart showing the flow of processing of the ignition timing control program of a seventh embodiment.
Figure 16:
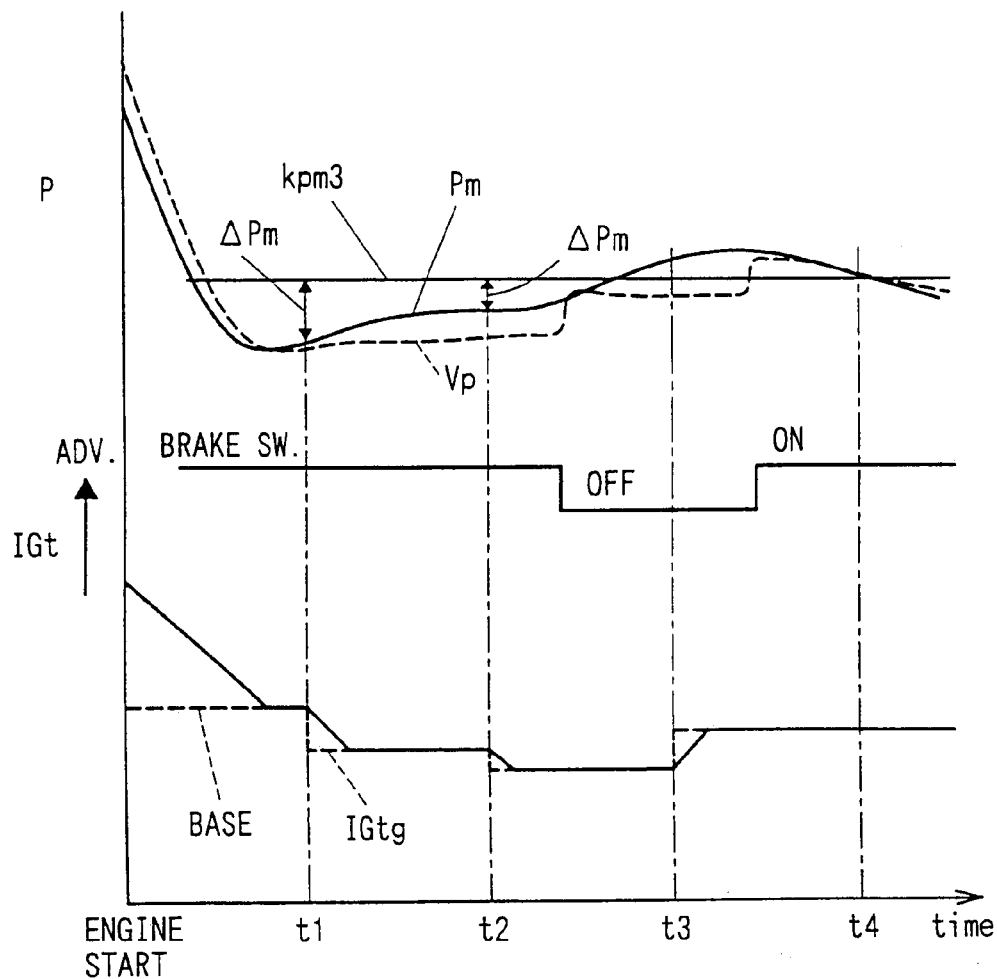
FIG. 16 is a time chart of typical ignition retarding control of the seventh embodiment.
Figure 17:
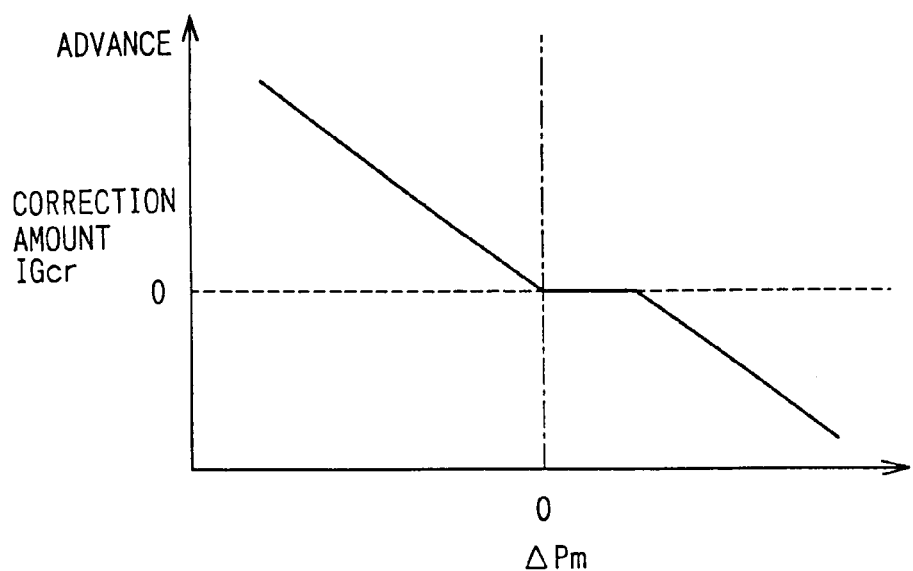
FIG. 17 is a diagram conceptually showing a typical map for finding a correction quantity of a target ignition timing for a difference ΔPm between an intake pipe negative pressure Pm and a predetermined value kpm3 in the seventh embodiment.

In the case of a seventh embodiment of the present invention shown in FIGS. 15 to 17, a difference $\Delta Pm$ (=kpm3−Pm) between the intake pipe negative pressure Pm detected by the intake pipe negative pressure sensor 18 and a predetermined value kpm3 is found at predetermined determination timings t1, t2, t3 and t4. The target ignition timing's correction quantity for the difference $\Delta Pm$ is found from a map shown in FIG. 17. An immediately preceding target ignition timing is corrected by using the correction quantity. The determination timings t1, t2, t3 and t4 can be timings taken at predetermined intervals, or can each be a timing after the lapse of a predetermined time since an on/off changeover of a brake switch 29 or a timing with which |$\Delta Pm$| exceeds a predetermined value.

The target ignition timing correction map shown in FIG. 17 is characterized in that, in a range of $\Delta Pm$ negative values, a proper negative pressure of the brake booster is determined to be not assured sufficiently. In this case, the correction quantity of the target ignition timing toward the advanced side increases in proportion to the value of |$\Delta Pm$|. A large correction quantity results in a larger decrease in intake pipe negative pressure Pm. In a range of $\Delta Pm$ positive values smaller than a predetermined value, a proper negative pressure of the brake booster is determined to be assured sufficiently. In this case, the target ignition timing is not corrected. In a range of $\Delta Pm$ positive values greater than a predetermined value, the intake pipe negative pressure Pm (or the negative pressure of the brake booster) decreases too much so that, even if the intake pipe negative pressure Pm slightly increases, a proper negative pressure of the brake booster is determined to be still assurable. The correction quantity of the target ignition timing toward the retarded side increases in proportion to the value of $\Delta Pm$. A large correction quantity enhances the catalyst heating effect.

The ignition timing control executed by the seventh embodiment described above is implemented by execution of an ignition timing control program shown in FIGS. 12 and 15. The processing carried out at the steps 301 to 307 of the program of FIG. 12 for the sixth embodiment is also carried out in the seventh embodiment in the same way.

In the case of the seventh embodiment, if the conditions for execution of the ignition retarding control to heat the catalyst 31 at an early time are satisfied, the flow of the routine goes on to a step 331 to determine whether the present time coincides with a determination timing. If the present time coincides with a determination timing, the flow of the routine goes on to a step 332 to compute a difference $\Delta Pm$ (=kpm3−Pm) between the intake pipe negative pressure Pm detected by the intake pipe negative pressure sensor 18 and a predetermined value kpm3. Then, at the next step 333, an ignition timing correction map shown in FIG. 17 is searched for a correction quantity for the difference $\Delta Pm$. Subsequently, at the next step 334, the immediately preceding ignition timing is corrected by using the correction quantity (Target ignition timing=Immediately preceding ignition timing+Correction quantity).

Then, the flow of the routine goes on to a step 335 to determine whether the present ignition timing is advanced ahead of the target ignition timing (Ignition timing>Target ignition timing). If the present ignition timing is advanced ahead of the target ignition timing, the flow of the routine goes on to a step 336 at which the ignition timing is retarded by a predetermined quantity kdel3. In this way, the ignition timing is retarded by the predetermined quantity kdel3 each time this program is executed till the ignition timing reaches the target ignition timing.

If the determination result produced at the step 335 indicates that the relation (Ignition timing>Target ignition timing) does not hold true, on the other hand, the flow of the routine goes on to a step 337 to determine whether the present ignition timing matches the target ignition timing. If the present ignition timing matches the target ignition timing, the flow of the routine goes on to a step 338 at which the ignition timing is sustained at the immediately preceding ignition timing, which is the target ignition timing.

If the determination results produced at the steps 335 and 337 are both NO indicating that the present ignition timing is retarded behind the target ignition timing (Ignition timing<Target ignition timing), on the other hand, the ignition timing is advanced by a predetermined quantity kdel4. In this way, the ignition timing is advanced by the predetermined quantity kdel4 each time this program is executed till the ignition timing reaches the target ignition timing.

In the case of the seventh embodiment explained above, the target ignition timing is corrected in accordance with a difference ΔPm between the intake pipe negative pressure Pm and the predetermined value kpm3. Thus, it is possible to correct the target ignition timing by advancing the target ignition timing to a value in a range allowing a proper negative pressure of the brake booster to be assured while, at the same time, shortening the catalyst heating period.

It should be noted that, in place of a difference ΔPm between intake pipe negative pressure Pm and the predetermined value kpm3, a difference between the negative pressure of the brake booster and a predetermined value can also be used. In this case, the negative pressure of the brake booster can be a detected or estimated value. Moreover, the retardation speed can also be changed in accordance with the difference.

As an alternative, a correction quantity of the target ignition timing is found in accordance with an intake pipe negative pressure Pm or a negative pressure of the brake booster, and the immediately preceding target ignition timing is corrected by using the correction quantity.

Eighth Embodiment

Figure 18:
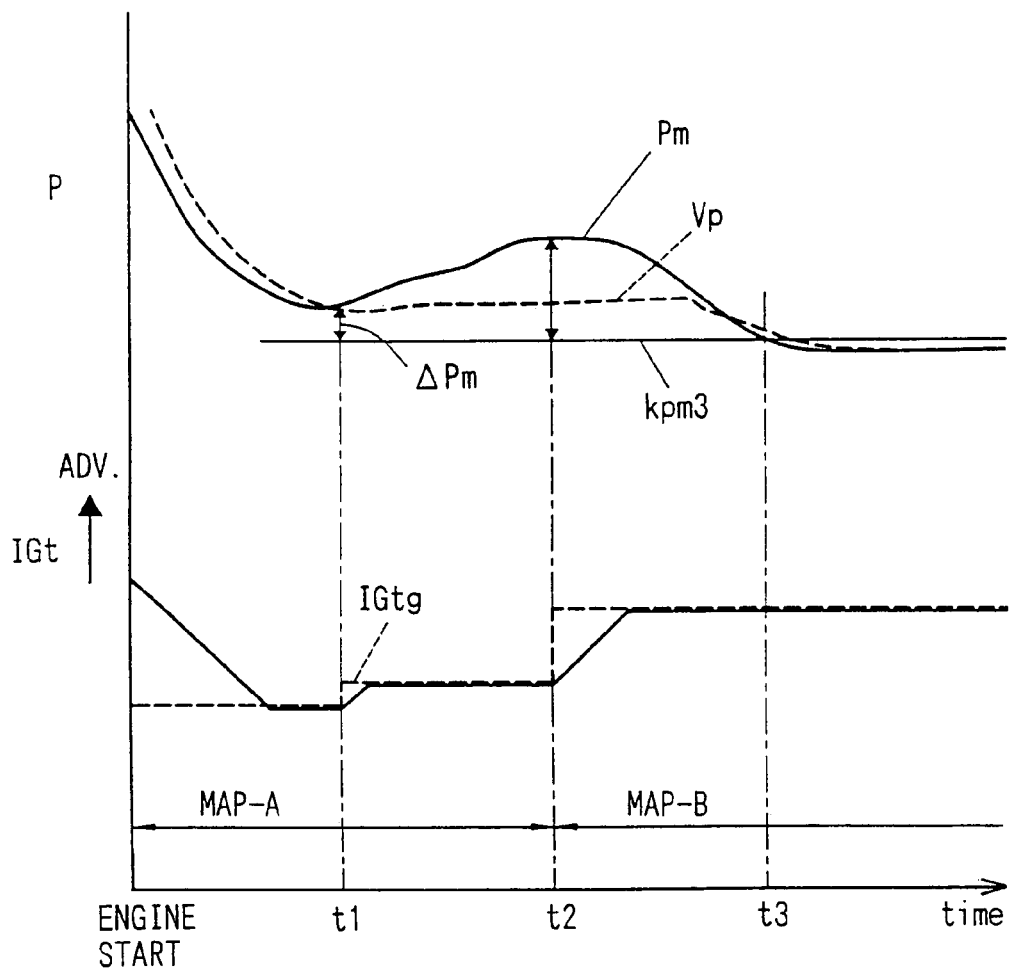
FIG. 18 is a time chart of typical ignition retarding control of an eighth embodiment.
Figure 19:
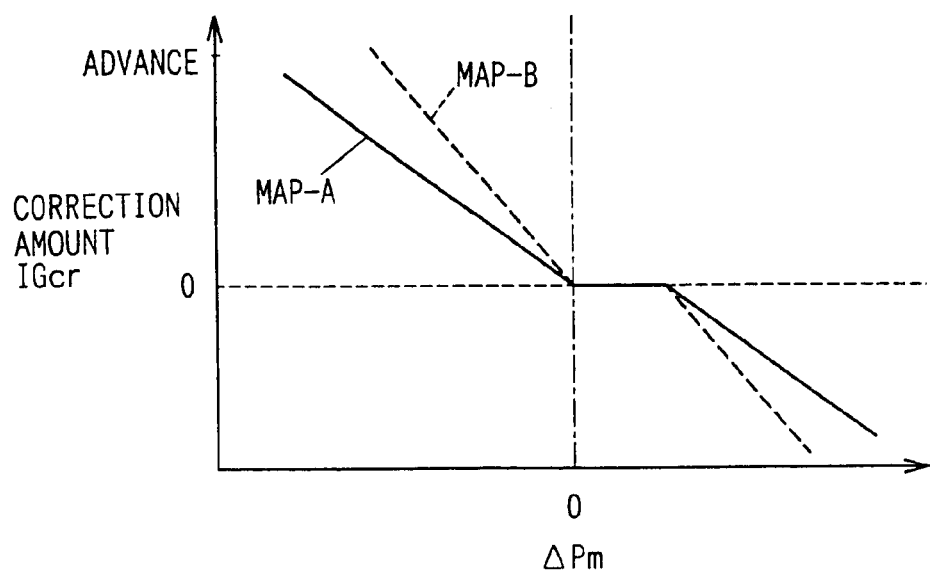
FIG. 19 is a diagram conceptually showing a typical map for finding a correction quantity of a target ignition timing for a difference ΔPm between an intake pipe negative pressure Pm and a predetermined value kpm3 in the eighth embodiment.

In the case of an eighth embodiment of the present invention shown in FIGS. 18 and 19, a difference ΔPm (=kpm3−Pm) between the intake pipe negative pressure Pm detected by the intake pipe negative pressure sensor 18 and a predetermined value kpm3 is found at predetermined determination timings t1, t2 and t3. Initially, the target ignition timing's correction quantity for the difference ΔPm is found from map A shown in FIG. 19. Then, if the intake pipe negative pressure Pm does not decrease to a level equal to or lower than the predetermined value kpm3 since the start of the engine even though processing to correct the target ignition timing by using map A has been carried out a predetermined number of times, map B is used to find the target ignition timing's correction quantity for the difference ΔPm. Map B provides a correction quantity greater than that provided by map A. The rest is the same as the seventh embodiment.

In the case of the eighth embodiment explained above, if the intake pipe negative pressure Pm does not decrease to a level equal to or lower than the predetermined value kpm3 since the start of the engine even though processing to correct the target ignition timing by using map A has been carried out a predetermined number of times, map B is used to find the target ignition timing's larger correction quantity for the difference ΔPm. Thus, even for a case in which it is difficult for the intake pipe negative pressure Pm or the negative pressure of the brake booster to decrease to a proper level for some reasons, the intake pipe negative pressure Pm or the negative pressure of the brake booster can be decreased to the proper level in a short period of time by switching to map B.

It should be noted that, in place of map B shown in FIG. 19, a correction quantity found from map A can also be multiplied by a raising coefficient (>1) or a predetermined quantity can also be added to a correction quantity found from map A.

Ninth Embodiment

Figure 20:
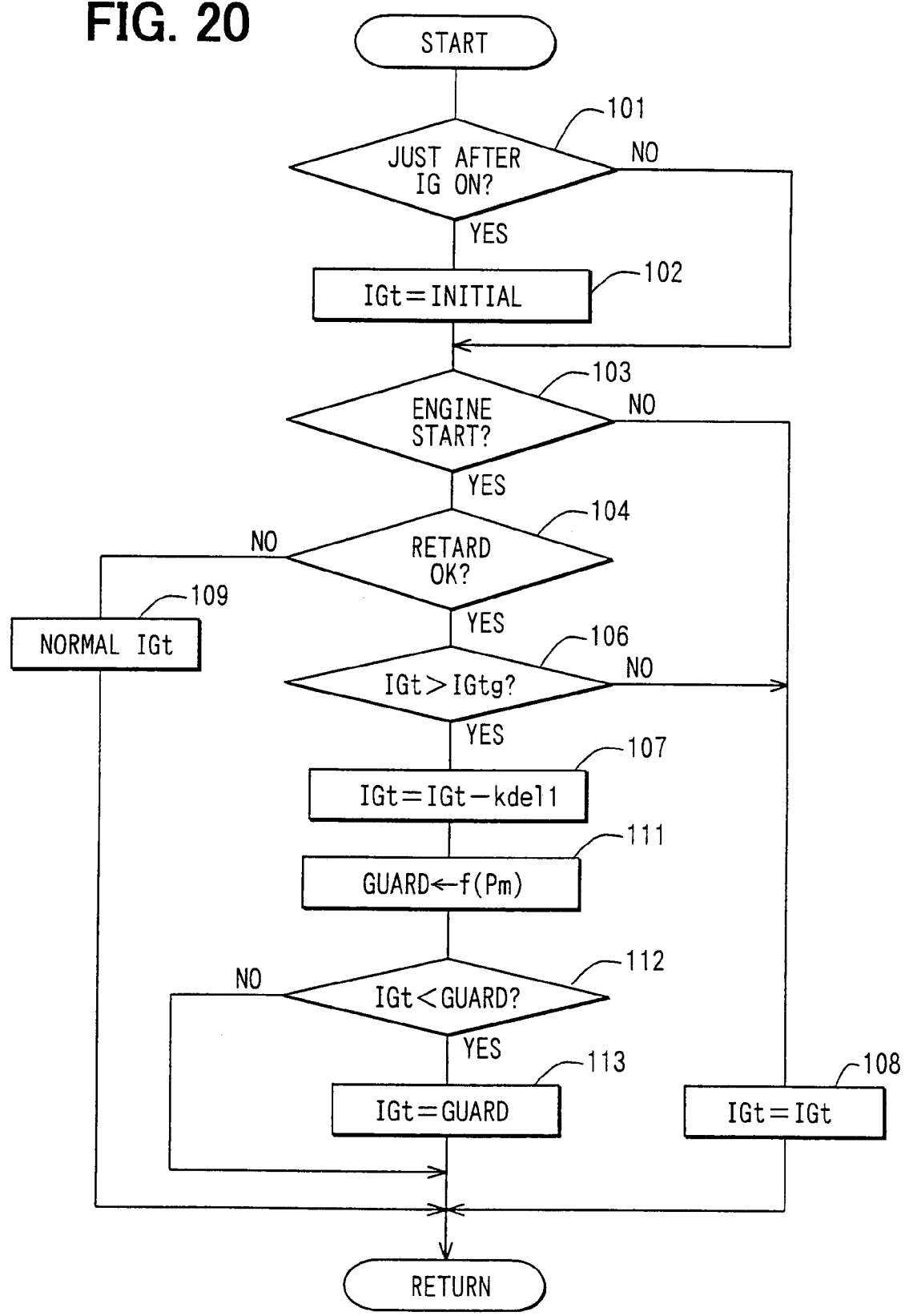
FIG. 20 is a flowchart showing the flow of processing of the ignition timing control program of a ninth embodiment.
Figure 21:
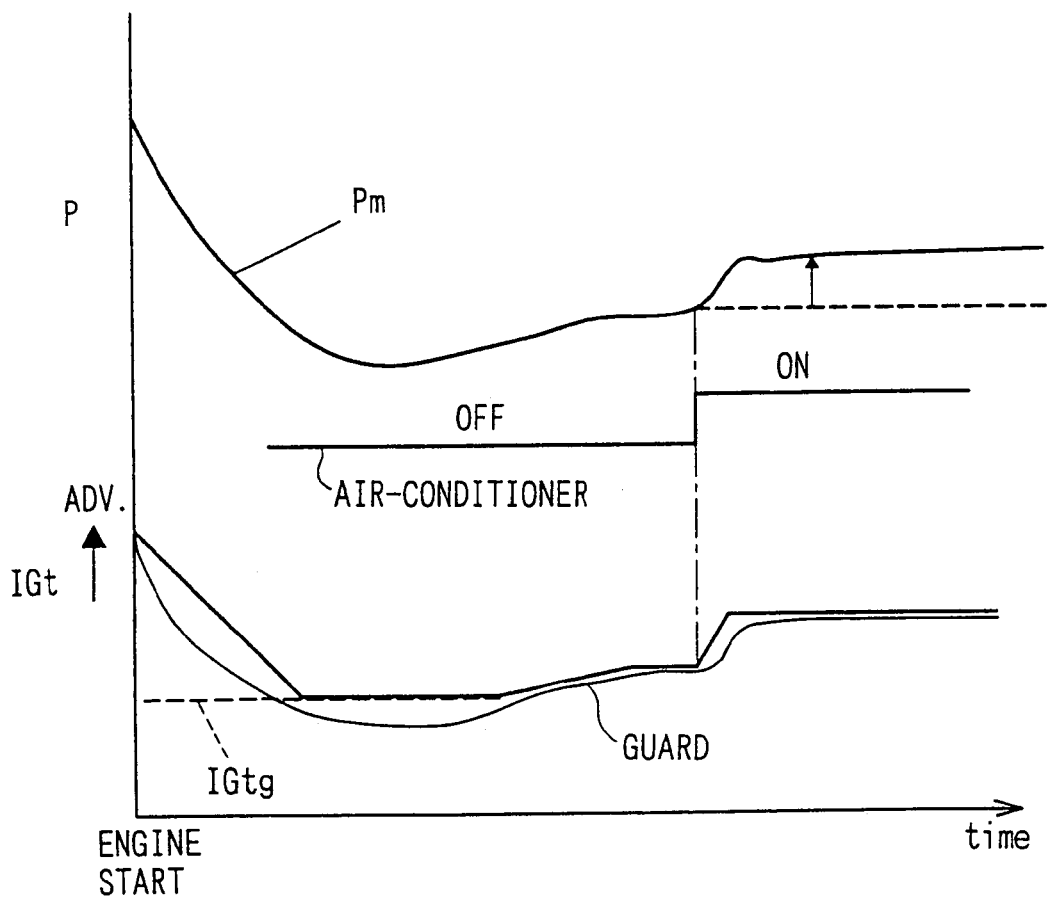
FIG. 21 is a time chart of typical ignition retarding control of the ninth embodiment.
Figure 22:
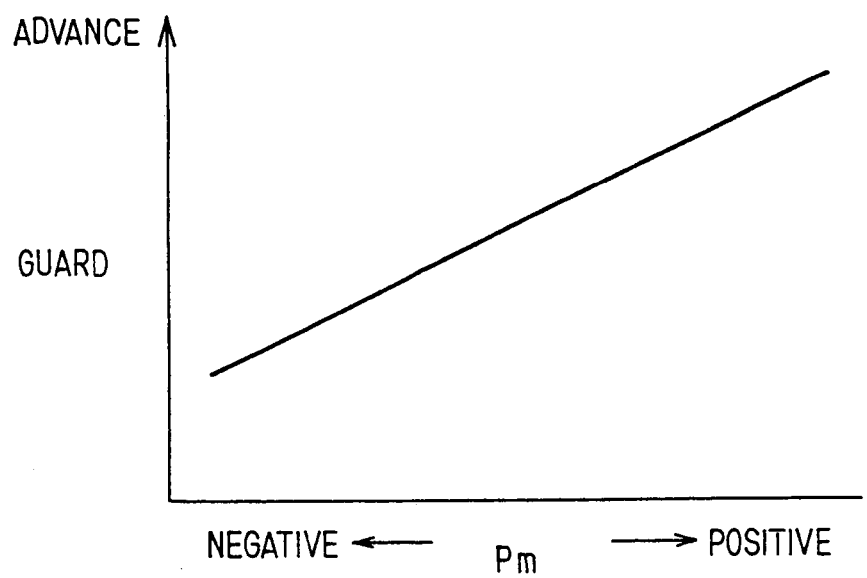
FIG. 22 is a diagram conceptually showing a typical map for finding a retarding side guard value for an intake pipe negative pressure Pm in the ninth embodiment.

In the case of a ninth embodiment of the present invention shown in FIGS. 20 to 22, a retardation side guard value of a control range of the ignition timing is found for an intake pipe negative pressure Pm detected by the intake pipe negative pressure sensor 18 from a map shown in FIG. 22. The map shown in FIG. 22 is characterized in that, the closer the intake pipe negative pressure Pm to the atmospheric pressure, the closer to the advance side the value at which the retardation side guard value is set. Thus, the more insufficient the intake pipe negative pressure Pm (or the negative pressure of the brake booster), the closer to the advance side the retardation side guard value and, hence, the closer to the advance side the value at which the ignition timing is set to lower the intake pipe negative pressure Pm (or the negative pressure of the brake booster). If the intake pipe negative pressure Pm (or the negative pressure of the brake booster) decreases too much so that a proper negative pressure of the brake booster is determined to be still assurable even if the intake pipe negative pressure Pm slightly increases, on the other hand, a value close to the retardation side is selected as the retardation side guard value to allow the ignition timing to be set on the retardation side and, thus, the catalyst heating effect to be enhanced.

The ignition timing control executed by the ninth embodiment described above is implemented by execution of an ignition timing control program shown in FIG. 20. The ignition timing control program is executed repeatedly at predetermined time intervals or predetermined crank angles. Pieces of processing carried out at steps 101 to 104, 108 and 109 are the same as those of respectively the steps 101 to 104, 108 and 109 of program of the first embodiment shown in FIG. 2.

If the determination result produced at the step 104 indicates that the conditions for execution of the ignition retarding control to heat the catalyst 31 at an early time are satisfied after a start of the engine, the flow of the routine goes on to a step 106 to determine whether the present ignition timing is advanced ahead of the target ignition timing (Ignition timing>Target ignition timing). If the present ignition timing is advanced ahead of the target ignition timing, the flow of the routine goes on to a step 107 at which the ignition timing is retarded by a predetermined quantity kdel.

At the next step 111, a retardation side guard value of a control range of the ignition timing is found for an intake pipe negative pressure Pm detected by the intake pipe negative pressure sensor 18 from a map shown in FIG. 22. Then, the flow of the routine goes on to a step 112 to determine whether the ignition timing obtained as a result of the retarding correction carried out at the step 107 is retarded behind the retardation side guard value (Ignition timing<Retardation side guard value). If the ignition timing is retarded behind the retardation side guard value, the flow of the routine goes on to a step 113 at which the ignition timing is set at the retardation side guard value. If the determination result produced at the step 107 indicates that the ignition timing obtained as a result of the retarding correction is not retarded behind the retardation side guard value, on the other hand, the ignition timing is used.

In the case of the ninth embodiment explained above, a retardation side guard value is found for an intake pipe negative pressure Pm. Thus, a retardation quantity for an intake pipe negative pressure Pm (or a negative pressure of the brake booster) can be subjected to guard processing to produce a desirable value. As a result, it is possible to assure a negative pressure of the brake booster at an early time while reducing the exhaust emission at a start of the engine at the same time.

It should be noted that, a retardation side guard value can also be found on the basis of a negative pressure of the brake booster in place of an intake pipe negative pressure Pm. In this case, the negative pressure of the brake booster can be a detected or estimated value.

In addition, as shown in FIG. 21, due to the fact that the intake pipe negative pressure Pm increases when a load of auxiliary equipment such as an air conditioner rises, a retardation side guard value can also be found on the basis of a load of auxiliary equipment such as an air conditioner (or a load borne by the engine).

Tenth Embodiment

Figure 23:
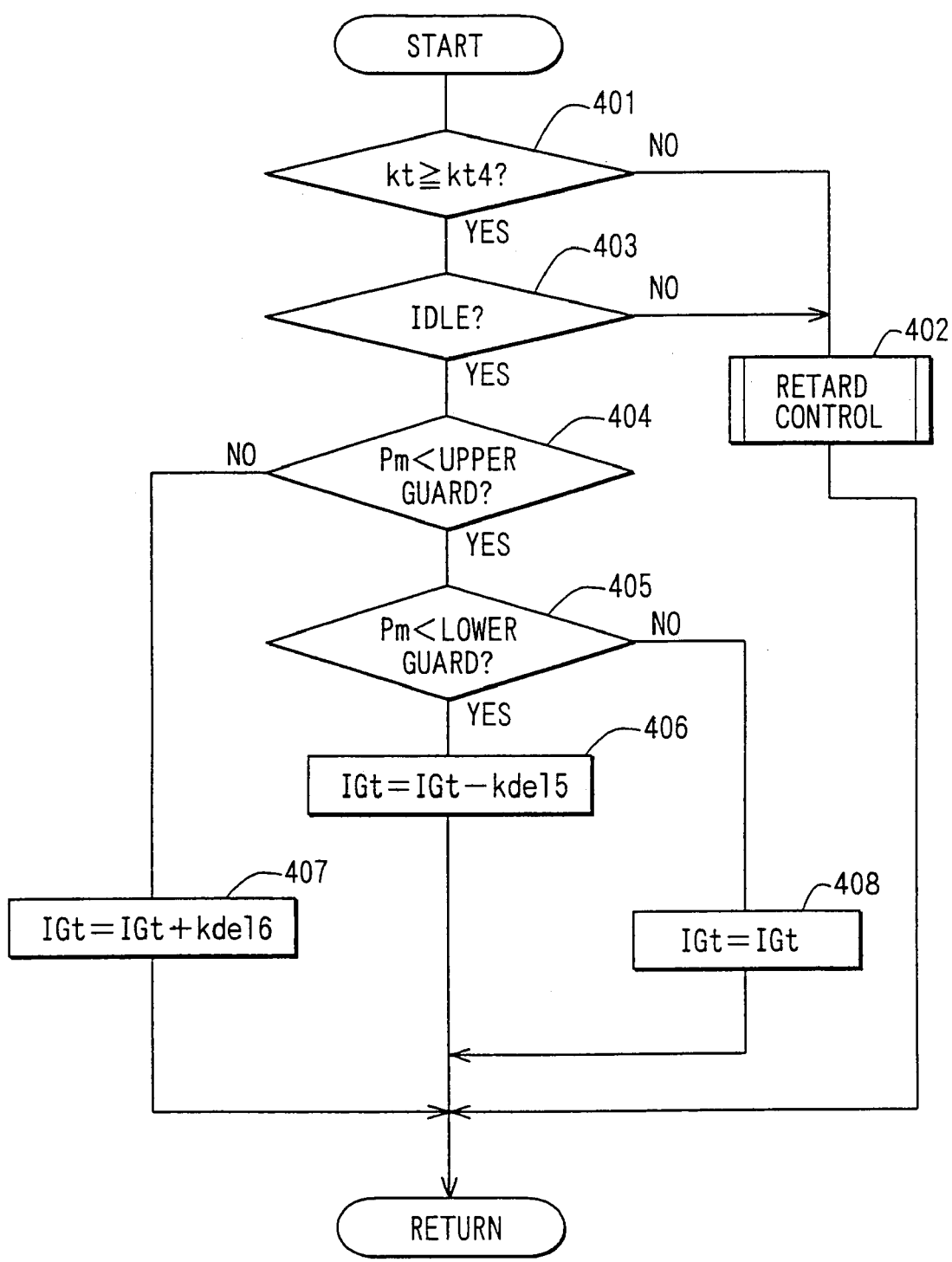
FIG. 23 is a flowchart showing the flow of processing of the ignition timing control program of a tenth embodiment.
Figure 24:
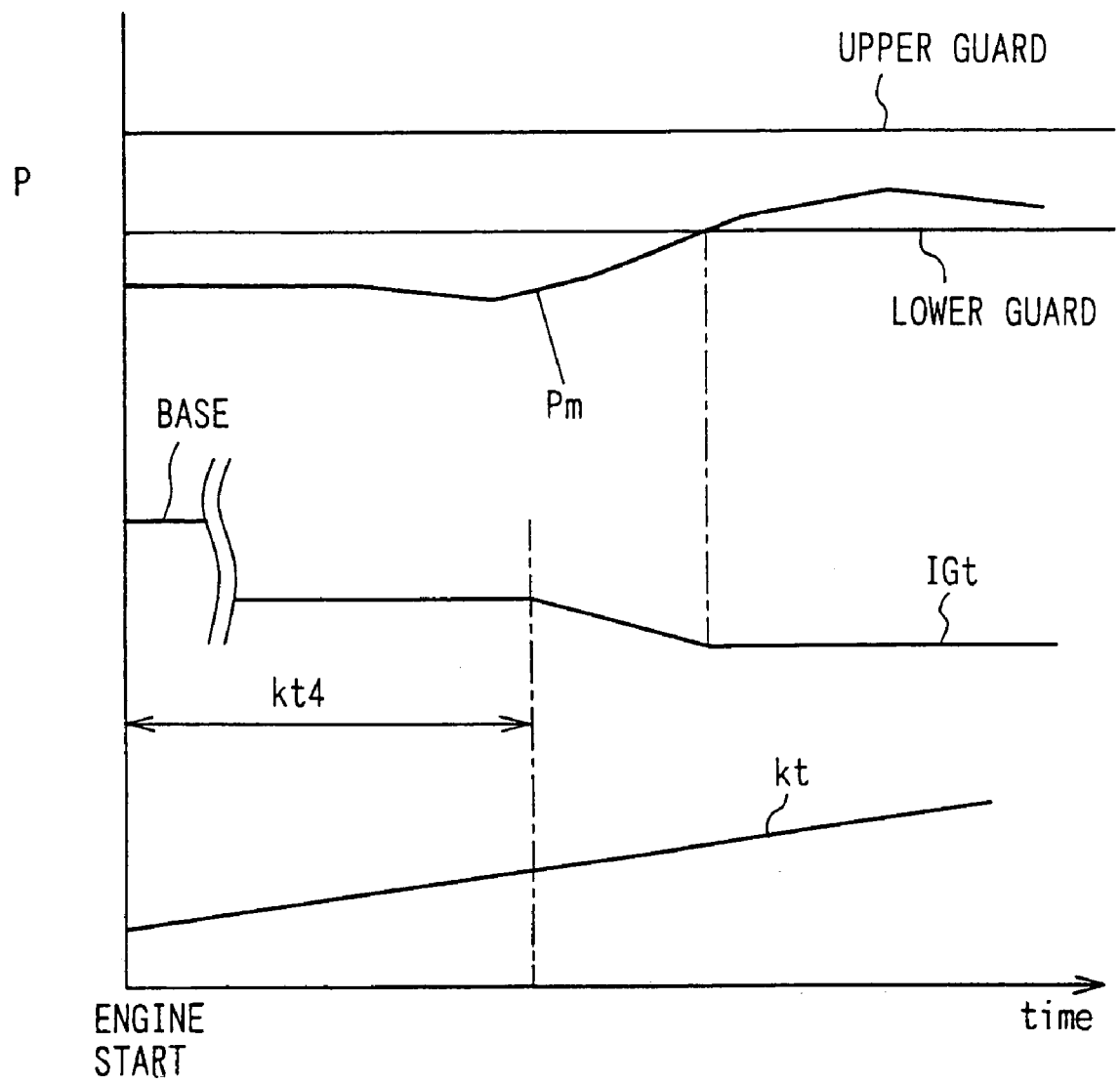
FIG. 24a is time chart of typical ignition retarding control of the tenth embodiment.

In the case of a tenth embodiment of the present invention shown in FIGS. 23 and 24, it is not until a predetermined time kt4 has lapsed since a start of the engine that the normal ignition retarding control to heat the catalyst at an early time is executed. If the engine operating state is an idle state after the predetermined time has lapsed since a start of the engine, the ignition timing is retarded or advanced so that the intake pipe negative pressure Pm converges to a range between an upper limit guard value and a lower limit guard value. The upper limit guard value and the lower limit guard value correspond to respectively the upper and lower limits of a range of intake pipe negative pressures Pm at which a proper negative pressure of the brake booster can be assured. Typically, the upper limit guard value and the lower limit guard value are found by simulation or by conducting an experiment. In addition, the ignition retarding control executed during the predetermined time beginning at a start of the engine can be the conventional control to retard ignition or the ignition retarding control executed by any one of the embodiments described so far.

The ignition timing control executed by the tenth embodiment described above is implemented by execution of an ignition timing control program shown in FIG. 23. The ignition timing control program is executed repeatedly at predetermined time intervals or predetermined crank angles. When activated, the program begins with a step 401 to determine whether a predetermined time has lapsed since a start of the engine. If the predetermined time has not lapsed since a start of the engine, the flow of the routine goes on to a step 402 at which the normal ignition retarding control is executed to heat the catalyst at an early time.

As the predetermined time lapses since a start of the engine, the flow of the routine goes on to a step 403 to determine whether the engine operating state is an idle state. If the engine operating state is not an idle state, the flow of the routine goes on to the step 402 at which the normal ignition retarding control is executed. If the conditions for execution of the ignition retarding control are not satisfied, however, the ignition retarding control is not executed.

If the engine operating state is an idle state after the predetermined time has lapsed since a start of the engine, on the other hand, the flow of the routine goes on to a step 404 to determine whether an intake pipe negative pressure Pm detected by the intake pipe negative pressure sensor 18 is lower than the upper limit guard value. If the intake pipe negative pressure Pm is equal to or higher than the upper limit guard value, reduction of the intake pipe negative pressure (or the negative pressure of the brake booster) is determined to be insufficient. In this case, the flow of the routine goes on to a step 407 at which the ignition timing is advanced by a predetermined quantity kdel6. In this way, the ignition timing is advanced by the predetermined quantity kdel6 each time this program is executed till the intake pipe negative pressure Pm becomes lower than the upper limit guard value.

If the determination result produced at the step 404 indicates that the intake pipe negative pressure Pm is lower than the upper limit guard value, on the other hand, the flow of the routine goes on to a step 405 to determine whether the intake pipe negative pressure Pm is lower than the lower limit guard value. If the intake pipe negative pressure Pm is lower than the lower limit guard value, reduction of the intake pipe negative pressure (or the negative pressure of the brake booster) is determined to be too much. In this case, the flow of the routine goes on to a step 406 at which the ignition timing is retarded by a predetermined quantity kdel5. In this way, the ignition timing is retarded by the predetermined quantity kdel5 each time this program is executed till the intake pipe negative pressure Pm becomes at least equal to the lower limit guard value.

If the intake pipe negative pressure Pm is in the range between the upper limit guard value and the lower limit guard value, the flow of the routine goes on to a step 408 at which the ignition timing is sustained at an immediately preceding ignition timing.

In the case of the tenth embodiment described above, if the engine operating state is an idle state after the predetermined time has lapsed since a start of the engine, the ignition timing is retarded or advanced so that the intake pipe negative pressure Pm converges to a range between an upper limit guard value and a lower limit guard value. Thus, the retardation quantity of the ignition timing can be reduced to a value in a range allowing a negative pressure of the brake booster to be assured. As a result, it is possible to assure a negative pressure of the brake booster while, at the same time, shortening the catalyst heating period.

It should be noted that, the ignition timing can also be retarded or advanced so that the intake pipe negative pressure Pm converges to a range between an upper limit guard value and a lower limit guard value on the basis of a negative pressure of the brake booster in place of an intake pipe negative pressure Pm. In this case, the negative pressure of the brake booster can be a detected or estimated value.

The first to tenth embodiments described above can be applied not only to a direct injection engine, but also an intake port injection engine.

Eleventh Embodiment

An eleventh embodiment of the present invention are explained by referring to diagrams as follows.

Figure 25:
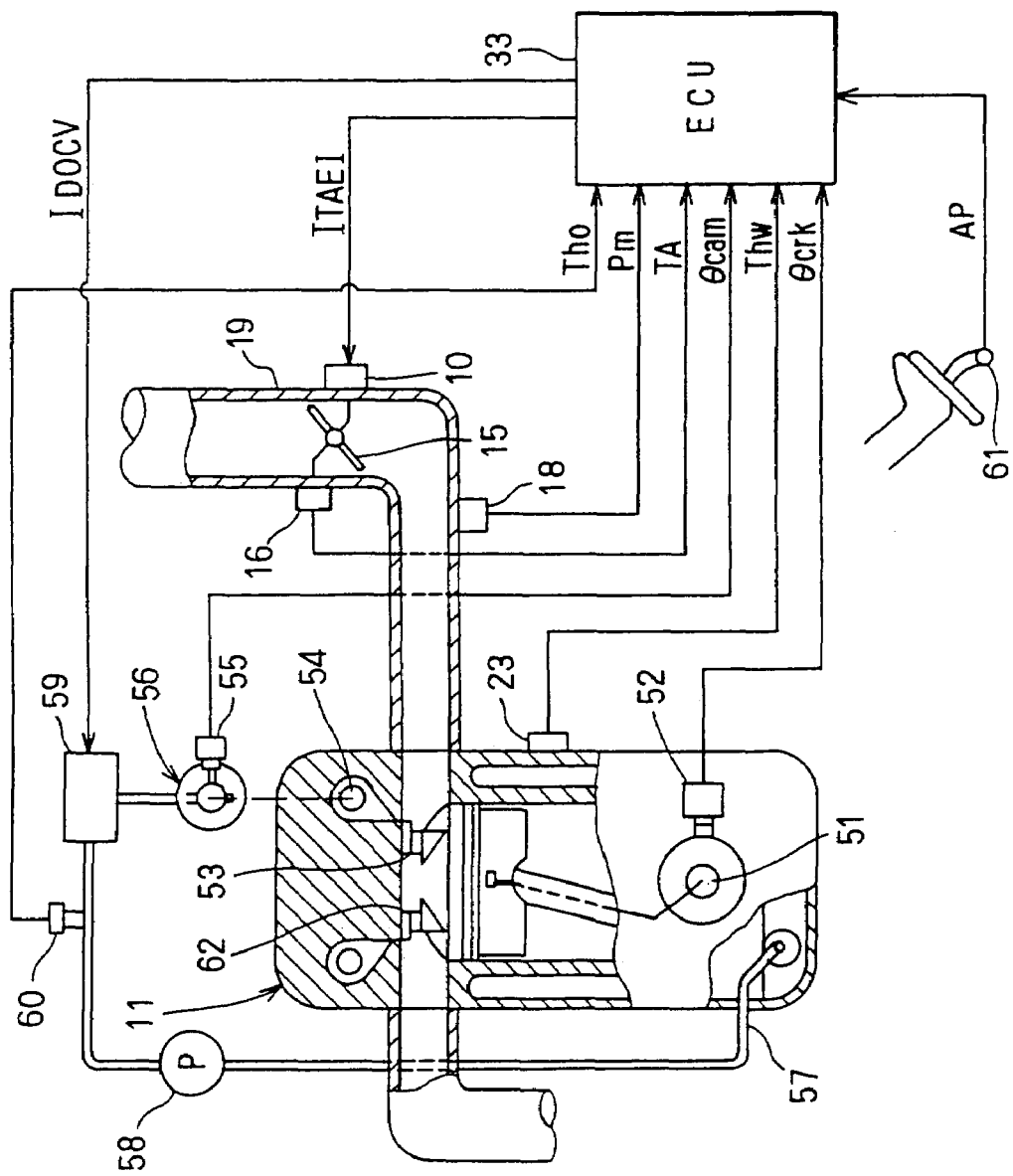
FIG. 25 is a diagram showing the configuration of an eleventh embodiment of the present invention.

FIG. 25 is a diagram showing a configuration of a double head cam internal combustion engine, which employs the internal combustion engine's valve timing control apparatus implemented by an embodiment of the present invention, and its peripherals. Components identical with or equivalent to those shown in FIG. 1 are denoted by the same reference numerals as the latter and their explanation is not repeated.

As shown in FIG. 25, there is provided a crank angle sensor 52 for detecting a signal representing a turning angle θcrk of a crank shaft 51, which functions as the driving shaft of an internal combustion engine 11. There is also provided a cam angle sensor 55 for detecting a signal representing a turning angle θcam of a cam shaft 54, which functions as the driven shaft of the internal combustion engine 11. The driven shaft is a shaft on the side close to an intake valve 53. On the cam shaft 54, a variable valve timing adjustment unit (VVT) 56 is provided. Oil pressed by a pump 58 is supplied to the VVT 56 through a pipe 57. A temperature Tho of the oil is detected by a sensor 60. The oil is controlled by an oil control valve (OCV) 59.

Instead of using an intake air pressure sensor 18, an intake air pressure can also be computed from an engine speed Ne and an intake airflow signal detected typically by an airflow meter. There is also provided an accelerator position sensor 61 for detecting an accelerator position AP representing an accelerator depression quantity. The engine 11 has an exhaust valve 62.

An ECU (Electronic Control Unit) 33 receives a cooling water temperature Thw, a throttle angle TA, an intake pressure Pm, an oil temperature Tho, an accelerator position AP, a turning angle θcrk and a turning angle θcam. On the other hand, the ECU 33 outputs a driving signal IDOCV based on a duty ratio control value DOCV of the OCV 59 and outputs a driving signal ITAEX based on an output throttle angle TAEX.

Figure 26:
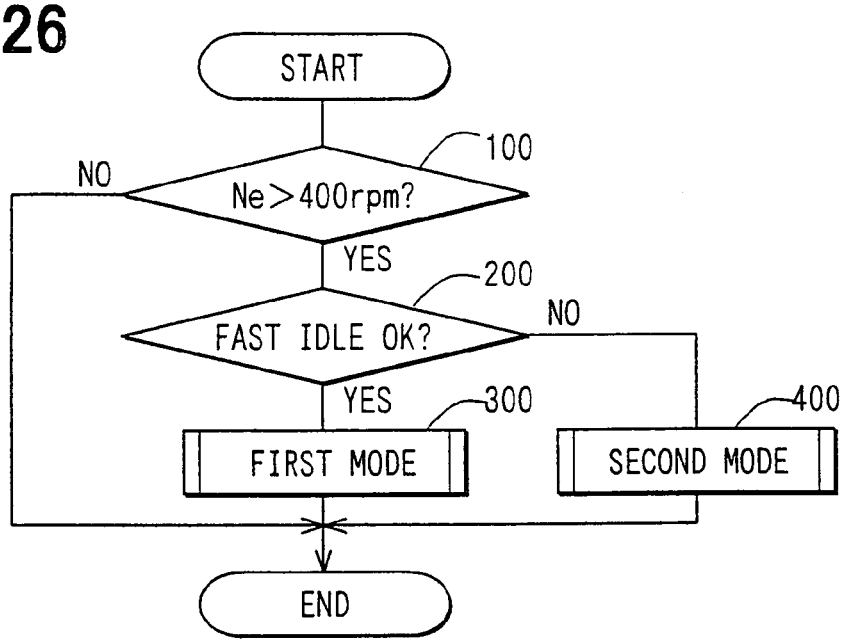
FIG. 26 is a diagram showing a main routine of the eleventh embodiment.

By referring to FIGS. 26 to 36, the following description explains a control program of a valve timing control apparatus of an internal combustion engine implemented by an embodiment of the present invention. A flowchart shown in FIG. 26 represents a main program provided by this embodiment. The main program is invoked synchronously with the revolution of the crank shaft 51 at typically 180° CA (Crank Angle) intervals. The flowchart begins with a step S100 to determine whether the internal combustion engine has been started, that is, whether an engine speed Ne computed by the ECU 33 has exceeded typically 400 rpm. If the engine speed Ne has not exceeded 400 rpm, the main program is ended. If the engine speed Ne has exceeded 400 rpm, on the other hand, the internal combustion engine is determined to have been started. In this case, the flow of the main program goes on to a step S200 to determine whether conditions for fast idle execution are satisfied. A fast idle operation is an idle operation in which the engine speed Ne is set at a value greater than the normal idle revolution speed at a cold start as is known traditionally. The conditions for fast idle execution include:

(1) The engine speed Ne does not exceed a predetermined revolution speed.

(2) A cooling water temperature Thw detected by a water temperature sensor is at least equal to a first predetermined temperature.

(3) The cooling water temperature Thw detected by the water temperature sensor does not exceed a second predetermined temperature.

(4) The intake air temperature is at least equal to a third predetermined temperature.

Condition (1), which requires that the engine speed Ne shall not exceed a predetermined revolution speed, is provided to implement the fast idle operation even if the engine speed is in an operating region slightly higher than the normal idle revolution speed, that is, even if the engine speed is in a small load region. Conditions (2) and (4) are each a condition for inhibiting a fast idle operation at very low temperatures, which are regarded as an operating condition with increased frictions. Condition (3) is a condition showing a cold start. The first and third predetermined temperatures are lower than the second predetermined temperature.

If such conditions for fast idle execution are satisfied, the flow of the routine goes on to a step S300 at which intake valve closing control in a first mode is executed before the execution of this routine is ended. If the such conditions for fast idle execution are not satisfied, on the other hand, the flow of the routine goes on to a step S400 at which intake valve closing control in a second mode is executed before the execution of this routine is ended. It should be noted that, if the conditions for fast idle execution are satisfied, ignition timing retarding control is executed as will be described later. In addition, in the first mode, a target intake valve closing position is set to increase an intake airflow rate so that combustion stability is improved. In the second mode, on the other hand, during a period beginning at a start of the engine and ending at a time the conditions for fast idle execution are satisfied, control is executed to retard the intake valve 32 so that a desired negative pressure is developed in a brake tank. In an operating state following completion of an operation to heat the catalyst at an early time, the normal intake valve closing position control proper for the operating state is executed. The first and second modes will be explained later in detail by referring to subroutines shown in FIGS. 29 and 30 respectively.

Figure 27:
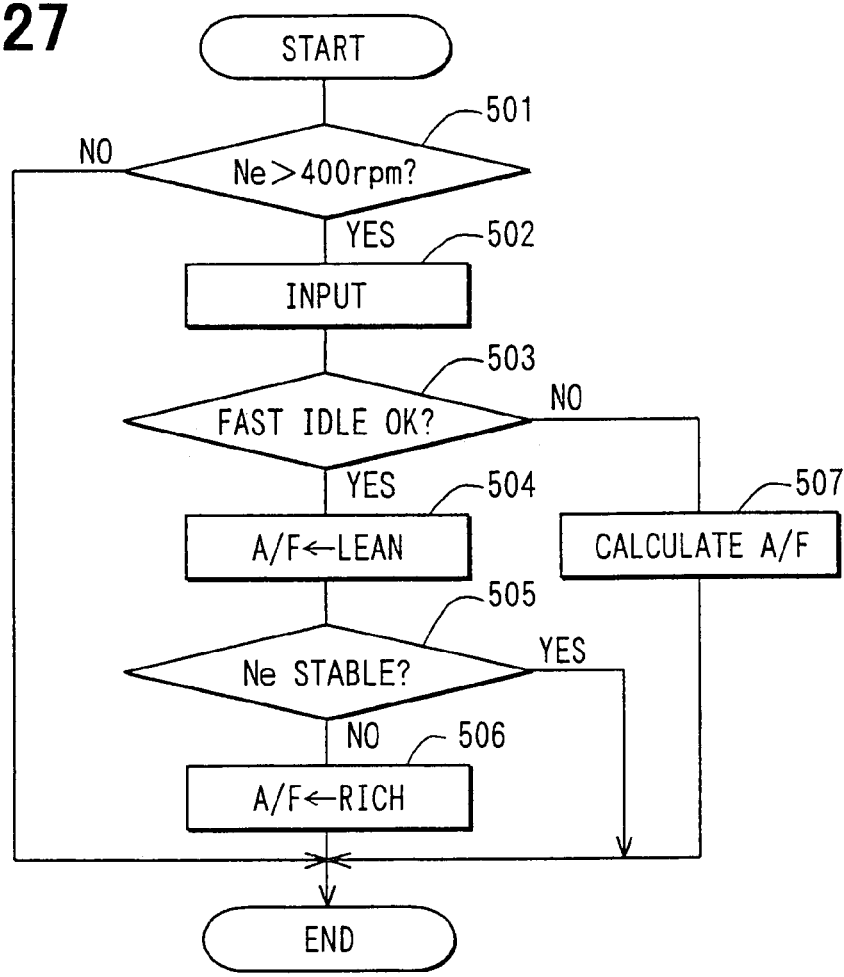
FIG. 27 is a flowchart representing air-fuel ratio control of the eleventh embodiment.

Next, an air-fuel ratio control program provided by this embodiment is explained by referring to a flowchart shown in FIG. 27. This program is invoked synchronously with the revolution of the crank shaft 51 at typically 180° CA intervals. The flowchart begins with a step S501 to determine whether the internal combustion engine has been started, that is, whether an engine speed Ne computed by the ECU 33 has exceeded typically 400 rpm. If the determination result indicates that the engine speed Ne has not exceeded 400 rpm, this program is not executed but just ended. If the engine speed Ne has exceeded 400 rpm, on the other hand, the flow of the program goes on to a step S502 to input operating conditions such as an engine cooling water temperature Thw, an engine speed Ne and an intake pressure Pm. As an alternative, an intake airflow sensor is provided to be used as a means for detecting an intake airflow volume Ga in place of an intake pressure Pm.

Then, the flow of the program goes on to a step S503 to determine whether fast idle execution conditions are satisfied. Since the fast idle execution conditions are the same as those of the step S200 of the flowchart shown in FIG. 26, their explanation is not repeated. If the fast idle execution conditions are not satisfied, a target air-fuel ratio is set on the basis of operating conditions. The target air-fuel ratio can be set by adoption of the commonly known conventional technique whereby the air-fuel ratio is set at a value depending on an operating region. For example, in the case of a small load region such as a region traveled in a steady running state, the air-fuel ratio is set at a lean value. For a big load region such as a region traveled in a transient running state, on the other hand, the air-fuel ratio is set at a rich value to increase the torque. In this way, in an operating region other than a region of the fast idle one, a target air-fuel ratio is set by adoption of the commonly known conventional technique before the execution of this subroutine is ended.

Figure 33A:
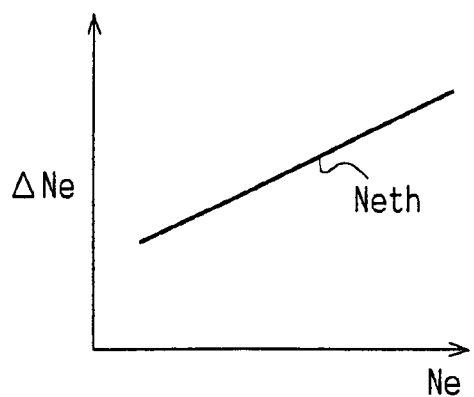
FIGS. 33A and 33B are diagrams each showing a map used for finding a closing position of the intake valve from a revolution speed.

If the determination result produced at the step S503 indicates that the fast idle execution conditions are satisfied, on the other hand, the flow of the routine goes on to a step S504. At the step S504, the target air-fuel ratio is set at a weak lean value. A weak lean air-fuel ratio reduces the fuel injection quantity for achieving an objective to reduce emission at the start of the engine. Then, the flow of the routine goes on to a step S505 to determine whether the engine speed Ne is stable. The stability of the engine speed Ne needs to be determined because the air-fuel ratio is being controlled to a lean value and it is feared that drivability deteriorates due to the fact that variations in torque are generated with ease by retardation of the ignition timing as will be described later. As a technique to determine whether the engine speed Ne is stable, a criterion line Neth is provided as a means for determining stability for different values of the engine speed Ne as shown in FIG. 33A. In detail, if a deviation ΔNe at an engine speed Ne is greater than the value of the criterion line Neth for the engine speed Ne, instability at the engine speed Ne is indicated. On the other hand, a deviation ΔNe smaller than the value of the criterion line Neth indicates stability at the engine speed Ne. As shown in the figure, the greater the engine speed Ne, the greater the value of the criterion line Neth.

Figure 33B:
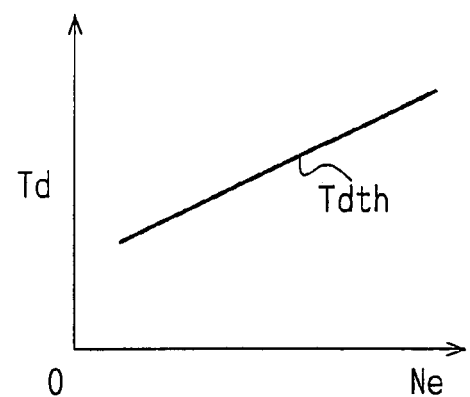

As another technique, a criterion line Tdth is used to represent a relation between allowable torque variations Td and values of the engine speed Ne as shown in FIG. 33B. Much like the criterion line Neth shown in FIG. 33A, a variation in torque greater than the allowable value represented by the criterion line Tdth indicates instability at the engine speed Ne.

If the determination result produced at the step S505 indicates that the engine speed Ne is stable, the execution of this routine is ended by using the weak lean value set at the step S504 as the target air-fuel ratio. If the determination result produced at the step S505 indicates that the engine speed Ne is instable, on the other hand, the flow of the routine goes on to a step S506 at which the target air-fuel ratio is changed from the weak lean value set at the step S504 to a weak rich value before the execution of the subroutine is ended. In this way, when the operation of the internal combustion engine is controlled at a lean air-fuel ratio, or the ignition timing retarding control is executed to heat the catalyst at an early time as will be described later, the engine speed Ne becomes instable with ease so that the air-fuel ratio needs to be set at a weak rich value in order to make the engine speed Ne stable.

Figure 28:
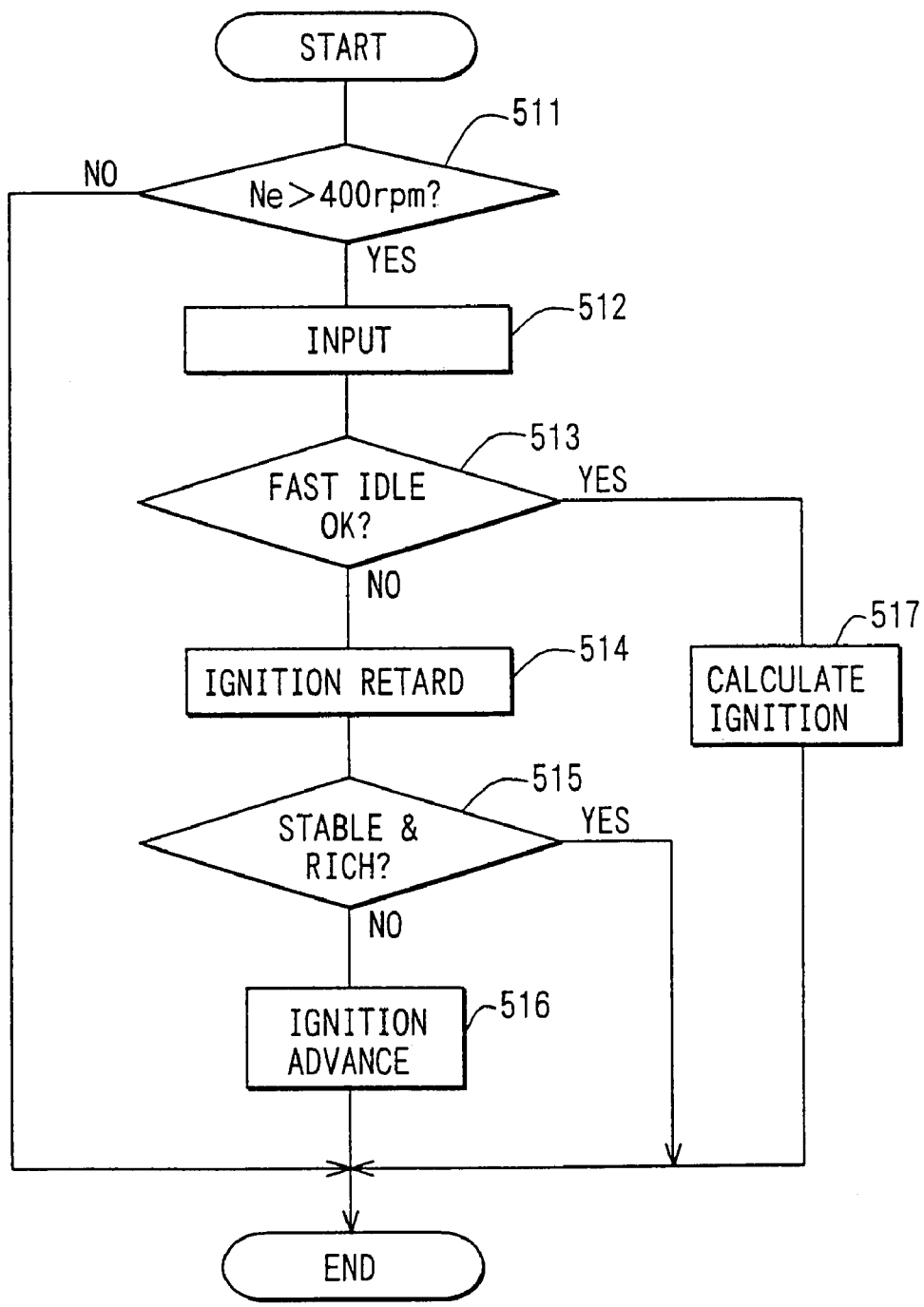
FIG. 28 is a flowchart representing ignition timing control of the eleventh embodiment.

Next, the ignition timing control provided by this embodiment is explained by referring to a flowchart shown in FIG. 28. In accordance with the ignition timing control program, if the fast idle execution conditions are not satisfied, an ignition timing is set in accordance with an operating state. If the fast idle execution conditions are satisfied, on the other hand, the ignition timing is retarded to make the combustion process in the internal combustion engine slow. Thus, hot exhausted gas is supplied to the catalyst to execute control of heating the catalyst at an early time.

It should be noted that this program is invoked synchronously with the revolution of the crank shaft 51 at typically 180° CA intervals. The flowchart begins with a step S501 to determine whether the internal combustion engine has been started, that is, whether an engine speed Ne computed by the ECU 33 has exceeded typically 400 rpm. If the determination result indicates that the engine speed Ne has not exceeded 400 rpm, this program is not executed but just ended. If the engine speed Ne has exceeded 400 rpm, on the other hand, the flow of the program goes on to a step S512 to input operating conditions such as an engine cooling water temperature Thw, an engine speed Ne and an intake pressure Pm. As an alternative, an intake airflow sensor is provided to be used as a means for detecting an intake airflow volume Ga in place of an intake pressure Pm. Then, the flow of the program goes on to a step S513 to determine whether fast idle execution conditions are satisfied. Since the fast idle execution conditions are the same as those of the step S200 of the flowchart shown in FIG. 26, their explanation is not repeated.

If the fast idle execution conditions are not satisfied, the flow of the routine goes on to a step S517 at which a target air-fuel ratio is set on the basis of the operating conditions input at the step S512. The target air-fuel ratio can be set by adoption of the commonly known conventional technique whereby an ignition timing is set from typically a map on the basis of an engine speed Ne and the internal combustion engine's intake pressure Pm (or an intake airflow volume Ga). In this way, in an operation other than a fast idle state, an ordinary ignition timing is set by using a map or the like before the execution of this routine is ended.

If the determination result produced at the step S513 indicates that the fast idle execution conditions are satisfied, on the other hand, the flow of the routine goes on to a step S514 at which the ignition timing retarding control to heat the catalyst at an early time is executed. The ignition timing is retarded by, for example, about 10° CA behind a normal ignition timing to make the combustion process in the internal combustion engine 1 slow. Thus, hot gas is deliberately supplied to the exhaust pipe to promote the process of heating the catalyst. Then, the flow of the routine goes on to a step S515 to determine whether the following conditions are satisfied. The conditions include an instable engine rotation speed Ne (the same condition as the step S505 of the flowchart shown in FIG. 28) and air-fuel ratio control resulting in a weak rich air-fuel ratio. If these conditions are not satisfied, the execution of this routine is ended. If these conditions are satisfied, on the other hand, the flow of the routine goes on to a step S506 to execute control to make the combustion stable by retarding the ignition timing. This is because variations in engine speed Ne cannot be suppressed in spite of the weak rich air-fuel ratio.

As described above, in the air-fuel ratio control program and the ignition timing control program, fast idle execution conditions are used as execution conditions. If the fast idle execution conditions are satisfied, the ignition timing retarding control for heating the catalyst at an early time and control of adjusting the air-fuel ratio to a weak lean value in order to reduce emission are executed. It should be noted that, at that time, determination of the stability of the engine speed Ne is based on the engine speed Ne itself and the variations ΔNe. If revolution variations causing drivability deterioration are generated, first of all, control to set the air-fuel ratio at a weak rich value is executed to suppress the revolution variations. Then, if the control to set the air-fuel ratio at a weak rich value cannot suppress the revolution variations, the control to retard an ignition timing is executed to make the combustion stable. This is because the control is executed, taking precedence of the process to heat the catalyst at an early time.

Figure 29:
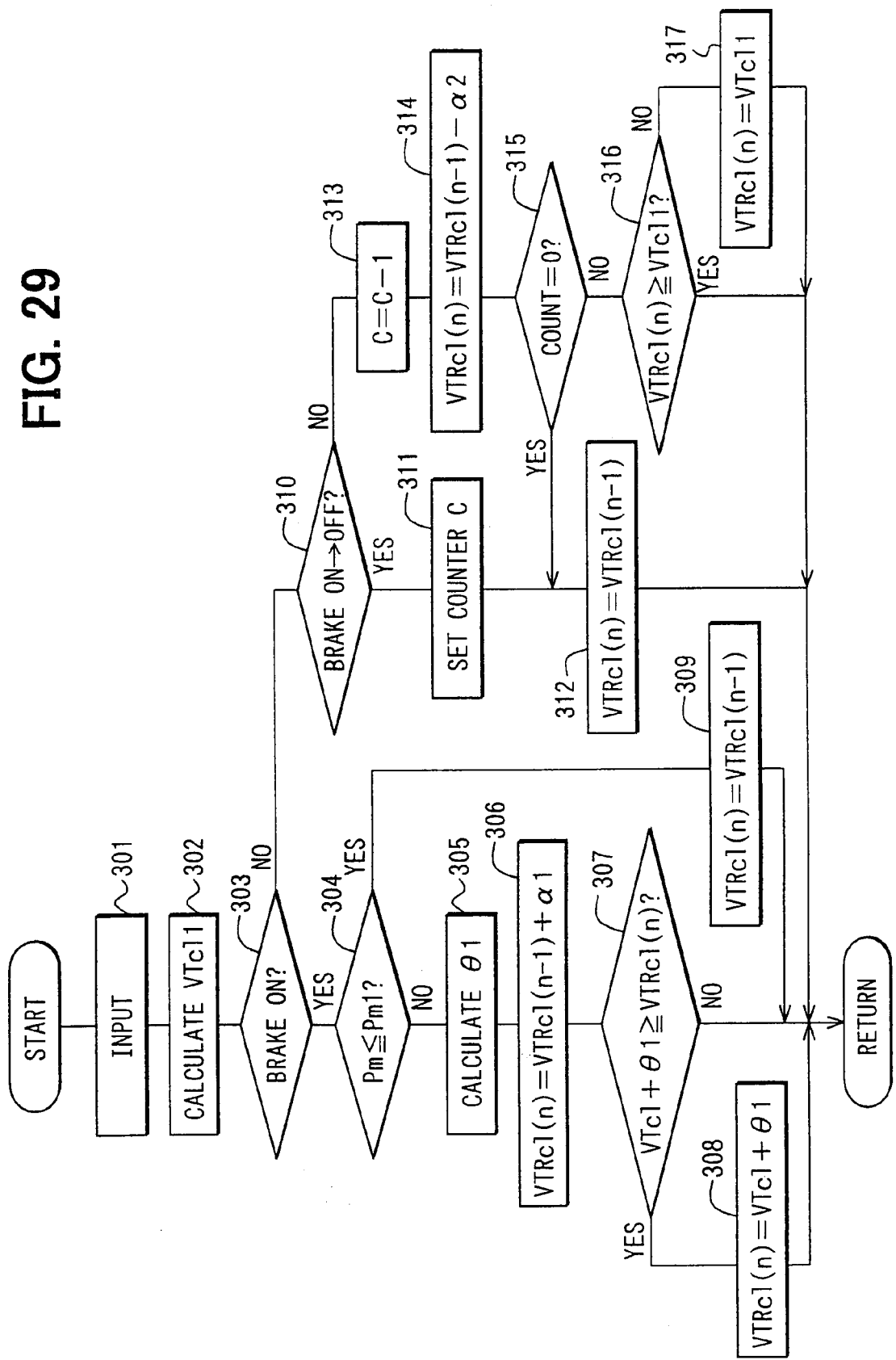
FIG. 29 is a flowchart representing intake valve closing position control executed by the eleventh embodiment on the basis of the status of the brake.
Figure 35A:
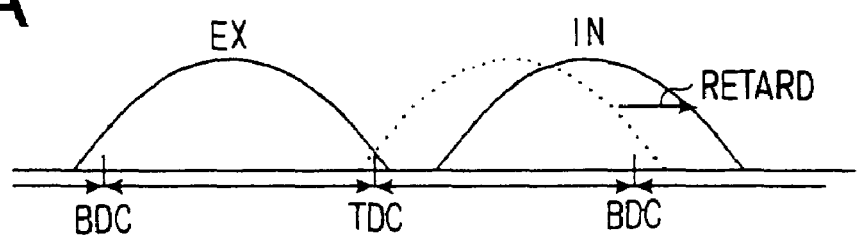
FIGS. 35A to 35C are time charts each used for explaining the closing position of the intake valve for an operating condition.
Figure 35B:
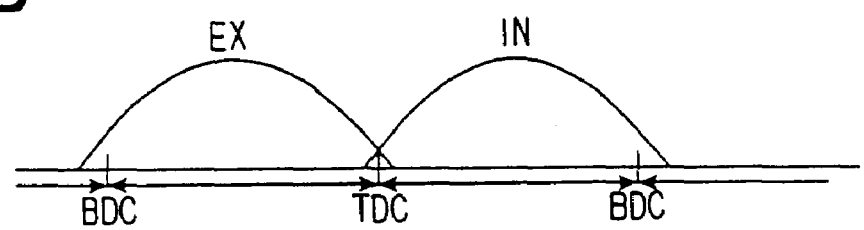

By referring to the flowchart shown in FIG. 29, the following description explains details of a first mode program executed at the step S300 of the flowchart shown in FIG. 26 as a subroutine. That is, this program is a subroutine, which is invoked when the processing of the step S300 of the flowchart shown in FIG. 26 is carried out. First of all, at a step S301, operating conditions are input. The operating conditions include an engine cooling water temperature Thw, an engine speed Ne and an intake pressure Pm. Then, at the next step S302, a target intake valve closing position VTcl1 is found from the input operating conditions. As a technique to find a target intake valve closing position VTcl1, a map shown in FIG. 31 is used. As shown in the figure, the target intake valve closing position VTcl1 depends on the engine speed Ne and the intake pressure Pm. Since the fast idle operation is being carried out, as shown in FIG. 35A, the target intake valve closing position VTcl1 is set at a value on the retarded side in comparison with a normal operation shown in FIG. 35B. It should be noted that, since the map shown in FIG. 31 is the same as the map used in the flowchart shown in FIG. 30, the character * attached to the symbol VTcl* shown in FIG. 31 corresponds to the number 1.

Then, after a target intake valve closing position VTcl1 is found, the flow of the routine goes on to a step S303 to determine whether the brake has been turned on. If the brake is determined to have been turned on, the flow of the routine goes on to a step S304 to determine whether the intake pressure Pm is on the positive side relative to a predetermined value Pm1. If the intake pressure Pm is on the negative side relative to a predetermined value Pm1, the flow of the routine goes on to a step S309 at which the immediately preceding control intake valve position VTRcl1 is used as the present control intake valve position VTRcl (n) before the execution of this routine is ended. If the determination result produced at the step S304 indicates that the intake pressure Pm is on the positive side relative to a predetermined value Pm1, on the other hand, the flow of the routine goes on to a step S305 and the subsequent steps to carry out processing of shifting the pressure in the intake pipe to the negative side.

Figure 34A:
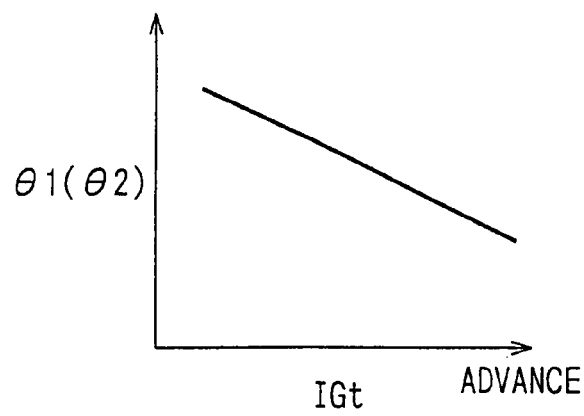
FIGS. 34A and 34B are diagrams each showing a map used for setting a retardation quantity in accordance with an ignition timing.
Figure 34B:
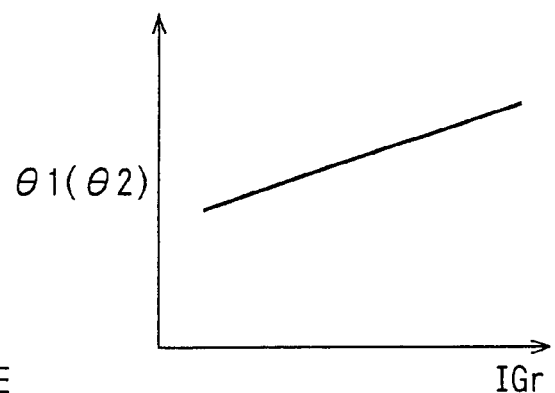

Specifically, at the step S305, the advancing quantity θ1 of the intake valve closing position is found. The advancing quantity θ1 can be a constant or a variable value. In case of variable, the advancing quantity θ1 of the closing timing of the intake valve can be obtained by looking up maps such as shown in FIGS. 34A and 34B. The map shown in FIG. 34A is used to find an advancing quantity θ1 for an ignition timing IGt. As is obvious from the map, the closer the ignition timing IGt to the retarded side, the larger the advancing quantity θ1. On the other hand, the map shown in FIG. 34B is used for finding an advancing quantity θ1 of the intake valve's closing position for a retardation quantity IGr relative to the normal control position of the ignition timing. As is obvious from the map, the advancing quantity θ1 increases in proportion to the retardation quantity IGr of the ignition timing. That is, the maps shown in FIGS. 34A and 34B indicate that, since a combustion torque decreases in proportion to the retardation quantity of the ignition timing, in order to sustain a target revolution speed for the fast idle operation, an attempt is made to eliminate the lack of the combustion torque by increasing the intake airflow. Therefore, the intake airflow in the intake pipe increases, making it easy for the pressure in the intake pipe to become a positive pressure rather than a predetermined negative pressure. For this reason, for a large retardation quantity of the ignition timing, the advancing quantity of the intake valve's closing position needs to be set at a large value.

Alternatively, the advancing quantity θ1 can be obtained by looking up a map either shown in FIG. 32A or FIG. 32B. According to FIG. 32A, the map proportionally determines the advancing quantity θ1 with respect to the intake pressure Pm. In a case of low intake pressure, the advancing quantity θ1 is set smaller advancing degree so as to obtain a necessary negative pressure. The map shown in FIG. 32B proportionally determines the advancing quantity θ1 with respect to a pressure deference Pmd between a target intake pressure Ptg and an actual detected intake pressure Pm (Pmd=Pm−Ptg). In this case, the advancing quantity θ1 is proportionally increased as an excessive amount of the actual detected intake pressure with respect to the target intake pressure increases.

After an advancing quantity θ1 of the intake valve's closing position is set in this way, the flow of the routine goes on to a step S306. At the step S306, a predetermined value α1 is added to the immediately preceding value VTRcl(n−1) of the intake valve's closing position. Then, the flow of the routine goes on to a step S307 to determine whether the present closing position of the control intake valve exceeds a sum of the advancing quantity θ1 found at the step S305 and a target intake valve closing position VTcl. If the present closing position of the control intake valve does not exceed the sum of the advancing quantity θ1 and the target intake valve closing position VTcl, the execution of this routine is ended. If the present closing position VTRcl of the control intake valve exceeds the sum of the advancing quantity θ1 and the target intake valve closing position VTcl, on the other hand, the flow of the routine goes on to a step S308 at which the sum of the advancing quantity θ1 and the target intake valve closing position VTcl is used as the present closing position VTRcl (n) of the control intake valve.

If the determination result produced at the step S303 indicates that the brake is not turned on, on the other hand, the flow of the routine goes on to a step S310 to carry out processing of the step and subsequent steps. At the step S310, first of all, the brake is examined to determine whether the brake has been just switched from an on state to an off state. If the determination result indicates that the brake has been just switched from an on state to an off state, the flow of the routine goes on to a step S311 at which counter C is set at a predetermined value. Counter C is a counter for sustaining the control intake valve's closing position VTRcl (n−1) set at a step S308 or S309. After counter C is set at the predetermined value, the flow of the routine goes on to a step S312 at which the control intake valve's closing position VTRcl (n−1) is set at the immediately preceding value VTRcl (n−1) of the control intake valve's closing position VTRcl. Then, the execution of this routine is ended.

If the determination result produced at the step S310 indicates that the brake was not just switched from an on state to an off state, on the other hand, the flow of the routine goes on to a step S313. At the step S313, Counter C is decremented. Then, the flow of the routine goes on to a step S314. At the step S314, a predetermined value α2 is subtracted from the control intake valve's closing position VTRcl. The flow of the routine then goes on to a step S315. At the step S315, counter C is examined to determine whether counter C has become 0. If the determination result indicates that counter C has not become 0, the flow of the routine goes on to the step S312 at which the control intake valve's closing position VTRcl (n−1) is set at the immediately preceding value VTRcl (n−1) of the control intake valve's closing position VTRcl. Then, the execution of this routine is ended. If the determination result indicates that counter C has become 0, on the other hand, the flow of the routine goes on to a step S317 at which the target intake valve closing position VTcl is compared with the control intake valve's closing position VTRcl (n) computed at the step S314. If the control intake valve's closing position VTRcl (n) is found greater than the target intake valve closing position VTcl, the execution of this routine is ended. If the target intake valve closing position VTcl is found greater than the control intake valve's closing position VTRcl (n), on the other hand, the target intake valve closing position VTcl is used as the control intake valve's closing position VTRcl (n) and, then, the execution of this routine is ended.

Figure 30:
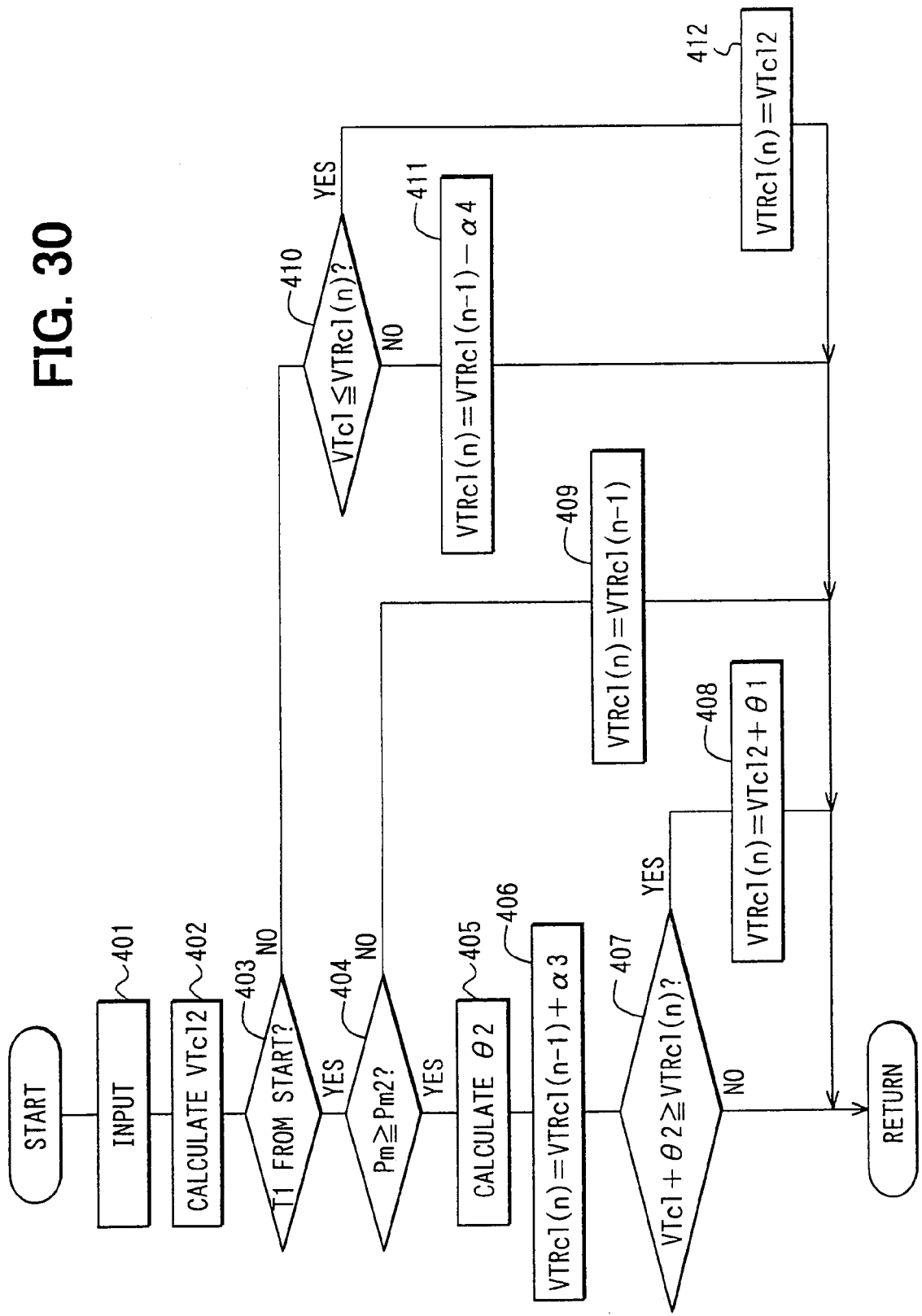
FIG. 30 is a flowchart representing air-fuel ratio control executed by the eleventh embodiment beginning at an engine start.

By referring to the flowchart shown in FIG. 30, the following description explains details of a second mode program executed at the step S400 of the flowchart shown in FIG. 26 as a subroutine. This program is executed to control the intake valve 53 when the fast idle execution conditions are not satisfied. During a period, which begins with a determination result indicating that the engine has been started and lasts till the fast idle execution conditions are satisfied, a target intake valve closing position set in accordance with operating conditions is advanced and the pressure in the intake valve is sustained at a level not exceeding a predetermined value Pm2. Under a condition other the above conditions, control is executed to set a target intake valve closing position set in accordance with operating conditions. It should be noted that this program is a subroutine, which is invoked when the processing of the step S400 of the flowchart shown in FIG. 26 is carried out.

The program begins with a step S401 to input operating conditions such as an engine cooling water temperature Thw, an engine speed Ne and an intake pressure Pm. Then, at the next step S402, a target intake valve closing position VTcl1 is found on the basis of the input operating conditions. As a method to find a target intake valve closing position VTcl1, a target intake valve closing position VTcl1 is found for an engine speed Ne and an intake pressure Pm from the map shown in FIG. 31. It should be noted that, since the map shown in FIG. 31 is the same as the map used in the flowchart shown in FIG. 29, the character * attached to the symbol VTcl* shown in FIG. 31 corresponds to the number 2.

After a target intake valve closing position VTcl2 is found, the flow of the routine goes on to a step S403 to determine whether a predetermined time T1 has lapsed since the start of the engine. If the determination result indicates that the predetermined time T1 has not lapsed since the start of the engine, the flow of the routine goes on to a step S404. At the step S404, an intake pressure Pm detected by the intake air pressure sensor 3 is examined to determine whether the pressure Pm is on the positive side relative to a predetermined value Pm2. If the determination result indicates that the intake pressure Pm is on the negative side relative to the predetermined value Pm2, the flow of the routine goes on to a step S409 at which an immediately preceding control intake valve closing position VTRcl (n−1) is used as the present control intake valve closing position VTRcl (n) and, then, the execution of this routine is ended. If the determination result produced at the step S404 indicates that the intake pressure Pm is on the positive side relative to the predetermined value Pm2, on the other hand, the processing goes on to a step S405 to carry out processing to put the intake pressure Pm on the negative side relative to the predetermined value Pm2 at the step and subsequent steps.

In detail, at the step S405, an advance quantity θ2 of the intake valve's closing position is set. In the case of the flowchart shown in FIG. 29, an advance quantity θ2 of the intake valve's closing position is set as a variable according to a retardation quantity of the ignition timing. In the case of this program, however, it is not necessary to set an advance quantity θ2 on the basis of an ignition timing. This is because control is being executed from a time at which a start of the engine is recognized till a fast idle execution is commenced.

After an advance quantity θ2 of the intake valve's closing position is set as described above, the processing goes on to a step S406. At the step S406, a predetermined value α3 is added to the control intake valve's closing position VTRcl (n−1). Then, the processing goes on to a step S407. At the step S407, the present control intake valve closing position is examined to determine whether the present control intake valve closing position exceeds a sum of an advance quantity θ2 found at the step S405 and a target control intake valve closing position VTcl2. If the present control intake valve closing position does not exceed the sum of an advance quantity θ2 and a target control intake valve closing position VTcl, the execution of this routine is ended. If the determination result indicates that the present control intake valve closing position exceeds the sum of an advance quantity θ2 and a target control intake valve closing position VTcl, on the other hand, the flow of the routine goes on to a step S308 at which the sum of an advance quantity θ2 and a target control intake valve closing position VTcl is used as the control intake valve closing position VTcl (n) and, then, the execution of this routine is ended.

If the determination result produced at the step S403 indicates that the predetermined time T1 has lapsed since the start of the engine, on the other hand, the flow of the routine goes on to a step S410 at which a target intake valve closing position VTcl2 is compared with a control intake valve closing position VTRcl. If the comparison result indicates that the target intake valve closing position VTcl2 is smaller than the control intake valve closing position VTRcl, the flow of the routine goes on to a step S411. At the step S411, the present control intake valve closing position VTRcl (n) is set at a value obtained as a result of subtraction a predetermined value α4 from the control intake valve closing position VTRcl (n−1) immediately preceding the present control intake valve closing position VTRcl (n). Then, the execution of this routine is ended. If the target intake valve closing position VTcl2 is found greater than the control intake valve closing position VTRcl, on the other hand, the present control intake valve closing position VTRcl is set at the target intake valve closing position VTcl.

Time charts of the embodiment operating in accordance with the processing procedure described above are explained by referring to FIG. 35 and FIGS. 36A to 36F. FIG. 36A is a time chart of the engine speed Ne. A criterion value as to whether the internal combustion engine has been started or not is set at typically 400 rpm. If the intake air pressure Pm shown in FIG. 36E is on the positive side relative to a predetermined value Pm2 shown as a single dotted line in the same figure after the engine speed Ne exceeds the criterion value, the target intake valve closing position VTcl is set at a value advanced ahead of the normal intake valve closing position. Since the actual intake valve 53 is controlled on the basis of the control intake valve closing position VTRcl (n), when the target intake valve closing position VTcl2 is changed from one value to a new one, the intake valve 53 is driven to gradually follow the new value of the target intake valve closing position VTcl2. That is, the closing position is changed by a predetermined quantity at one time repeatedly toward the new value of the target intake valve closing position VTcl2.

In this way, in this embodiment, during a period beginning at a start of the engine, the intake valve closing position VTcl is advanced by a predetermined advance quantity θ2 till the intake air pressure Pm enters a negative side. This period is ended when the intake air pressure Pm becomes equal to or lower than the predetermined value Pm2 and the fast idle execution conditions are satisfied. Then, at a time t1 shown in FIG. 36, when fast idle execution conditions (1) to (4) described earlier are satisfied, execution to retard the ignition timing IGt is executed to heat the catalyst at an early time as shown in FIG. 36B. At the time t1, as indicated in FIG. 35A and FIG. 36D, by advancing the closing position VT of the intake valve ahead of a steady running value shown in FIG. 35B, a difference in pressure between the intake valve and the combustion chamber is developed, increasing the intake airflow speed of airflowing into the combustion chamber. Then, since the intake airflow speed increases, the air-fuel ratio can be shifted to a weak lean value and the fuel injection quantity is thus corrected by reduction in air-fuel ratio weak lean control.

If the intake valve 53 is retarded as shown in FIG. 35A, however, a period in which the intake valve 53 is opened becomes longer even if the bottom dead center (BDC) is exceeded. Thus, intake air once supplied to the combustion center is returned to the intake pipe. As a result, after the time t1, the intake air pressure Pm inevitably enters the positive side relative a predetermined pressure Pm1 as shown in FIG. 36E. With the intake valve closing position VT set at the retarded position, assume that the driver turns on the brake as shown in FIG. 36C. In this case, since the intake air pressure Pm is on the positive side relative the predetermined pressure Pm1 as shown in FIG. 36E as is the case with the conventional technology, after the time t2, a negative pressure is consumed inside the brake tank as shown in FIG. 36F. As described above, if the closing position of the intake valve 53 is retarded while the heating of the catalyst at an early time is being implemented, the intake air pressure Pm is higher than the predetermined pressure Pm1. Thus, if a brake is once applied, the pressure in the brake tank does not attain a predetermined negative pressure so that the driver needs to apply a large depression force when the driver uses the brake next time.

Figure 35C:
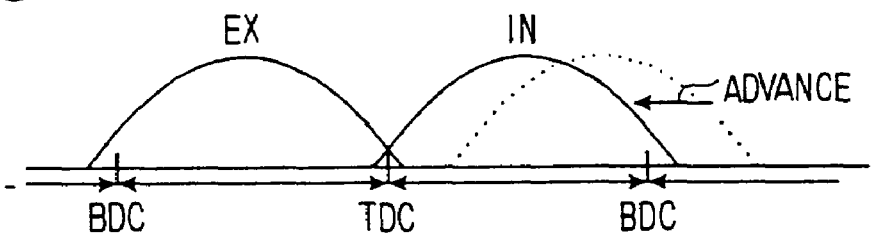

In the case of this embodiment, however, at the time t2, when the brake is applied as shown in FIGS. 35C and 36D, the closing position of the intake valve 53 is advanced ahead of the closing time for the fast idle operation as shown in FIG. 36D in order to prevent intake air once supplied to the combustion chamber from being returned to the intake pipe. Thus, with the brake turned on, a pressure on the negative side relative to a predetermined negative pressure can be introduced into the brake tank. As shown in FIG. 36D, a predetermined period Tc begins when the brake is turned off and ends at a time t4. By holding the intake valve closing position VT at this advanced position during the predetermined period Tc, the pressure inside the brake tank can be set at a pressure on the negative side relative to the predetermined negative pressure and, at a point D shown in the same figure, the intake valve closing position is restored to the original position. Thus, between the times t2 and t4, the intake air pressure Pm can be held at a value on the negative side relative to the predetermined pressure Pm1 as shown in FIG. 36E and the pressure Vp inside the brake tank can be maintained at a negative value as shown in FIG. 36F. Dashed lines shown in FIGS. 36D, 36E and 36F each represent typical values for comparison purposes.

It should be noted, at that time, since the closing position of the intake valve is advanced, the overlap quantity increases. It is thus feared that a residual quantity in the combustion chamber increases. The residual quantity is referred to hereafter as an internal EGR gas quantity. In the case of this embodiment, however, stability of combustion is taken into consideration on the basis of the engine speed Ne. Specifically, when the combustion becomes unstable, the air-fuel ratio is shifted to the weak rich side to restore the stability of the combustion. In addition, the stability of the combustion is restored by advancing the timing of the ignition only when the stability of the combustion cannot be restored by merely putting the air-fuel ratio on the weak rich side. As such, when there is concern for deterioration of combustion, first of all, execution of the control to set the air-fuel ratio on the weak rich side merely takes precedence while heating the catalyst at an early time by execution of control to retard an ignition timings is continued. Therefore, when the combustion becomes instable but can be restored by execution of the control to set the air-fuel ratio on the weak rich side, heating of the catalyst at an early time is not halted. As a result, the temperature of the catalyst can be increased at an early time and, at the same time, deterioration of combustion can be avoided.

As described above, in this embodiment, the pressure in the brake tank can be maintained at a level on the negative side relative to a predetermined negative pressure in response to a brake demand raised by the driver without providing a sensor for detecting a pressure in the brake tank. Thus, it is possible to make the driver have no sense of incompatibility when the driver applies a brake. In addition, the closing position VT of the intake valve is advanced only when it is necessary to introduce a negative pressure in the brake tank in accordance with the on/off status of the brake. Thus, the intake air pressure Pm can be prevented from becoming negative unnecessarily.

It should be noted that, while the values of θ1 and Pm1 used in the first mode are different from the values of θ2 and Pm2 used in the second mode in this embodiment, those of the first mode can also be the same as their respective counterparts in the second mode. By the same token, the predetermined values α1 and α3 for gradual advancing can be made equal to respectively the predetermined values α2 and α4 for gradual advancing.

In this embodiment, the flowchart shown in FIG. 29 represents the function of a first advance control means. The flowchart shown in FIG. 30 represents the function of a second advance control means. The means for controlling the intake airflow volume by adjusting the throttle valve in order to make the revolution speed follow a target revolution speed in an idle operation state serves as an intake airflow volume control mean. The flowchart shown in FIG. 28 represents the function of an ignition timing control means. The intake air pressure sensor 6 serves as a pressure detecting means. The crank angle sensor 2 serves as a revolution speed detecting means. The water temperature sensor 3 serves as an engine water temperature detecting means. A sensor provided on the intake air pressure sensor 6 but shown in none of the figures serves as an intake air temperature detecting means. The step S505 of the flowchart shown in FIG. 27 and the step S515 of the flowchart shown in FIG. 28 correspond to the function of a combustion state detecting means. The step S506 of the flowchart shown in FIG. 27 corresponds to the function of an air fuel weak rich control means. The step S516 of the flowchart shown in FIG. 28 corresponds to the function of an ignition timing advancing control means. The means, which is used for retarding the closing position of the intake valve when unstable combustion caused by an advanced closing position of the intake valve is detected so that the valve overlap quantity decreases, serves as a retardation control means.

Twelfth Embodiment

In the case of the eleventh embodiment, if the brake is put in an on operation state, the closing position of the intake valve 53 is advanced so that the pressure in the intake pipe is sustained at a negative value. In the case of the twelfth embodiment, on the other hand, considering the fact that a negative pressure is consumed during use of the brake so that it is not necessary for the driver to apply a large depression force, control is executed so that the feeling to apply the brake does not worsen when the brake is used next time.

In this embodiment, as a substitute for the first mode of the eleventh embodiment, intake valve closing position control is executed in accordance with the operation status of the brake as explained below. The intake valve closing position control is described in detail by referring to a flowchart shown in FIG. 37. It should be noted that processing steps identical with those of the eleventh embodiment are denoted by the same reference numerals as the latter and their explanation is not repeated. This program is invoked synchronously with the revolution of the crank shaft 51 at typically 180° CA intervals.

The flowchart begins with a step S301 at which operating conditions are input. Then, at the next step S302, a target intake valve closing position VTcl1 is found from the input operating conditions. Then, the flow of the routine goes on to a step S601 to determine whether a brake flag Fb is set at 1. As will be described later, the brake flag Fb is a flag indicating operating status of the flag. If the brake flag Fb is not set at 1, the execution of the routine is ended. If the brake flag Fb is set at 1, on the other hand, the flow of the routine goes on to a step S602. The brake flag is set only during a predetermined period, which starts when the brake is switched from an on state to an off state. The period is set later. During this period, processing is carried out at the step S602 and subsequent steps.

At the step S602, a predetermined value is set in a counter C used for setting the period during which the following processing is carried out. At the next step S603, the counter C is decremented before continuing the processing to a step S304. At the step S304, the pressure inside the intake pipe is examined to determine whether the pressure is smaller than a first predetermined value. That is, the pressure inside the intake pipe is examined to determine whether the pressure is on the positive or negative side relative to a predetermined negative pressure. If the pressure inside the intake pipe is on the positive side relative to the predetermined negative pressure, pieces of processing of steps S305 to S308 are carried out to execute control to advance the intake valve 53 before the execution of this routine is ended. This processing is carried out repeatedly till the pressure inside the intake pipe is set to a value on the negative side relative to the predetermined negative pressure. Then, as the intake valve position VTRcl is advanced by a target advance quantity θ1, the intake valve is held at this position.

If the intake negative pressure Pm is on the negative side relative to the predetermined pressure Pm1, on the other hand, the flow of the routine goes on to a step S604 to determine whether the contents of the counter C are smaller than 0. If the contents of the counter C are greater than 0, the flow of the routine goes on to a step S312 at which the immediately preceding intake valve closing position VTRcl (n−1) is used as the present intake valve closing position VTRcl (n) in order to sustain the negative pressure in the intake valve and, then, the execution of this routine is ended. If the contents of the counter C are smaller than 0, on the other hand, the flow of the routine goes on to a step S314. At this and subsequent steps, the intake valve closing position VTRcl is retarded gradually toward the target intake valve closing position VTRcl1. This is because the negative pressure inside the tank is the desired negative pressure.

As described above, in this embodiment, during the predetermined period, which starts when the brake is switched from an on to off state, control is executed to introduce a desired negative pressure into the negative pressure tank. Thus, when the driver applies a brake next time, no big depression force is required. Therefore, also in this embodiment, the pressure in the brake tank can be maintained at a level on the negative side relative to a predetermined negative pressure in response to a brake demand raised by the driver without a need to provide a sensor for detecting a pressure in the brake tank. Thus, control to retard the closing position of the intake valve can be executed appropriately in order, for example, to suppress a pumping loss or to improve combustion.

Figure 37:
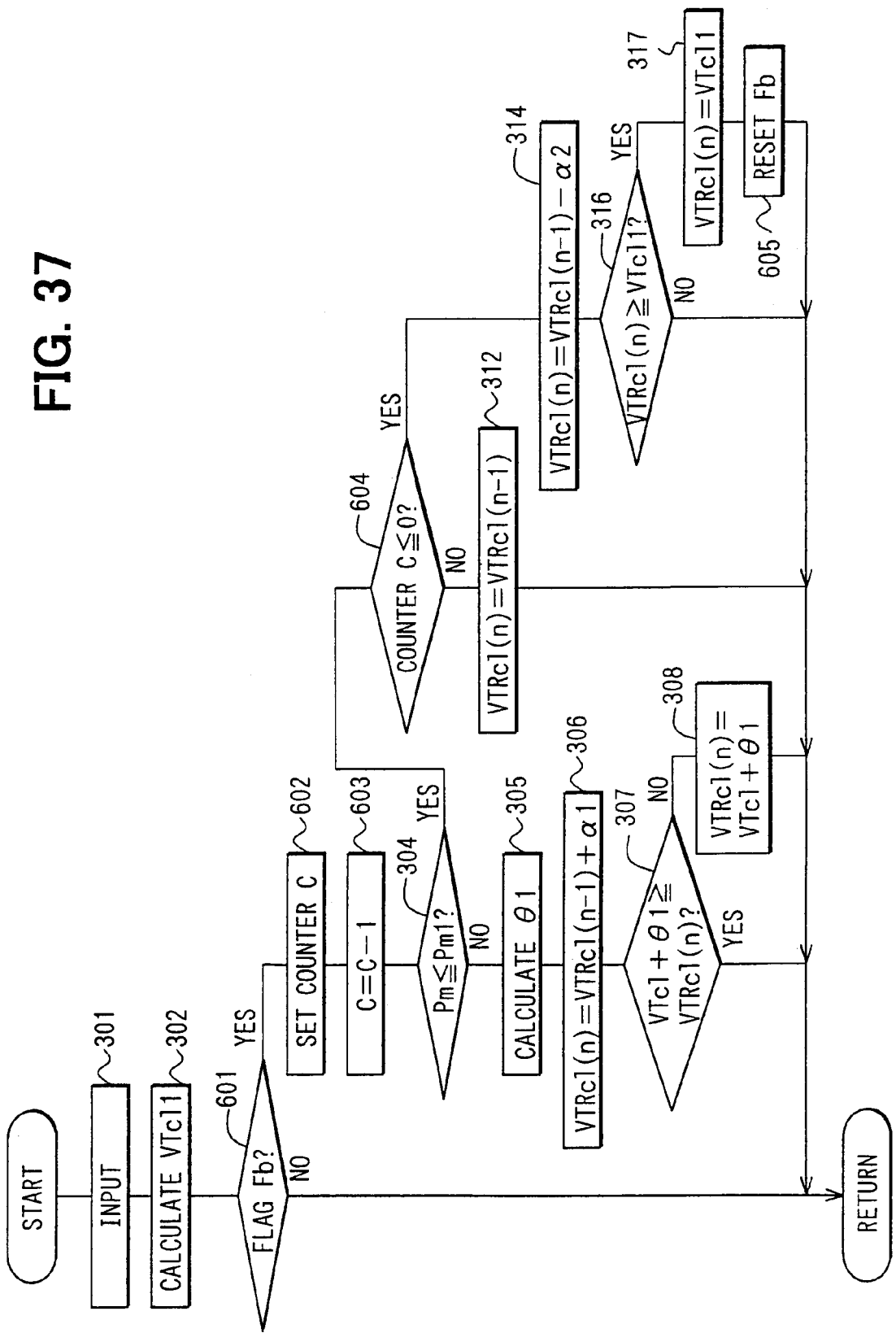
FIG. 37 is a flowchart representing intake valve closing position control executed by a twelfth embodiment.

In this embodiment, the flowchart shown in FIG. 37 represents the function of a first advancing control means.

The following description explains a case in which a valve timing mechanism equipped with an opening/closing timing and a lift or equipped with a variable operation angle mechanism is used in this embodiment as a valve timing mechanism. An example of the valve timing mechanism is an electro magnetic driving intake and exhaust valve timing mechanism, which is already commonly known.

In general, an electro magnetic driven intake and exhaust valve timing mechanism shown in none of the figures attracts an armature provided on the shaft of an intake or exhaust valve. Thus, the closing/opening position of the intake or exhaust valve can be set with a high degree of freedom and arbitrarily. That is, by setting the closing/opening position and its operation angle with a high degree of freedom, gas exhausting proper for the operating state can be implemented.

This embodiment is explained by referring to a time chart shown in FIG. 38. First of all, in accordance with the time chart shown in FIG. 38, the intake valve's opening/closing position represented by a dotted line in the figure is a lift quantity and an opening/closing position with the control to retard the ignition timing implemented to heat the catalyst at an early time under the fast idle execution conditions. At that time, the control of the intake valve is executed in accordance with the operation status of the brake as shown by a solid line in the figure as is the case with the first or second embodiment. As is obvious from FIG. 38, by advancing the position of the intake valve ahead of the BDC, the amount of air returned to the intake valve is reduced. At that time, a period to open the intake valve at the same time as the exhaust valve and the so called overlap quantity are taken into consideration. That is, since the amount of burned gas left in the combustion chamber rises by an increase in overlap quantity, the combustion becomes instable. In order to prevent combustion from becoming instable, the opening position of the intake valve is set so that the overlap quantity decreases. In this way, stable combustion can be implemented. It should be noted that, by setting the opening and closing positions of the intake valve close to each other, the intake airflow volume is reduced. As its countermeasure, the lift quantity of the intake valve is increased as shown in the figure.

In the case of this embodiment, an electro magnetic driven intake and exhaust valve is explained as an example. With regard to a valve having only its opening/closing position settable variably, the opening position needs to be set so as to reduce the amount of burned gas left in the combustion chamber. In addition, by increasing the intake airflow volume, the lift quantity is raised in order to reduce the pressure in the intake valve.

In this embodiment, the means for preventing combustion from becoming instable due to a decrease in intake airflow volume or the means for reducing the pressure in the intake pipe by increasing the intake airflow volume functions as a lift quantity control means.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A valve timing control apparatus of an internal combustion engine comprising:

a variable intake valve timing mechanism for varying an intake valve's position relative to a crank shaft of the internal combustion engine and used for controlling a closing position of the intake valve on the basis a result of processing carried out on the closing position of the intake valve in accordance with an operating condition of the internal combustion engine;

a first advancing controller, which is used for advancing the closing position of the intake valve on the basis of operating status of a brake when the closing position of the intake valve is retarded behind a bottom dead center; and a combustion state detector for detecting a combustion state of the internal combustion engine, wherein the first advancing controller advances a closing position of the intake valve on the basis of status of the brake when a combustion state detected by the combustion state detector is stable.

2. The valve timing control apparatus of an internal combustion engine according to claim 1, wherein the first advancing controller carries out an operation to advance a closing position of the intake valve when the brake is turned on and ends the operation to advance a closing position of the intake valve after a predetermined time lapses since the brake is turned off.

3. The valve timing control apparatus of an internal combustion engine according to claim 1, wherein the first advancing controller advances a closing position of the intake valve till a piston provided on the internal combustion engine reaches a position in close proximity to a bottom dead center.

4. The valve timing control apparatus of an internal combustion engine according to claim 1, wherein the first advancing controller advances a closing position of the intake valve so that a period of time during which both an exhaust valve and the intake valve are open simultaneously becomes equal to or shorter than a predetermined period of time.

5. The valve timing control apparatus of an internal combustion engine according to claim 1, wherein the combustion state detector detects a combustion state of the internal combustion engine on the basis of variations in internal combustion engine speed or variations in internal combustion engine torque.

6. The valve timing control apparatus of an internal combustion engine according to claim 1,
   the valve timing control apparatus further comprising a combustion stabilizing mechanism, which is used for stabilizing combustion of the internal combustion engine when a combustion state detected by the combustion state detector is instable,
   wherein the combustion stabilizing mechanism has at least one of the following:
   an air-fuel ratio weak rich controller for controlling an air-fuel ratio resulting from combustion of the internal combustion engine to a weak rich value;
   an ignition timing advancing controller for advancing an ignition timing of the internal combustion engine by a predetermined quantity;
   a retardation controller for executing control to retard a closing position of the intake valve; and
   an intake valve lift quantity controller for executing control to increase a lift quantity of the intake valve.

7. The valve timing control apparatus of an internal combustion engine according to claim 1, wherein the first advancing controller advances a closing position of the intake valve on the basis of operation status of the brake when the intake pipe's pressure detected by a pressure detector is on the positive side relative to a predetermined negative pressure.

8. The valve timing control apparatus of an internal combustion engine according to claim 7, wherein the first advancing controller sets an advancing quantity of a closing position of the intake valve on the basis of the intake pipe's pressure detected by the pressure detector.

9. The valve timing control apparatus of an internal combustion engine according to claim 1, wherein the first advancing controller advances a closing position of the intake valve on the basis of status of the brake when a predetermined condition is satisfied.

10. The valve timing control apparatus of an internal combustion engine according to claim 9,
    the valve timing control apparatus further comprising a revolution speed detector for detecting a revolution speed of the internal combustion engine,
    wherein the predetermined condition for advancing a closing position of the intake valve is considered to be satisfied when a revolution speed detected by the revolution speed detector is equal to or lower than a predetermined revolution speed.

11. The valve timing control apparatus of an internal combustion engine according to claim 10, further comprising at least one of:
    an engine water temperature detector for detecting a temperature of cooling water of the internal combustion engine; and
    an intake air temperature detector for detecting a temperature of intake air absorbed into a combustion chamber of the internal combustion engine,
    wherein the predetermined condition is considered to be satisfied when at least one of the temperature of the cooling water is at least equal to a predetermined value and the temperature of the intake air is at least equal to another predetermined value.

* * * * *